United States Patent
Kwak et al.

(10) Patent No.: US 10,305,722 B2
(45) Date of Patent: May 28, 2019

(54) APPARATUS AND METHOD FOR TRANSMITTING OR RECEIVING BROADCAST SIGNAL (AS AMENDED)

(71) Applicant: LG Electronics Inc., Seoul (KR)

(72) Inventors: Minsung Kwak, Seoul (KR); Seungryul Yang, Seoul (KR); Woosuk Ko, Seoul (KR); Woosuk Kwon, Seoul (KR); Kyoungsoo Moon, Seoul (KR); Jangwon Lee, Seoul (KR); Sungryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/758,307

(22) PCT Filed: Sep. 8, 2016

(86) PCT No.: PCT/KR2016/010120
§ 371 (c)(1),
(2) Date: Mar. 7, 2018

(87) PCT Pub. No.: WO2017/043898
PCT Pub. Date: Mar. 16, 2017

(65) Prior Publication Data
US 2018/0254940 A1    Sep. 6, 2018

Related U.S. Application Data

(60) Provisional application No. 62/215,662, filed on Sep. 8, 2015, provisional application No. 62/234,685, filed
(Continued)

(51) Int. Cl.
*G06F 15/16* (2006.01)
*H04L 29/08* (2006.01)
*H04L 29/06* (2006.01)

(52) U.S. Cl.
CPC .... *H04L 29/08648* (2013.01); *H04L 65/4076* (2013.01); *H04L 65/607* (2013.01);
(Continued)

(58) Field of Classification Search
None
See application file for complete search history.

(56) References Cited

U.S. PATENT DOCUMENTS

| 9,973,740 | B2 * | 5/2018 | Lee | H04N 13/161 |
| 2010/0131823 | A1 * | 5/2010 | Song | H03M 13/271 |
| | | | | 714/758 |

(Continued)

FOREIGN PATENT DOCUMENTS

| KR | 10-2008-0107060 A | 12/2008 |
| KR | 10-2014-0051387 A | 4/2014 |
| WO | 2014/171718 A1 | 10/2014 |

*Primary Examiner* — Umar Cheema
*Assistant Examiner* — Gregory P Tolchinsky
(74) *Attorney, Agent, or Firm* — Dentons US LLP

(57) ABSTRACT

Disclosed is a method for transmitting a broadcast signal. A method for transmitting a broadcast signal according to an embodiment of the present invention comprises the steps of: delivery layer processing broadcasting service data and signaling information for the broadcasting service data; UDP/IP encapsulating the broadcasting service data and signaling information for the broadcasting service data; and physical layer processing the broadcasting service data and signaling information for the broadcasting service data.

12 Claims, 27 Drawing Sheets

Related U.S. Application Data on Sep. 30, 2015, provisional application No. 62/235,594, filed on Oct. 1, 2015, provisional application No. 62/240,503, filed on Oct. 12, 2015, provisional application No. 62/252,570, filed on Nov. 8, 2015, provisional application No. 62/260,214, filed on Nov. 25, 2015.

(52) U.S. Cl.
CPC .......... *H04L 67/16* (2013.01); *H04L 29/0809* (2013.01); *H04L 29/08018* (2013.01); *H04L 67/02* (2013.01)

(56) References Cited

U.S. PATENT DOCUMENTS

| | | | |
|---|---|---|---|
| 2011/0103300 A1* | 5/2011 | Vare | H04N 21/6112 370/328 |
| 2011/0165865 A1* | 7/2011 | Gao | H04W 72/005 455/414.1 |
| 2012/0207088 A1* | 8/2012 | Liu | H04L 65/608 370/328 |
| 2013/0030912 A1* | 1/2013 | Chu | G06F 21/10 705/14.49 |
| 2013/0205344 A1* | 8/2013 | Lee | H04H 20/93 725/54 |
| 2013/0290814 A1* | 10/2013 | Hwang | H04L 1/004 714/776 |
| 2014/0129859 A1* | 5/2014 | O'Malley | G06F 1/3209 713/323 |
| 2015/0208104 A1 | 7/2015 | Suh et al. | |
| 2016/0095064 A1* | 3/2016 | Li | H04W 48/10 370/311 |
| 2017/0019431 A1* | 1/2017 | Kitahara | H04N 21/4385 |
| 2017/0347134 A1* | 11/2017 | Bae | H04N 21/2381 |
| 2018/0098111 A1* | 4/2018 | Yang | H04N 13/167 |

\* cited by examiner

[Figure 1]
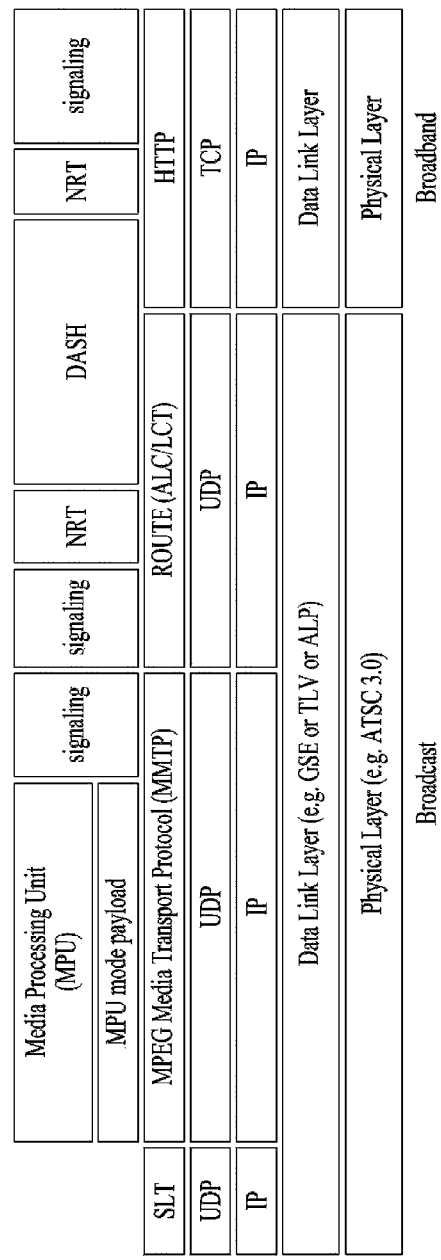

[Figure 2]
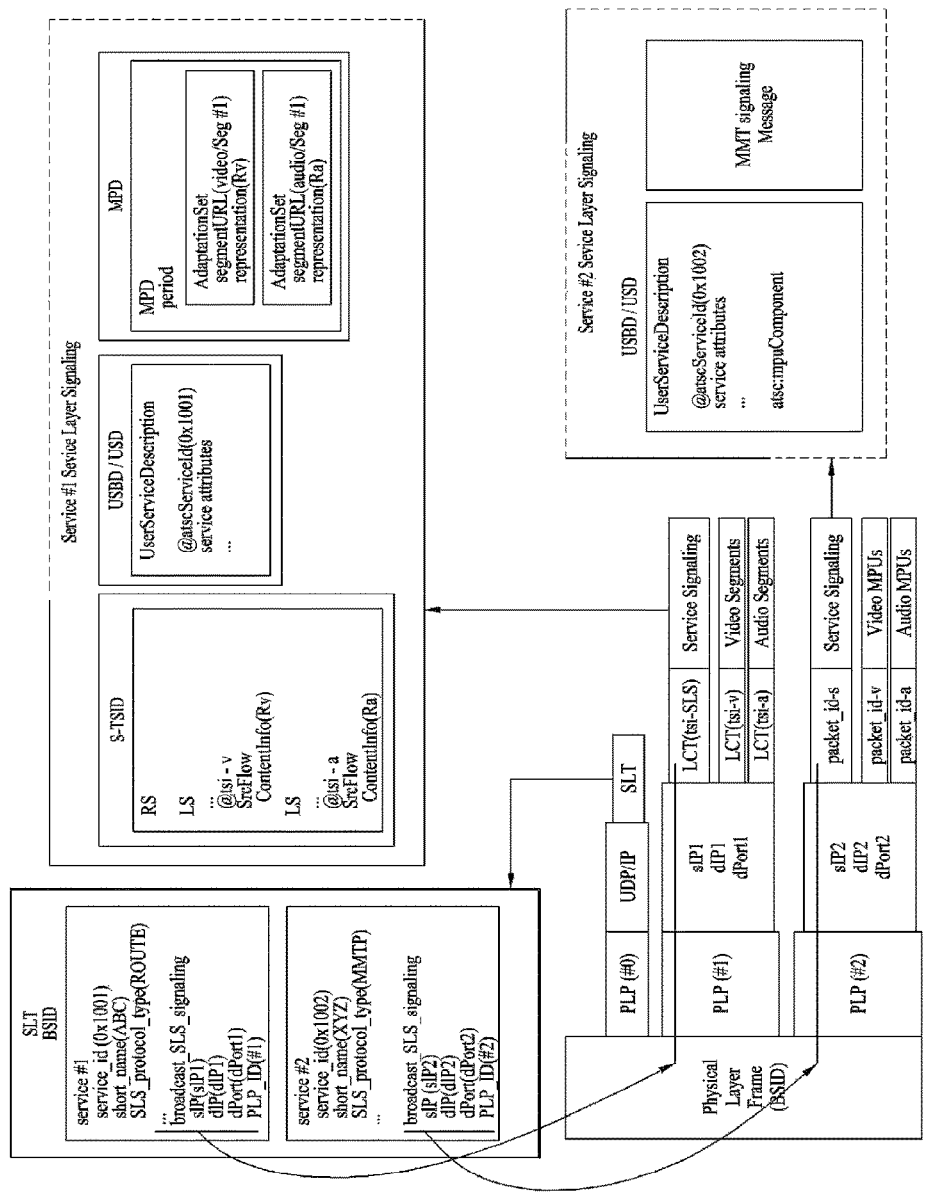

[Figure 3]

| Syntax | No. of Bits | Format |
|---|---|---|
| LLS_table( ) { | | |
|    LLS_table_id | 8 | uimsbf |
|    provider_id | 8 | uimsbf |
|    LLS_table_version | 8 | uimsbf |
|    switch (LLS_table_id) { | | |
|      case 0x01: | | |
|        SLT | var | Sec. 6.3 |
|        break; | | |
|      case 0x02: | | |
|        RRT | var | See Annex F |
|        break; | | |
|      case 0x03: | | |
|        System Time | var | Sec. 6.4 |
|        break; | | |
|      case 0x04: | | |
|        CAP | var | Sec. 6.5 |
|        break; | | |
|      default: | | |
|        reserved | var | |
|    } | | |
| } | | | t3010

| Element or Attribute Name | Use | Data Type |
|---|---|---|
| SLT | | |
|   @bsid | 1 | unsignedShort |
|   @sltCapabilities | 0..1 | string |
|   sltInetUrl | 0..1 | anyURL |
|     @urlType | 1 | unsignedByte |
|   Service | 1..N | |
|     @serviceID | 1 | unsignedShort |
|     @sltSvcSeqNum | 1 | unsignedByte |
|     @protected | 0..1 | boolean |
|     @majorChannelNo | 0..1 | 1...999 |
|     @minorChannelNo | 0..1 | 1...999 |
|     @serviceCategory | 1 | unsignedByte |
|     @shortServiceName | 0..1 | string |
|     @hidden | 0..1 | boolean |
|     @broadbandAccessRequired | 0..1 | boolean |
|     @svcCapabilities | 0..1 | string |
|     BroadcastSvcCignaling | 0..1 | |
|       @slsProtocol | 1 | unsignedByte |
|       @slsMajorProtocolVersion | 1 | unsignedByte |
|       @slsMinorProtocolVersion | 1 | unsignedByte |
|       @slsPlpID | 0..1 | unsignedByte |
|       @slsDestinationIpAddress | 1 | string |
|       @slsDestinationUdpPort | 1 | unsignedShort |
|       @slsSourceIpAddress | 1 | string |
|     svcInetUrl | 0..N | anyURL |
|       @urlType | 1 | unsignedByte | t3020

[Figure 4]

| Element or Attribute Name | | | | | Use | Data Type |
|---|---|---|---|---|---|---|
| bundleDescription | | | | | | |
| | userServiceDescription | | | | | |
| | | @globalServiceID | | | 1 | anyURL |
| | | @serviceID | | | 1 | unsignedShort |
| | | @serviceStatus | | | 0..1 | boolean |
| | | @fullMPDUri | | | 1 | anyURL |
| | | @sTSIDUri | | | 1 | anyURL |
| | | name | | | 0..N | string |
| | | | @lang | | 1 | language |
| | | serviceLanguage | | | 0..N | language |
| | | capabilityCode | | | 0..1 | string |
| | | deliveryMethod | | | 1..N | |
| | | | broadcastAppService | | 1..N | |
| | | | | basePattern | 1..N | string |
| | | | unicastAppService | | 0..N | |
| | | | | basePattern | 1..N | string |

← t4010

| Element or Attribute Name | | | Use | Data Type |
|---|---|---|---|---|
| S-TSID | | | | |
| | @serviceID | | 1 | unsignedShort |
| | RS | | 1..N | |
| | | @bsid | 0..1 | unsignedShort |
| | | @sIpAddr | 0..1 | string |
| | | @dIpAddr | 0..1 | string |
| | | @dport | 0..1 | unsignedShort |
| | | @PLPID | 0..1 | unsignedByte |
| | | LS | 1..N | |
| | | @tsi | 1 | unsignedInt |
| | | @PLPID | 0..1 | unsignedByte |
| | | @bw | 0..1 | unsignedInt |
| | | @startTime | 0..1 | dateTime |
| | | @endTime | 0..1 | dateTime |
| | | SrcFlow | 0..1 | scrFlowType |
| | | RepairFlow | 0..1 | rprFlowType | t4020

[Figure 5]

| Element or Attribute Name | | | | | | Use |
|---|---|---|---|---|---|---|
| bundleDescription | | | | | | |
| | userServiceDescription | | | | | |
| | | @globalServiceID | | | | M |
| | | @serviceID | | | | M |
| | | Name | | | | 0..N |
| | | | @lang | | | CM |
| | | serviceLanguage | | | | 0..N |
| | | contentAdvisoryRating | | | | 0..1 |
| | | Channel | | | | 1 |
| | | | @serviceGenre | | | 0..1 |
| | | | @serviceIcon | | | 1 |
| | | | ServiceDescription | | | 0..N |
| | | | | @serviceDescrText | | 1 |
| | | | | @serviceDescrLang | | 0..1 |
| | | mpuComponent | | | | 0..1 |
| | | | @mmtPackageId | | | 1 |
| | | | @nextMmtPackageId | | | 0..1 |
| | | routeComponent | | | | 0..1 |
| | | | @sTSIDUri | | | 1 |
| | | | @sTSIDDestinationIpAddress | | | 0..1 |
| | | | @sTSIDDestinationUdpPort | | | 1 |
| | | | @sTSIDSourceIpAddress | | | 1 |
| | | | @sTSIDMajorProtocolVersion | | | 0..1 |
| | | | @sTSIDMinorProtocolVersion | | | 0..1 |
| | | broadbandComponent | | | | 0..1 |
| | | | @fullMPDUri | | | 1 |
| | | ComponentInfo | | | | 1..N |
| | | | @ComponentType | | | 1 |
| | | | @ComponentRole | | | 1 |
| | | | @ComponentProtectedFlag | | | 0..1 |
| | | | @ComponentId | | | 1 |
| | | | @ComponentName | | | 0..1 |

[Figure 6]
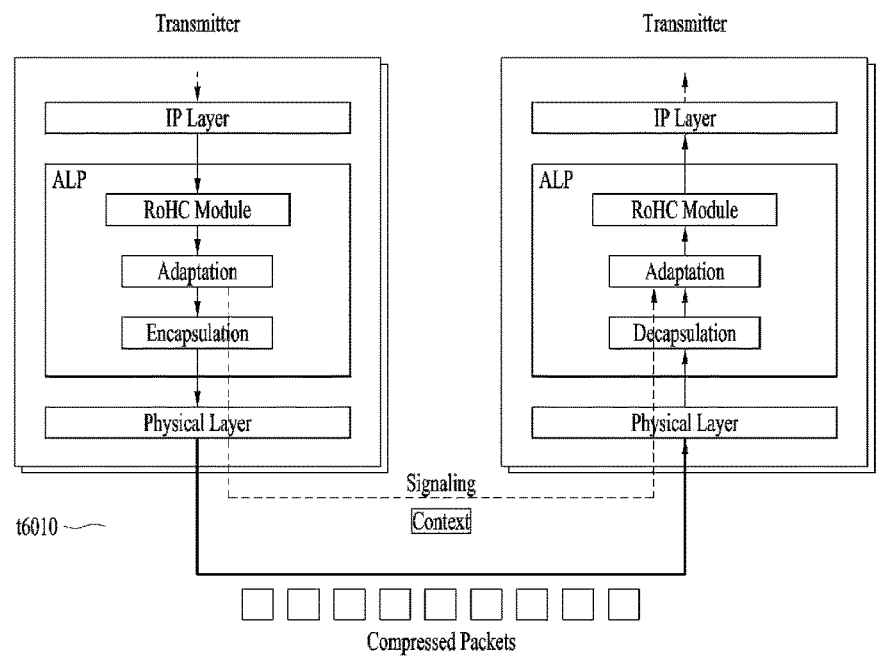
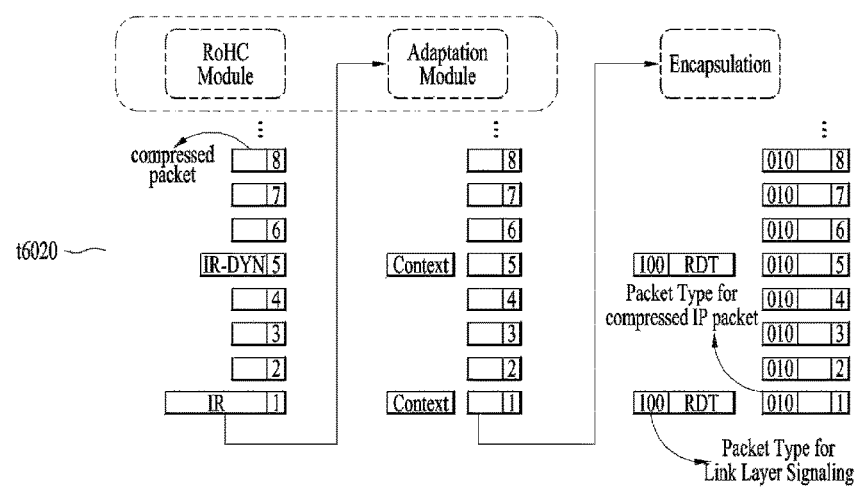

[Figure 7]

| Syntax | Number of bits | Format |
|---|---|---|
| Link_Mapping_Table() { | | |
|    signaling_type | 8 | 0x01 |
|   PLP_ID | 6 | uimsbf |
|   reserved | 2 | "11" |
|   num_session | 8 | uimsbf |
|   for(i = 0 ; i < num_session ; i + +) { | | |
|     src_IP_add | 32 | uimsbf |
|     dst_IP_add | 32 | uimsbf |
|     src_UDP_port | 16 | uimsbf |
|     dst_UDP_port | 16 | uimsbf |
|     SID_flag | 1 | bslbf |
|     compressed_flag | 1 | bslbf |
|     reserved | 6 | '111111' |
|     if (SID_flag = = "1") { | | |
|       SID | 8 | uimsbf |
|     } | | |
|     if (compressed_flag = = '1') { | | |
|       context_id | 8 | uimsbf |
|     } | | |
|   } | | |
| } | | |

[Figure 8]
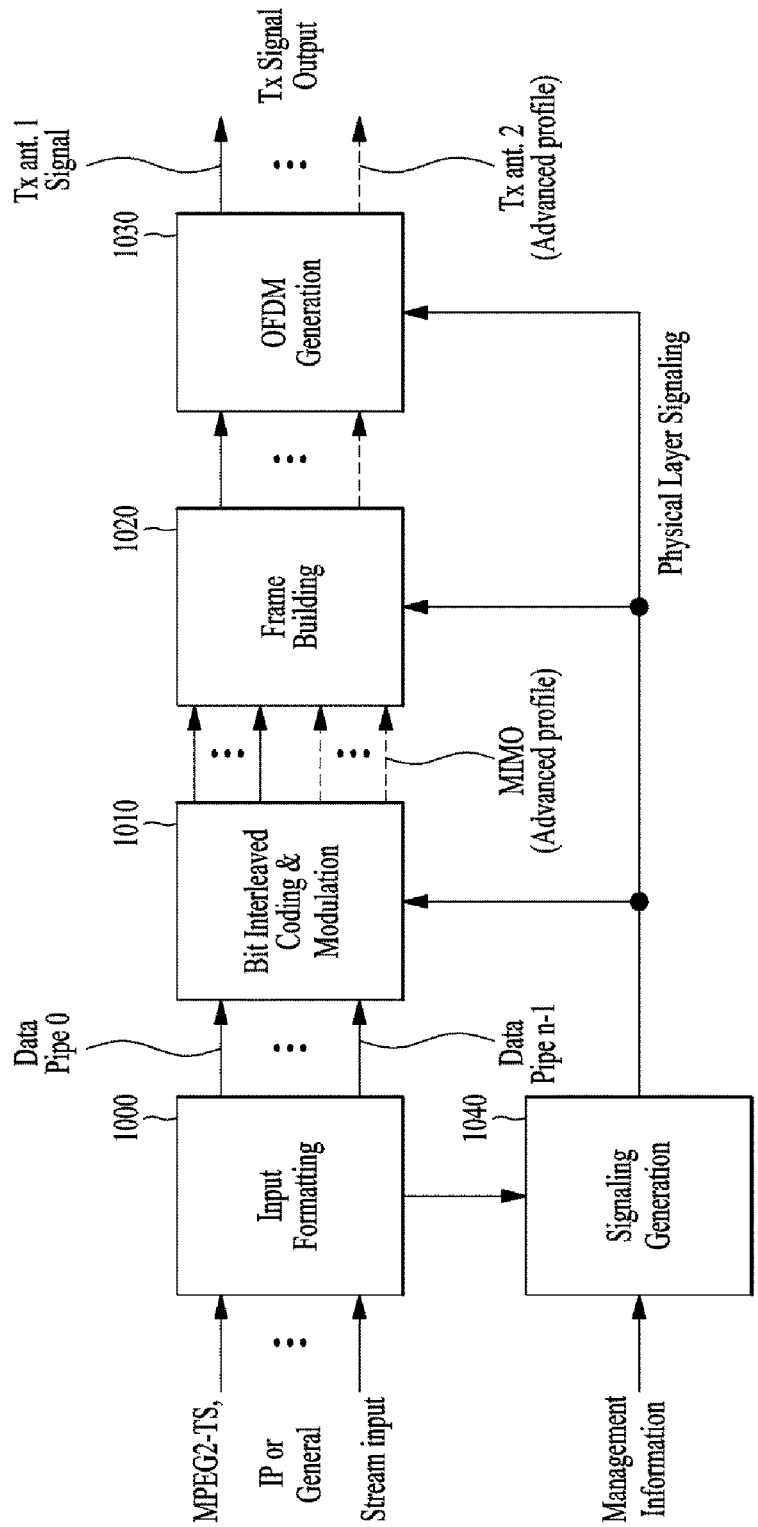

[Figure 9]

[Figure 10]
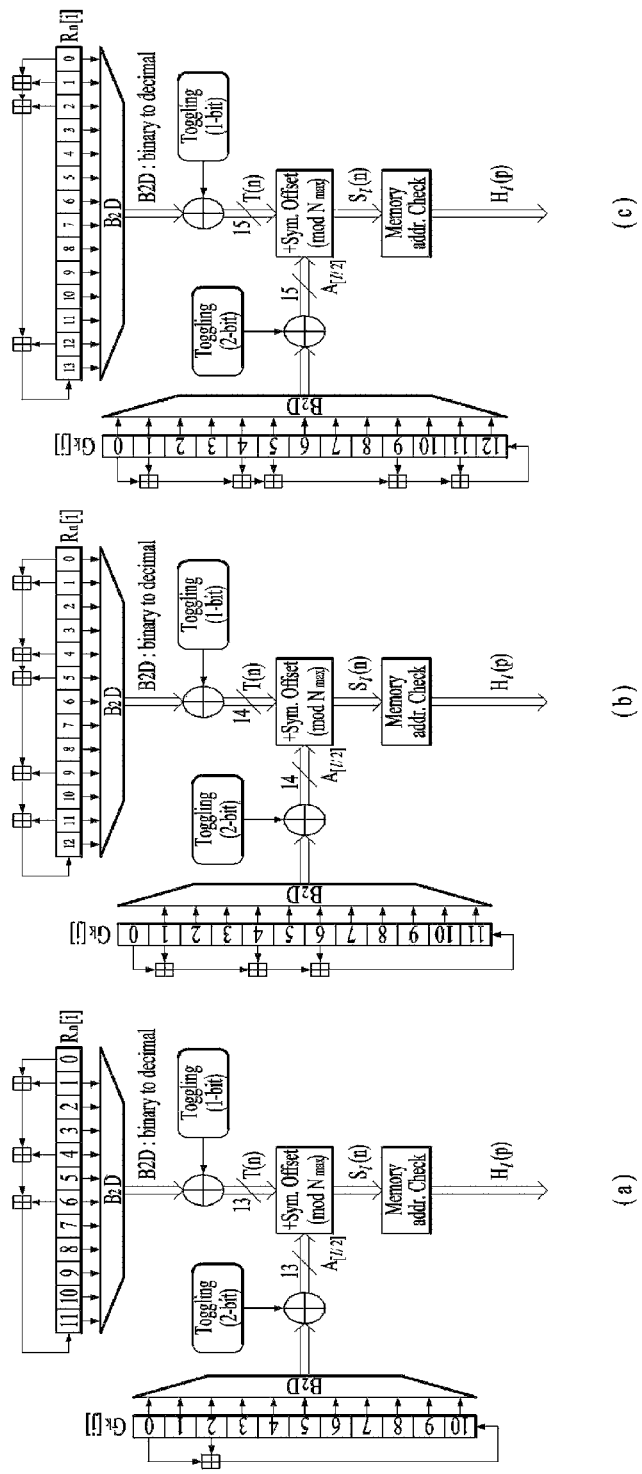

[Figure 11]
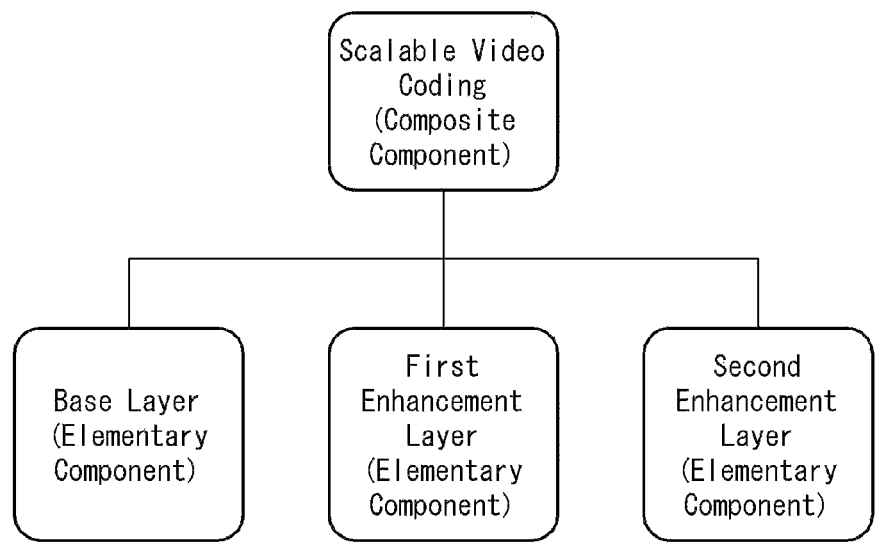
[Figure 12]
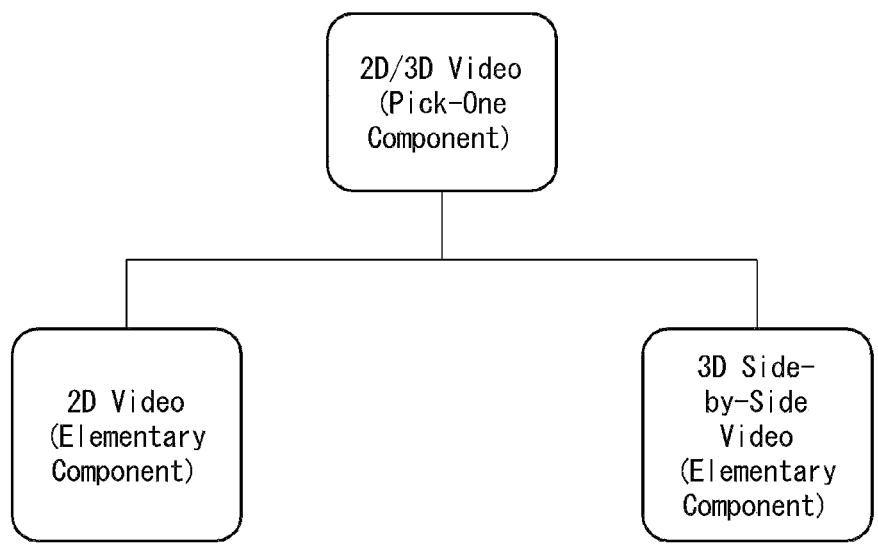

[Figure 13]
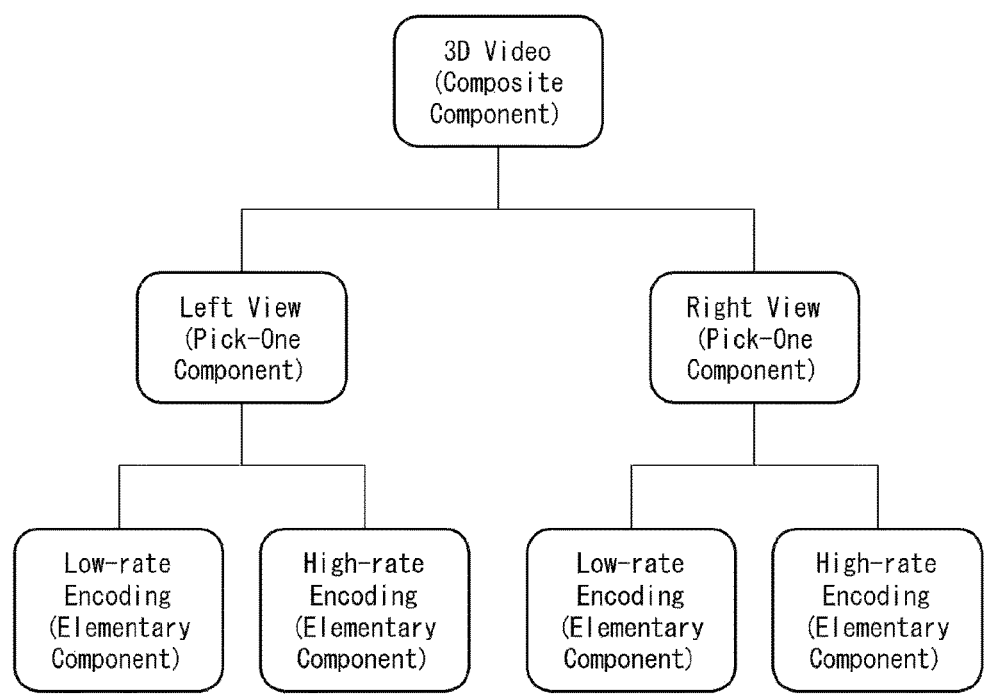

[Figure 14]
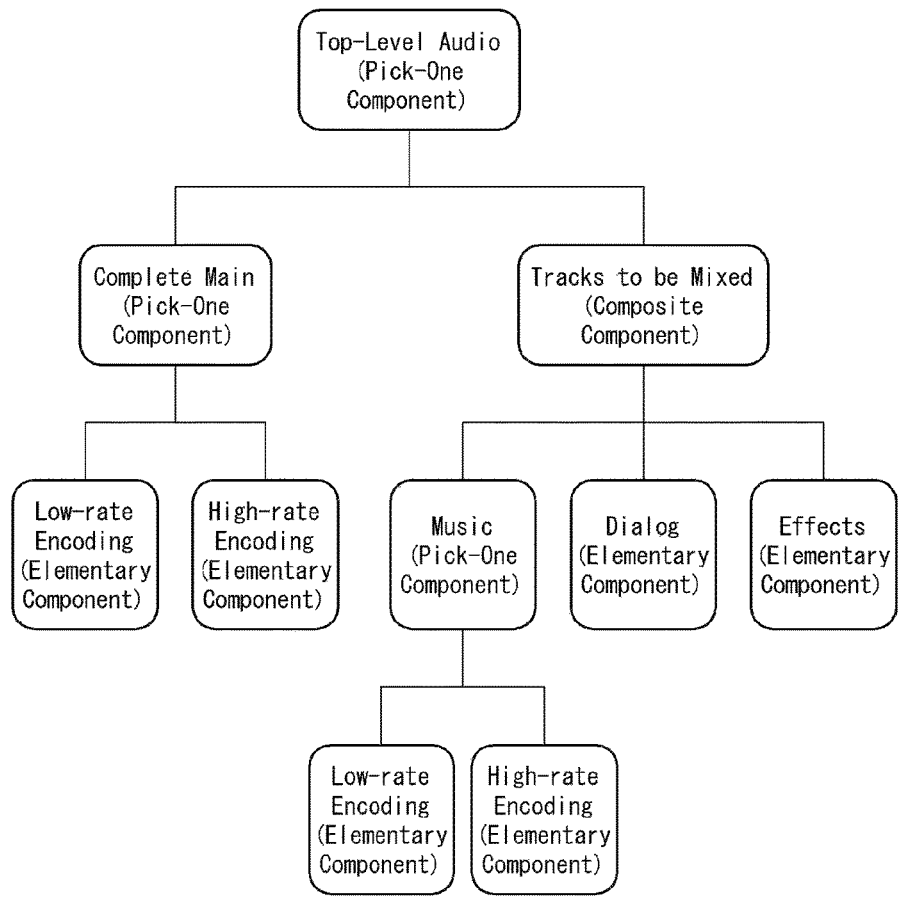

[Figure 15]
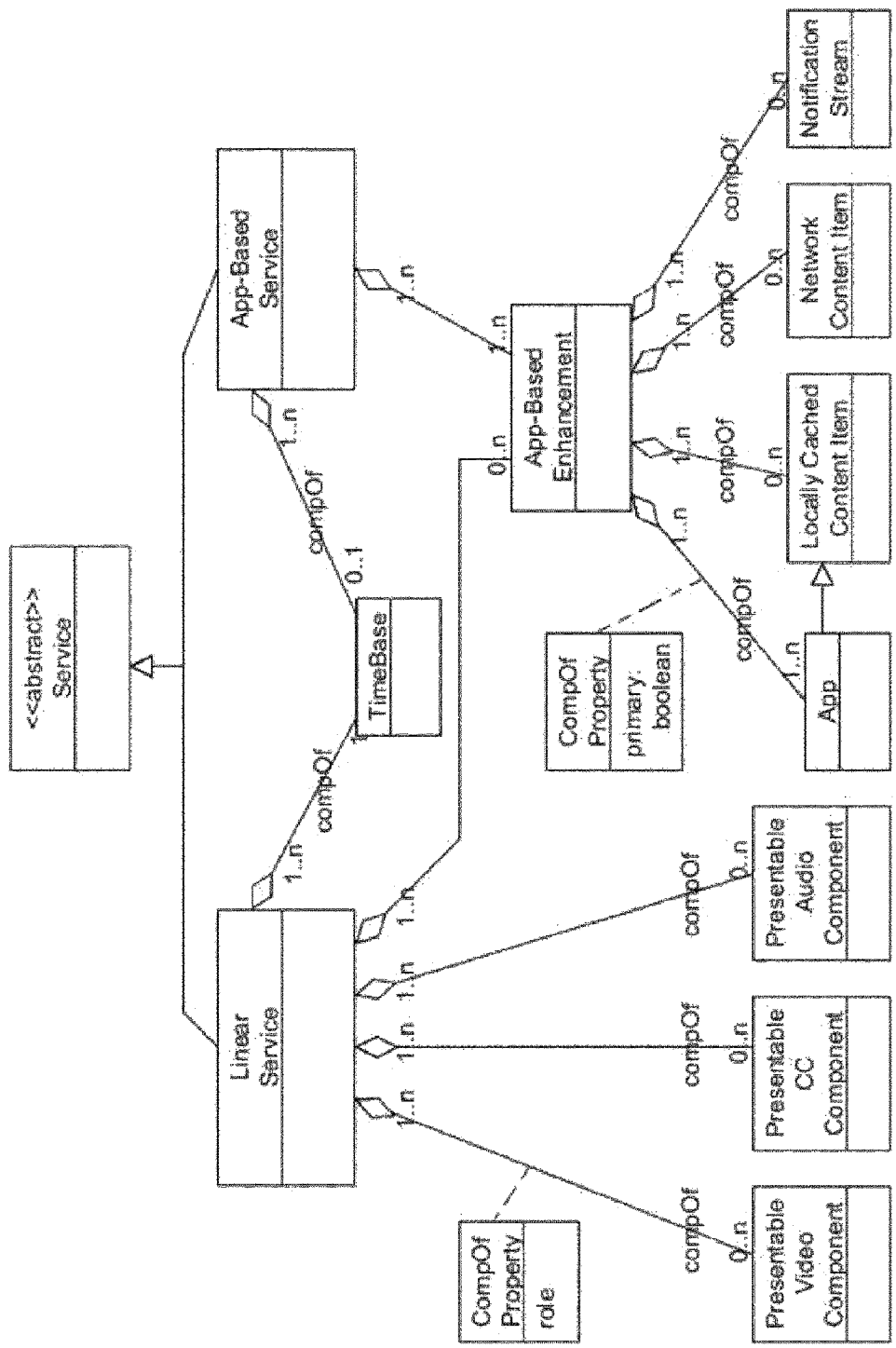

【Figure 16】
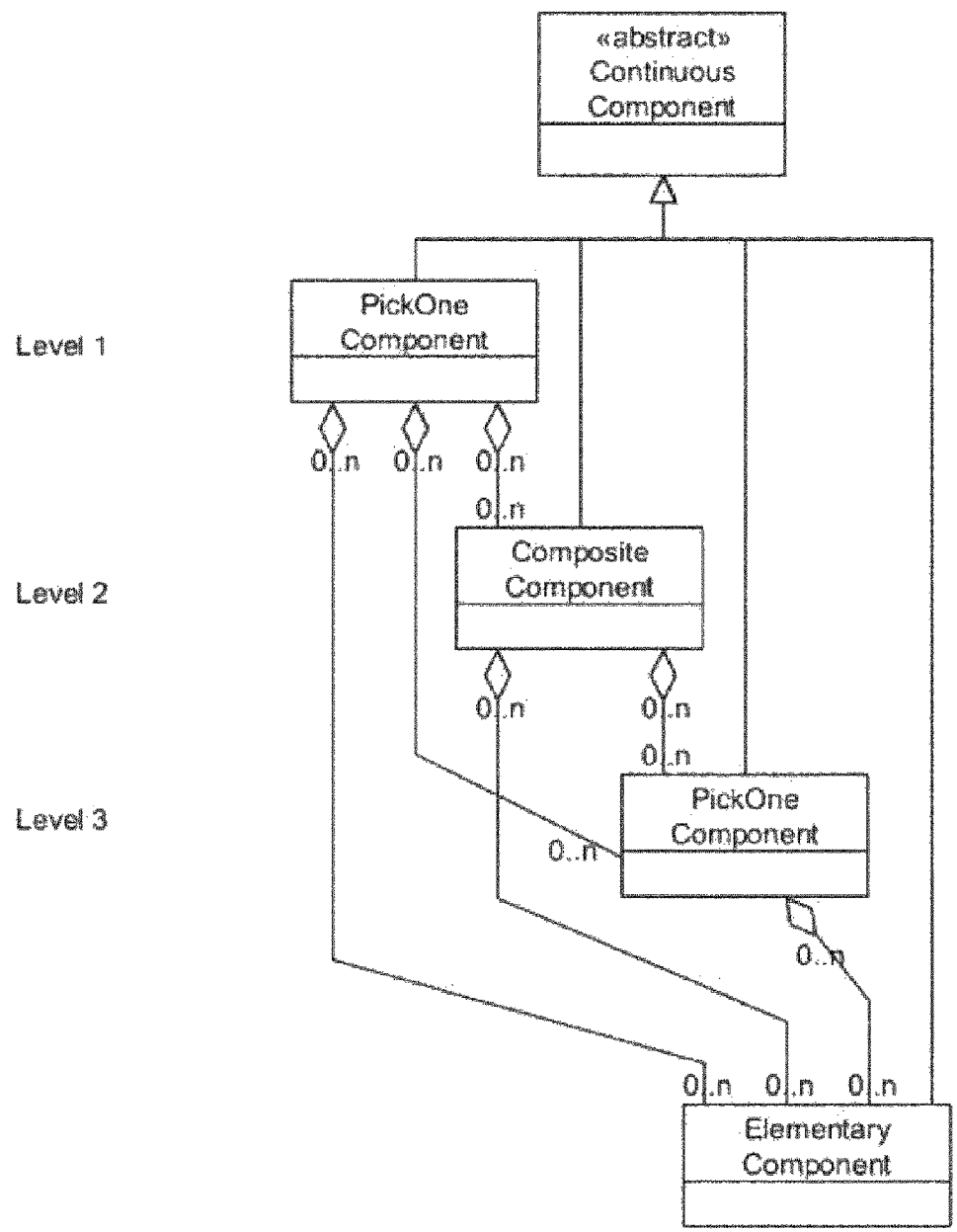

[Figure 17]
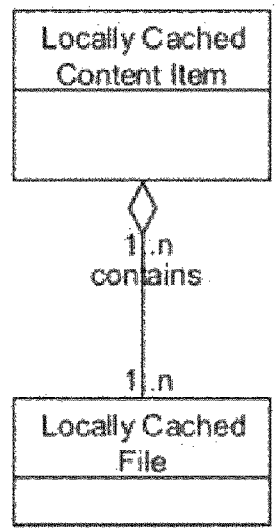
[Figure 18]
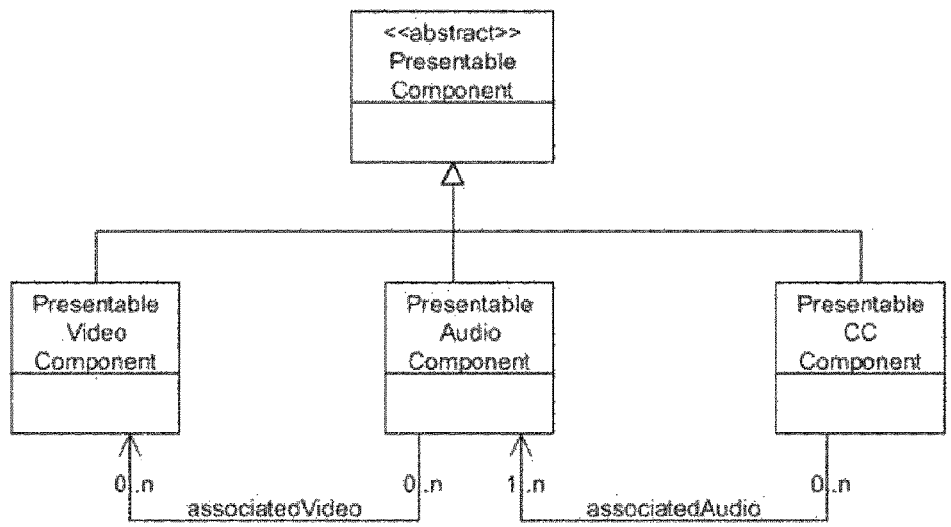

【Figure 19】
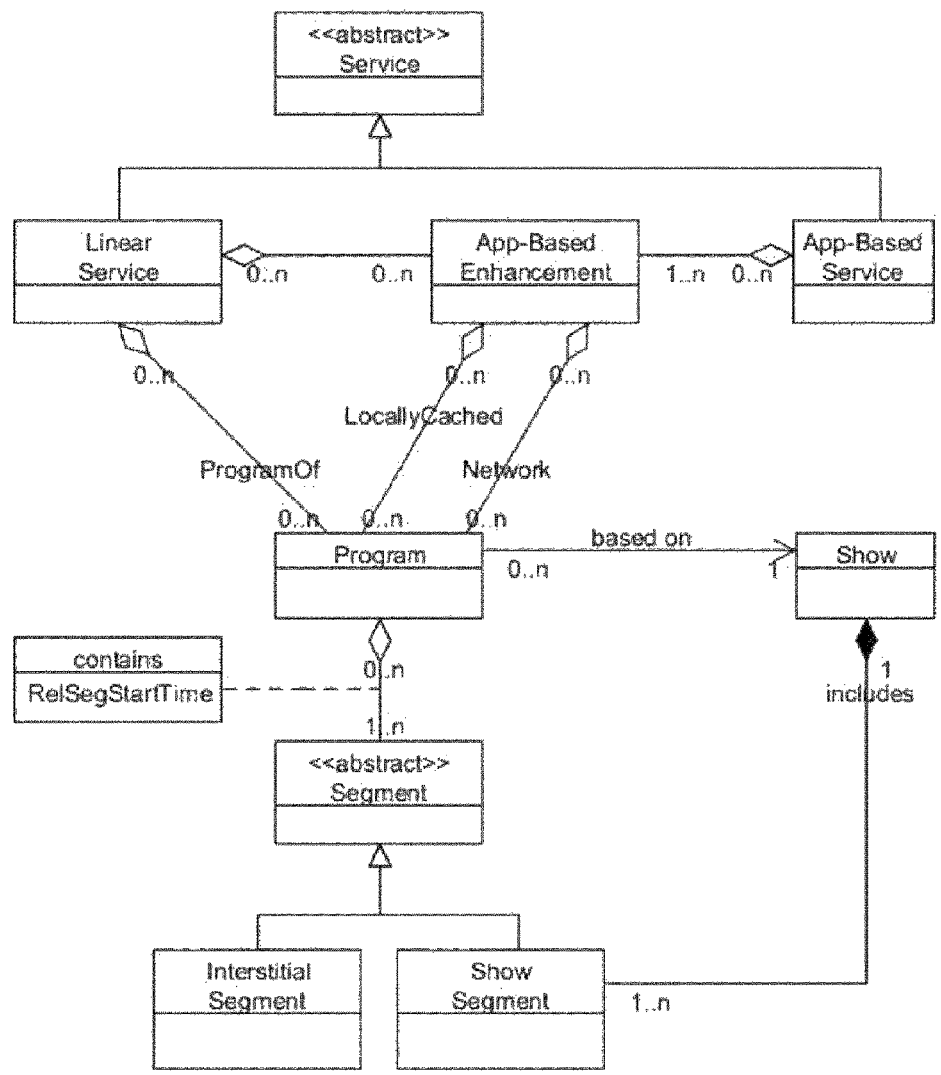

[Figure 20]

| Syntax | No. of Bits |
|---|---|
| LLS_table() { | |
|   LLS_table_id | 8 |
|   provider_id | 8 |
|   LLS_table_version | 8 |
|   switch (LLS_table_id) { | |
|     case 0x01: | |
|       SLT() | var |
|       break; | |
|     case 0x02: | |
|       RRT() | var |
|       break; | |
|     default: | |
|       reserved | var |
|   } | |
| } | |

[Figure 21]

| Element or Attribute Name | | | Use |
|---|---|---|---|
| SLT | | | |
| | @bsid | | 1 |
| | @sltCapabilities | | 0..1 |
| | @sltInetSigUrl | | 0..1 |
| | @sltInetEsgUrl | | 0..1 |
| | Service | | 1..N |
| | | @serviceId | 1 |
| | | @sltSvcSeqNum | 1 |
| | | @protected | 0..1 |
| | | @majorChannelNo | 0..1 |
| | | @minorChannelNo | 0..1 |
| | | @serviceCategory | 1 |
| | | @shortServiceName | 0..1 |
| | | @hidden | 0..1 |
| | | @broadbandAccessRequired | 0..1 |
| | | @svcCapabilities | 0..1 |
| | | @slsProtocol | 0..1 |
| | | @slsMajorProtocolVersion | 0..1 |
| | | @SlsMinorProtocolVersion | 0..1 |
| | | @slsPlpId | 0..1 |
| | | @slsDestinationIpAddress | 0..1 |
| | | @slsDestinationUdpPort | 0..1 |
| | | @slsSourceIpAddress | 0..1 |
| | | @svcInetSigUrl | 0..1 |
| | | @svcInetEsgUrl | 0..1 |

[Figure 22]

| Terms | Meaning |
|---|---|
| <service_id> | Identifies desired service |
| normal\|diff\|template | Identifies desired mode of files |
| current\|next | Identifies desired current/next version |
| ALL\|RD\|USBD\|STSID\|MPD\|MMT\|MPT\|PAT\|MPIT\|CRIT\|DCIT\|AST\|EMT\|AEI | Identifies desired type of object(s) |

[Figure 23]

| Name | Values |
|---|---|
| ALL | All metadata objects for requested service(s) |
| RD | All ROUTE/DASH metadata objects for requested service(s) |
| MMT | All MMT metadata objects for requested service(s) |
| USBD | USBD for requested service(s) |
| STSID | S-TSID for requested service(s) |
| MPD | DASH MPD for requested service(s) |
| PAT | Package Access Table for requested service(s) |
| MPT | MMT Package Table for requested service(s) |
| MPIT | Media Presentation Information Table for requested service(s) |
| CRIT | Clock Relation Information Table for requested service(s) |
| DCIT | Device Capabilities Information Table for requested service(s) |
| AST | Application Signaling Table for requested service(s) |
| EMT | Event Messages Table for requested service(s) |
| AEI | Application Event Information for requested service(s) |

[Figure 24]

| Attribute Name | Attribute Value |
|---|---|
| schemeIdUri | urn:atsc:3.0:tud |
| value | Comma-separated list of updated fragments, using fragment names in Table 6.9. |
| timescale | Timescale, in tics/second, for time and duration attributes. |
| presentation_time_delta | Presentation time of Event, relative to earliest presentation time of any access unit in the DASH Segment containing the Event. |
| event_duration | Duration of the Event (length of interval during which receiver is expected to request the fragments |
| Id | Identifier of this instance of this Event |
| message_data | URL to be used to retrieve the updated fragments |

[Figure 25]

| Content ID Scheme | schemeIdUri | Value | Id |
|---|---|---|---|
| EIDR | urn:atsc:3.0:assetid:eidr | EIDR Identifier | [omit] |
| Ad-ID | urn:atsc:3.0:assetid:adid | AD-ID Identifier | [omit] |

[Figure 26a]

- Service
  - Id
  - Version
  - validFrom
  - validTo
  - globalServiceID
  - Weight
  - Emergency
  - ServiceType
  - Name
  - Description
  - AudioLanguage
    - languageSDPTag
  - TextLanguage
    - languageSDPTag
  - ContentAdvisoryRatings
  - TargetUserProfile
  - Genre
  - BroadcastArea
  - PrivateExt
    - ATSC3ServicePrivateExt
      - Icon
        - uri
        - MIMEType
        - size
      - MajorChannelNum
      - MinorChannelNum

[Figure 26b]

| Name | Type | Category | Cardinality | Data Type |
|---|---|---|---|---|
| Icon | E2 | NM/TM | 0..N | |
| uri | A | NM/TM | 1 | anyURI |
| MIMEType | A | NM/TM | 1 | String |
| size | A | NM/TM | 0..1 | unsignedInt |

[Figure 27]

| AppComponent | E2 | NM/TM | 0..N | Role of the component.<br><br>Textual description intended for human consumption regarding role of the component.<br><br>Strings which could be used to describe role of component of ATSC3.0 service include:<br><br>"On Demand"<br><br>"Start-over"<br><br>"Companion-Screen"<br><br>"Preview"<br><br>""<br><br>Any other useful description for a viewer can be provided.<br><br>Contains the following attribute:<br><br>    language | String |
|---|---|---|---|---|---|

【Figure 28a】
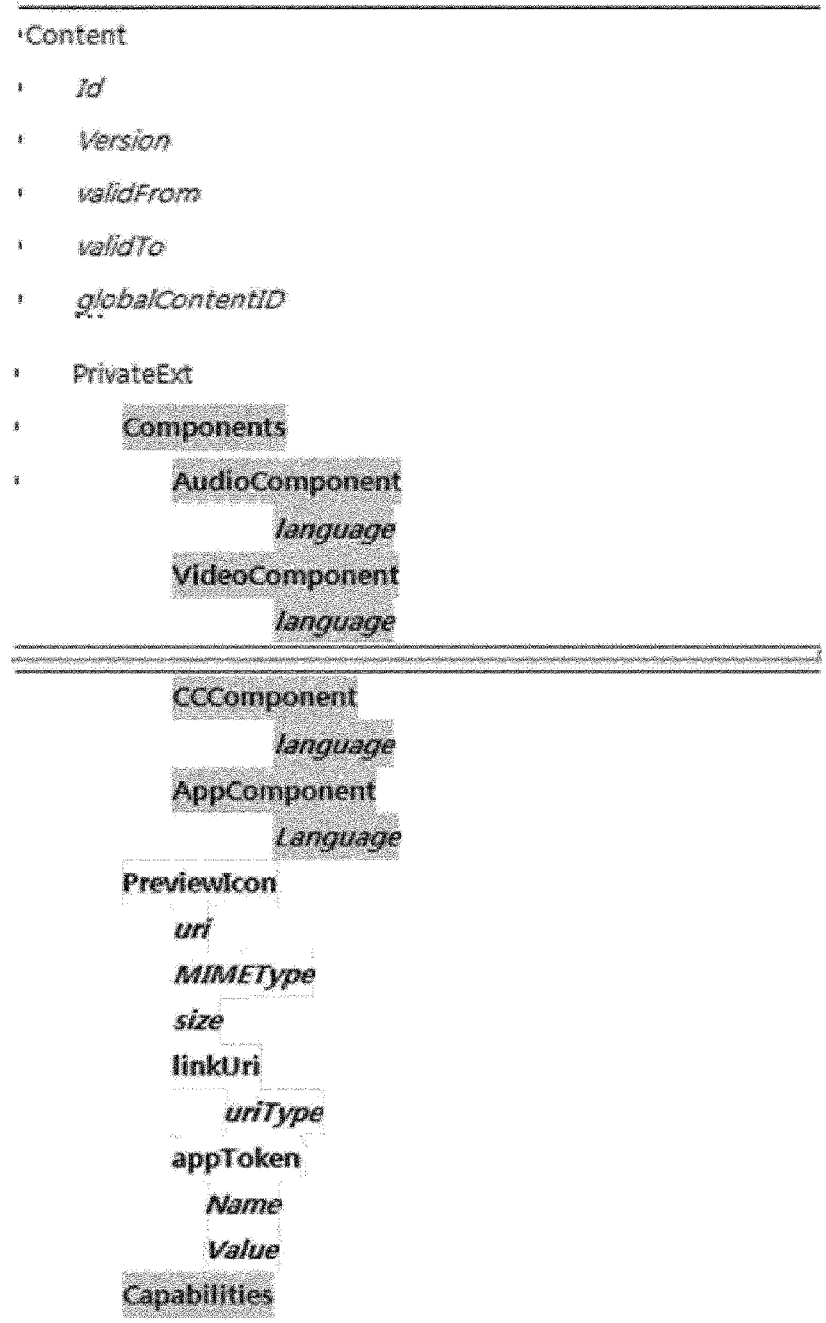

【Figure 28b】

| PreviewIcon | E2 | NM/TM | 0..N |  |
|---|---|---|---|---|
| uri | A | NM/TM | 1 | anyURI |
| MIMEType | A | NM/TM | 1 | String |
| size | A | NM/TM | 0..1 | unsignedInt |
| linkUri | E3 | NM/TM | 0..N | anyURI |
| uriType | A | NM/TM | 1 | unsignedByte |
| appToken | E3 | NM/TM | 0..N |  |
| name | A | NM/TM | 1 | String |
| value | A | NM/TM | 1 | String |

[Figure 29]
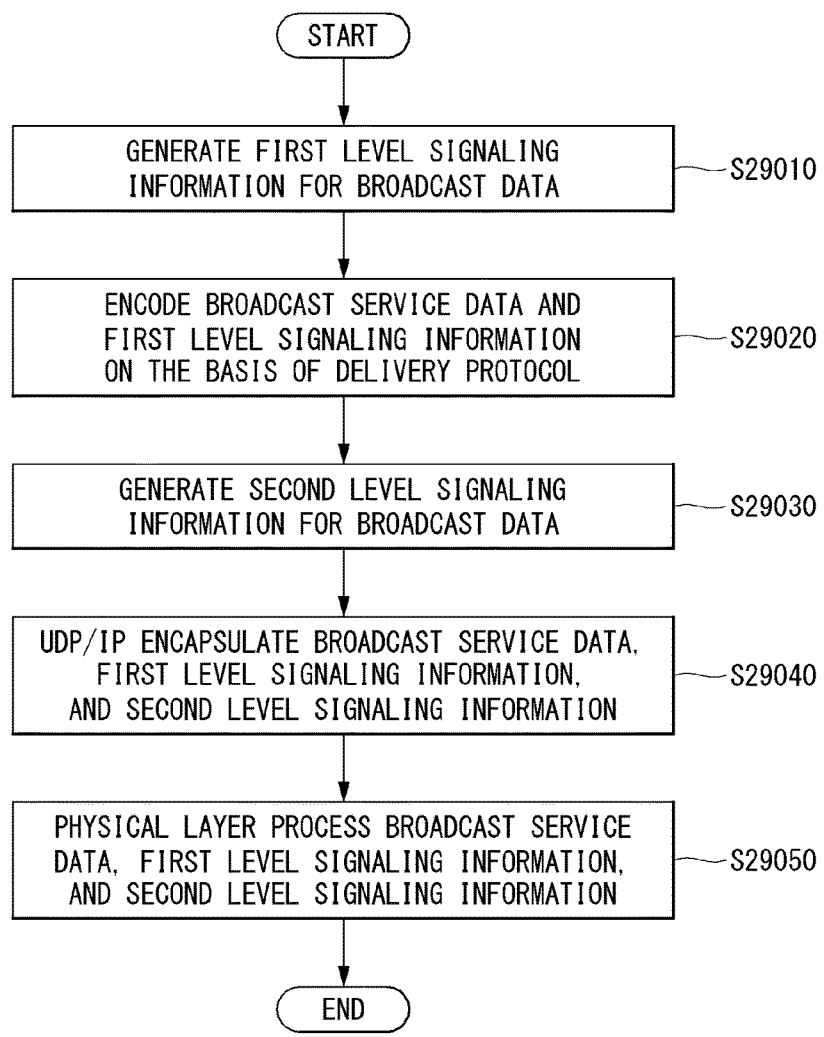

[Figure 30]
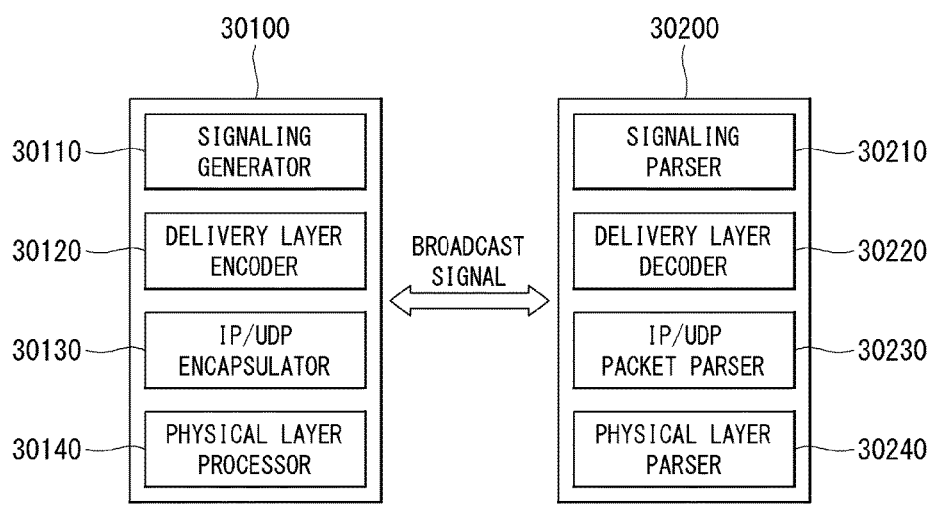

APPARATUS AND METHOD FOR TRANSMITTING OR RECEIVING BROADCAST SIGNAL (AS AMENDED)

CROSS-REFERENCE TO RELATED APPLICATIONS

This application is the National Stage filing under 35 U.S.C. 371 of International Application No. PCT/KR2016/010120, filed on Sep. 8, 2016, which claims the benefit of U.S. Provisional Application No. 62/215,662, filed on Sep. 8, 2015; U.S. Provisional Application No. 62/234,685, filed on Sep. 30, 2015; U.S. Provisional Application No. 62/235,594, filed on Oct. 1, 2015; U.S. Provisional Application No. 62/240,503 filed on Oct. 12, 2015; U.S. Provisional Application No. 62/252,570, filed on Nov. 8, 2015 and U.S. Provisional Application No. 62/260,214, filed on Nov. 25, 2015, and, the contents of which are all hereby incorporated by reference herein in their entirety.

TECHNICAL FIELD

The present invention relates to an apparatus for transmitting a broadcast signal, an apparatus for receiving a broadcast signal, a method for transmitting a broadcast signal and a method for receiving a broadcast signal.

BACKGROUND ART

As analog broadcast signal transmission comes to an end, various technologies for transmitting/receiving digital broadcast signals have been developed. A digital broadcast signal may include a larger amount of video/audio data than an analog broadcast signal and may further include various types of additional data in addition to the video/audio data.

DISCLOSURE

Technical Problem

A digital broadcast system may provide HD (high definition) images, multi-channel audio and various additional services. However, data transmission efficiency for transmission of large amounts of data, robustness of transmission/reception networks and network flexibility in consideration of mobile reception equipment need to be improved for digital broadcast.

Technical Solution

The present invention proposes a method for transmitting a broadcast signal and an apparatus for transmitting a broadcast signal.

A method for transmitting a broadcast signal according to an embodiment of the present invention may include: generating first level signaling information providing information for discovery and acquisition of broadcast service data; encoding the broadcast service data and the first level signaling information on the basis of a delivery protocol; generating second level signaling information, the second level signaling information including table ID information identifying a type of signaling information included in the second level signaling information and provider ID information identifying a provider associated with a broadcast service signaled through the second level signaling information; user datagram protocol (UDP)/Internet protocol (IP) encapsulating each of the broadcast service data, the first level signaling information, and the second level signaling information; and physical layer processing the broadcast service data, the first level signaling information, and the second level signaling information to generate a signal frame, wherein the type of the signaling information identified by the table ID information includes service list table (SLT) information providing information used for discovering the first level signaling information and building a basic service list.

An apparatus for transmitting a broadcast signal according to an embodiment of the present invention may include: a signaling generator generating first level signaling information and a second level signaling information for broadcast service data, the first level signaling information providing information for discovery and acquisition of the broadcast service data, the second level signaling information including table ID information identifying a type of signaling information included in the second level signaling information and provider ID information identifying a provider associated with a broadcast service signaled through the second level signaling information; a delivery layer encoder encoding the broadcast service data and the first level signaling information on the basis of a delivery protocol; a user datagram protocol (UDP)/Internet protocol (IP) encapsulator UDP/IP encapsulating each of the broadcast service data, the first level signaling information, and the second level signaling information; and a physical layer processor physical layer processing the broadcast service data, the first level signaling information, and the second level signaling information to generate a signal frame, wherein the type of the signaling information identified by the table ID information includes service list table (SLT) information providing information used for discovering the first level signaling information and building a basic service list.

In an embodiment, the SLT information may include uniform resource locator (URL) information providing a base URL for obtaining the first level signaling information for the broadcast service or service guide information for the broadcast service through a broadband.

In an embodiment, when the URL information provides a first base URL for obtaining the first level signaling information through the broadband, the first base URL may be used to make an HTTP request for the first level signaling information.

In an embodiment, a response message for the HTTP request may include a metadata envelop including the requested first level signaling information, and the metadata envelop may include next URL information providing a URL for next scheduled update for the first level signaling information.

In an embodiment, when the delivery protocol is a ROUTE (Real-time Object delivery over Unidirectional Transport) protocol, the first level signaling information may include a media presentation description (MPD) fragment providing a description regarding a media presentation regarding the broadcast service, and the MPD fragment may include an asset ID information for associating content IDs providing identification information of linear content and identification information of supplementary content of the broadcast service.

In an embodiment, the content ID may include a first content ID providing identification information of entertainment-related supplementary content and a second content ID providing identification information of advertisement-related supplementary content.

In an embodiment, the SLT information may include service category information, and a service category indicated by the service category information may include a linear audio/video service, a service of only linear audio, an app-based service, an electronic service guide (ESG) service, and an emergency alert system (EAS) service.

In an embodiment, when the service category indicated by the service category information is the ESG service, service data regarding the ESG service may include service guide information for announcing information regarding the broadcast service, and the service guide information may include a service fragment having information regarding the broadcast service and a content fragment having content information regarding the broadcast service.

In an embodiment, the service fragment may include a preview icon element providing a URL pointing to an icon used to represent the broadcast service in the service guide.

In an embodiment, the content fragment may include a preview icon element providing a URL pointing to an icon used to represent the broadcast service in the service guide.

Advantageous Effects

The present invention may process data according to service characteristics to control Quality of Services (QoS) for each service or service component, thereby providing various broadcast services.

The present invention may achieve transmission flexibility by transmitting various broadcast services through the same radio frequency (RF) signal bandwidth.

The present invention may provide a method and apparatus for transmitting/receiving a broadcast signal capable of receiving digital broadcast signals without an error even in the case of using a mobile receiving device or in an indoor environment.

The present invention may support a next generation broadcast service efficiently in the environment that supports the hybrid broadcast that uses a terrestrial broadcast network and an internet network.

Hereinafter, the additional effects of the present invention may be described together with the construction of the invention.

DESCRIPTION OF DRAWINGS

FIG. 1 is a diagram showing a protocol stack according to an embodiment of the present invention.

FIG. 2 is a diagram showing a service discovery procedure according to an embodiment of the present invention.

FIG. 3 is a diagram showing a low level signaling (LLS) table and a service list table (SLT) according to an embodiment of the present invention.

FIG. 4 is a diagram showing a USBD and an S-TSID delivered through ROUTE according to an embodiment of the present invention.

FIG. 5 is a diagram showing a USBD delivered through MMT according to an embodiment of the present invention.

FIG. 6 is a diagram showing link layer operation according to an embodiment of the present invention.

FIG. 7 is a diagram showing a link mapping table (LMT) according to an embodiment of the present invention.

FIG. 8 illustrates a configuration of a broadcast signal transmission apparatus for future broadcast services according to an embodiment of the present invention.

FIG. 9 illustrates a write operation of a time interleaver according to an embodiment of the present invention.

FIG. 10 illustrates an interleaving address generator including a main pseudo-random binary sequence (PRBS) generator and a sub-PRBS generator according to each FFT mode which are included in a frequency interleaver according to an embodiment of the present invention.

FIG. 11 illustrates a configuration of a complex video component according to an embodiment of the present invention.

FIG. 12 illustrates a piece of PickOne video component according to an embodiment of the present invention.

FIG. 13 illustrates a complex video component according to an embodiment of the present invention.

FIG. 14 illustrates a complex audio component according to an embodiment of the present invention.

FIG. 15 illustrates a type of a broadcast service and a type of a component included in each type of service according to an embodiment.

FIG. 16 illustrates a relationship between a continuous component and components having sub-attributes of the continuous component according to an embodiment of the present invention.

FIG. 17 illustrates a contains relationship between a local cached item class and a local cached file class according to an embodiment of the present invention.

FIG. 18 illustrates an association among a presentable video component class, a presentable audio component class, and a presentable CC component class in a service including video according to an embodiment of the present invention.

FIG. 19 illustrates an inheritance relationship and a contains relationship among a service, a program, a show, a segment class, and the sub-classes thereof according to an embodiment of the present invention.

FIG. 20 illustrates LLS information according to an embodiment of the present invention.

FIG. 21 illustrates SLT information according to an embodiment of the present invention.

FIG. 22 illustrates path terms indicating signaling information requested through a broadband according to an embodiment of the present invention.

FIG. 23 illustrates types of signaling information requested through a broadband according to an embodiment of the present invention.

FIG. 24 illustrates a dynamic event for announcing unscheduled update regarding service signaling information according to an embodiment of the present invention.

FIG. 25 illustrates attributes of an AssetIdentifier element for a content ID according to an embodiment of the present invention.

FIG. 26 illustrates a method of providing a service guide including preview data by a broadcast system according to an embodiment of the present invention.

FIG. 27 illustrates a method of providing a service guide including preview data by a broadcast system according to another embodiment of the present invention.

FIG. 28 illustrates a method of providing a service guide including preview data by a broadcast system according to another embodiment of the present invention.

FIG. 29 illustrates a method for transmitting a broadcast signal (or a broadcast signal transmission method) according to an embodiment of the present invention.

FIG. 30 illustrates a broadcast signal transmitter and a broadcast signal receiver according to an embodiment of the present invention.

MODE FOR INVENTION

Reference will now be made in detail to the preferred embodiments of the present invention, examples of which are illustrated in the accompanying drawings. The detailed description, which will be given below with reference to the accompanying drawings, is intended to explain embodiments of the present invention, rather than to show the only embodiments that may be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings. Also, the term block and module are used similarly to indicate logical/functional unit of particular signal/data processing.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO or MIMO according to an embodiment. A non-MIMO scheme according to an embodiment of the present invention may include a multiple input single output (MISO) scheme, a single input single output (SISO) scheme, etc. The present invention proposes a physical profile (or system) optimized to minimize receiver complexity while attaining the performance required for a particular use case.

FIG. 1 is a diagram showing a protocol stack according to an embodiment of the present invention.

A service may be delivered to a receiver through a plurality of layers. First, a transmission side may generate service data. The service data may be processed for transmission at a delivery layer of the transmission side and the service data may be encoded into a broadcast signal and transmitted over a broadcast or broadband network at a physical layer.

Here, the service data may be generated in an ISO base media file format (BMFF). ISO BMFF media files may be used for broadcast/broadband network delivery, media encapsulation and/or synchronization format. Here, the service data is all data related to the service and may include service components configuring a linear service, signaling information thereof, non-real time (NRT) data and other files.

The delivery layer will be described. The delivery layer may provide a function for transmitting service data. The service data may be delivered over a broadcast and/or broadband network.

Broadcast service delivery may include two methods.

As a first method, service data may be processed in media processing units (MPUs) based on MPEG media transport (MMT) and transmitted using an MMT protocol (MMTP). In this case, the service data delivered using the MMTP may include service components for a linear service and/or service signaling information thereof.

As a second method, service data may be processed into DASH segments and transmitted using real time object delivery over unidirectional transport (ROUTE), based on MPEG DASH. In this case, the service data delivered through the ROUTE protocol may include service components for a linear service, service signaling information thereof and/or NRT data. That is, the NRT data and non-timed data such as files may be delivered through ROUTE.

Data processed according to MMTP or ROUTE protocol may be processed into IP packets through a UDP/IP layer. In service data delivery over the broadcast network, a service list table (SLT) may also be delivered over the broadcast network through a UDP/IP layer. The SLT may be delivered in a low level signaling (LLS) table. The SLT and LLS table will be described later.

IP packets may be processed into link layer packets in a link layer. The link layer may encapsulate various formats of data delivered from a higher layer into link layer packets and then deliver the packets to a physical layer. The link layer will be described later.

In hybrid service delivery, at least one service element may be delivered through a broadband path. In hybrid service delivery, data delivered over broadband may include service components of a DASH format, service signaling information thereof and/or NRT data. This data may be processed through HTTP/TCP/IP and delivered to a physical layer for broadband transmission through a link layer for broadband transmission.

The physical layer may process the data received from the delivery layer (higher layer and/or link layer) and transmit the data over the broadcast or broadband network. A detailed description of the physical layer will be given later.

The service will be described. The service may be a collection of service components displayed to a user, the components may be of various media types, the service may be continuous or intermittent, the service may be real time or non-real time, and a real-time service may include a sequence of TV programs.

The service may have various types. First, the service may be a linear audio/video or audio service having app based enhancement. Second, the service may be an app based service, reproduction/configuration of which is controlled by a downloaded application. Third, the service may be an ESG service for providing an electronic service guide (ESG). Fourth, the service may be an emergency alert (EA) service for providing emergency alert information.

When a linear service without app based enhancement is delivered over the broadcast network, the service component may be delivered by (1) one or more ROUTE sessions or (2) one or more MMTP sessions.

When a linear service having app based enhancement is delivered over the broadcast network, the service component may be delivered by (1) one or more ROUTE sessions or (2) zero or more MMTP sessions. In this case, data used for app based enhancement may be delivered through a ROUTE session in the form of NRT data or other files. In an embodiment of the present invention, simultaneous delivery of linear service components (streaming media components) of one service using two protocols may not be allowed.

When an app based service is delivered over the broadcast network, the service component may be delivered by one or more ROUTE sessions. In this case, the service data used for the app based service may be delivered through the ROUTE session in the form of NRT data or other files.

Some service components of such a service, some NRT data, files, etc. may be delivered through a broadband (hybrid service delivery).

That is, in an embodiment of the present invention, linear service components of one service may be delivered through the MMT protocol. In another embodiment of the present invention, the linear service components of one service may be delivered through the ROUTE protocol. In another embodiment of the present invention, the linear service components of one service and NRT data (NRT service components) may be delivered through the ROUTE protocol. In another embodiment of the present invention, the linear service components of one service may be delivered through the MMT protocol and the NRT data (NRT service components) may be delivered through the ROUTE protocol. In the above-described embodiments, some service components of the service or some NRT data may be delivered through a broadband. Here, the app based service and data regarding app based enhancement may be delivered over the broadcast network according to ROUTE or through a broadband in the form of NRT data. NRT data may be referred to as locally cached data.

Each ROUTE session includes one or more LCT sessions for wholly or partially delivering content components configuring the service. In streaming service delivery, the LCT session may deliver individual components of a user service, such as audio, video or closed caption stream. The streaming media is formatted into a DASH segment.

Each MMTP session includes one or more MMTP packet flows for delivering all or some of content components or an MMT signaling message. The MMTP packet flow may deliver a component formatted into MPU or an MMT signaling message.

For delivery of an NRT user service or system metadata, the LCT session delivers a file based content item. Such content files may include consecutive (timed) or discrete (non-timed) media components of the NRT service or metadata such as service signaling or ESG fragments. System metadata such as service signaling or ESG fragments may be delivered through the signaling message mode of the MMTP.

A receiver may detect a broadcast signal while a tuner tunes to frequencies. The receiver may extract and send an SLT to a processing module. The SLT parser may parse the SLT and acquire and store data in a channel map. The receiver may acquire and deliver bootstrap information of the SLT to a ROUTE or MMT client. The receiver may acquire and store an SLS. USBD may be acquired and parsed by a signaling parser.

FIG. 2 is a diagram showing a service discovery procedure according to an embodiment of the present invention.

A broadcast stream delivered by a broadcast signal frame of a physical layer may carry low level signaling (LLS). LLS data may be carried through payload of IP packets delivered to a well-known IP address/port. This LLS may include an SLT according to type thereof. The LLS data may be formatted in the form of an LLS table. A first byte of every UDP/IP packet carrying the LLS data may be the start of the LLS table. Unlike the shown embodiment, an IP stream for delivering the LLS data may be delivered to a PLP along with other service data.

The SLT may enable the receiver to generate a service list through fast channel scan and provides access information for locating the SLS. The SLT includes bootstrap information. This bootstrap information may enable the receiver to acquire service layer signaling (SLS) of each service. When the SLS, that is, service signaling information, is delivered through ROUTE, the bootstrap information may include an LCT channel carrying the SLS, a destination IP address of a ROUTE session including the LCT channel and destination port information. When the SLS is delivered through the MMT, the bootstrap information may include a destination IP address of an MMTP session carrying the SLS and destination port information.

In the shown embodiment, the SLS of service #1 described in the SLT is delivered through ROUTE and the SLT may include bootstrap information sIP1, dIP1 and dPort1 of the ROUTE session including the LCT channel delivered by the SLS. The SLS of service #2 described in the SLT is delivered through MMT and the SLT may include bootstrap information sIP2, dIP2 and dPort2 of the MMTP session including the MMTP packet flow delivered by the SLS.

The SLS is signaling information describing the properties of the service and may include receiver capability information for significantly reproducing the service or providing information for acquiring the service and the service component of the service. When each service has separate service signaling, the receiver acquires appropriate SLS for a desired service without parsing all SLSs delivered within a broadcast stream.

When the SLS is delivered through the ROUTE protocol, the SLS may be delivered through a dedicated LCT channel of a ROUTE session indicated by the SLT. In some embodiments, this LCT channel may be an LCT channel identified by tsi=0. In this case, the SLS may include a user service bundle description (USBD)/user service description (USD), service-based transport session instance description (S-TSID) and/or media presentation description (MPD).

Here, USBD/USD is one of SLS fragments and may serve as a signaling hub describing detailed description information of a service. The USBD may include service identification information, device capability information, etc. The USBD may include reference information (URI reference) of other SLS fragments (S-TSID, MPD, etc.). That is, the USBD/USD may reference the S-TSID and the MPD. In addition, the USBD may further include metadata information for enabling the receiver to decide a transmission mode (broadcast/broadband network). A detailed description of the USBD/USD will be given below.

The S-TSID is one of SLS fragments and may provide overall session description information of a transport session carrying the service component of the service. The S-TSID may provide the ROUTE session through which the service component of the service is delivered and/or transport session description information for the LCT channel of the ROUTE session. The S-TSID may provide component acquisition information of service components associated with one service. The S-TSID may provide mapping between DASH representation of the MPD and the tsi of the service component. The component acquisition information of the S-TSID may be provided in the form of the identifier of the associated DASH representation and tsi and may or may not include a PLP ID in some embodiments. Through the component acquisition information, the receiver may collect audio/video components of one service and perform buffering and decoding of DASH media segments. The S-TSID may be referenced by the USBD as described above. A detailed description of the S-TSID will be given below.

The MPD is one of SLS fragments and may provide a description of DASH media presentation of the service. The MPD may provide a resource identifier of media segments and provide context information within the media presentation of the identified resources. The MPD may describe DASH representation (service component) delivered over the broadcast network and describe additional DASH presentation delivered over broadband (hybrid delivery). The MPD may be referenced by the USBD as described above.

When the SLS is delivered through the MMT protocol, the SLS may be delivered through a dedicated MMTP packet flow of the MMTP session indicated by the SLT. In some embodiments, the packet_id of the MMTP packets delivering the SLS may have a value of 00. In this case, the SLS may include a USBD/USD and/or MMT packet (MP) table.

Here, the USBD is one of SLS fragments and may describe detailed description information of a service as in ROUTE. This USBD may include reference information (URI information) of other SLS fragments. The USBD of the MMT may reference an MP table of MMT signaling. In some embodiments, the USBD of the MMT may include reference information of the S-TSID and/or the MPD. Here, the S-TSID is for NRT data delivered through the ROUTE protocol. Even when a linear service component is delivered through the MMT protocol, NRT data may be delivered via the ROUTE protocol. The MPD is for a service component delivered over broadband in hybrid service delivery. The detailed description of the USBD of the MMT will be given below.

The MP table is a signaling message of the MMT for MPU components and may provide overall session description information of an MMTP session carrying the service component of the service. In addition, the MP table may include a description of an asset delivered through the MMTP session. The MP table is streaming signaling information for MPU components and may provide a list of assets corresponding to one service and location information (component acquisition information) of these components. The detailed description of the MP table may be defined in the MMT or modified. Here, the asset is a multimedia data entity, is combined by one unique ID, and may mean a data entity used to one multimedia presentation. The asset may correspond to service components configuring one service. A streaming service component (MPU) corresponding to a desired service may be accessed using the MP table. The MP table may be referenced by the USBD as described above.

The other MMT signaling messages may be defined. Additional information associated with the service and the MMTP session may be described by such MMT signaling messages.

The ROUTE session is identified by a source IP address, a destination IP address and a destination port number. The LCT session is identified by a unique transport session identifier (TSI) within the range of a parent ROUTE session. The MMTP session is identified by a destination IP address and a destination port number. The MMTP packet flow is identified by a unique packet_id within the range of a parent MMTP session.

In case of ROUTE, the S-TSID, the USBD/USD, the MPD or the LCT session delivering the same may be referred to as a service signaling channel. In case of MMTP, the USBD/UD, the MMT signaling message or the packet flow delivering the same may be referred to as a service signaling channel.

Unlike the shown embodiment, one ROUTE or MMTP session may be delivered over a plurality of PLPs. That is, one service may be delivered through one or more PLPs. Unlike the shown embodiment, in some embodiments, components configuring one service may be delivered through different ROUTE sessions. In addition, in some embodiments, components configuring one service may be delivered through different MMTP sessions. In some embodiments, components configuring one service may be divided and delivered in a ROUTE session and an MMTP session. Although not shown, components configuring one service may be delivered through a broadband (hybrid delivery).

FIG. 3 is a diagram showing a low level signaling (LLS) table and a service list table (SLT) according to an embodiment of the present invention.

An embodiment t3010 of the LLS table may include information according to an LLS_table_id field, a provider_id field, an LLS_table version field and/or an LLS_table_id field.

The LLS_table_id field may identify the type of the LLS_table, and the provider_id field may identify a service provider associated with services signaled by the LLS_table. Here, the service provider is a broadcaster using all or some of the broadcast streams and the provider_id field may identify one of a plurality of broadcasters which is using the broadcast streams. The LLS_table version field may provide the version information of the LLS_table.

According to the value of the LLS_table_id field, the LLS_table may include one of the above-described SLT, a rating region table (RRT) including information on a content advisory rating, SystemTime information for providing information associated with a system time, a common alert protocol (CAP) message for providing information associated with emergency alert. In some embodiments, the other information may be included in the LLS_table.

An embodiment t3020 of the shown SLT may include an @bsid attribute, an @sltCapabilities attribute, an sltInetUrl element and/or a Service element. Each field may be omitted according to the value of the shown Use column or a plurality of fields may be present.

The @bsid attribute may be the identifier of a broadcast stream. The @sltCapabilities attribute may provide capability information required to decode and significantly reproduce all services described in the SLT. The sltInetUrl element may provide base URL information used to obtain service signaling information and ESG for the services of the SLT over broadband. The sltInetUrl element may further include an @urlType attribute, which may indicate the type of data capable of being obtained through the URL.

The Service element may include information on services described in the SLT, and the Service element of each service may be present. The Service element may include an @serviceId attribute, an @sltSvcSeqNum attribute, an @protected attribute, an @majorChannelNo attribute, an @minorChannelNo attribute, an @serviceCategory attribute, an @shortServiceName attribute, an @hidden attribute, an @broadbandAccessRequired attribute, an @svcCapabilities attribute, a BroadcastSvcSignaling element and/or an svcInetUrl element.

The @serviceId attribute is the identifier of the service and the @sltSvcSeqNum attribute may indicate the sequence number of the SLT information of the service. The @protected attribute may indicate whether at least one service component necessary for significant reproduction of the service is protected. The @majorChannelNo attribute and the @minorChannelNo attribute may indicate the major channel number and minor channel number of the service, respectively.

The @serviceCategory attribute may indicate the category of the service. The category of the service may include a linear A/V service, a linear audio service, an app based service, an ESG service, an EAS service, etc. The @shortServiceName attribute may provide the short name of the service. The @hidden attribute may indicate whether the service is for testing or proprietary use. The @broadbandAccessRequired attribute may indicate whether broadband access is necessary for significant reproduction of the service. The @svcCapabilities attribute may provide capability information necessary for decoding and significant reproduction of the service.

The BroadcastSvcSignaling element may provide information associated with broadcast signaling of the service.

This element may provide information such as location, protocol and address with respect to signaling over the broadcast network of the service. Details thereof will be described below.

The svcInetUrl element may provide URL information for accessing the signaling information of the service over broadband. The sltInetUrl element may further include an @urlType attribute, which may indicate the type of data capable of being obtained through the URL.

The above-described BroadcastSvcSignaling element may include an @slsProtocol attribute, an @slsMajorProtocolVersion attribute, an @slsMinorProtocolVersion attribute, an @slsPlpId attribute, an @slsDestinationIpAddress attribute, an @slsDestinationUdpPort attribute and/or an @slsSourceIpAddress attribute.

The @slsProtocol attribute may indicate the protocol used to deliver the SLS of the service (ROUTE, MMT, etc.). The @slsMajorProtocolVersion attribute and the @slsMinorProtocolVersion attribute may indicate the major version number and minor version number of the protocol used to deliver the SLS of the service, respectively.

The @slsPlpId attribute may provide a PLP identifier for identifying the PLP delivering the SLS of the service. In some embodiments, this field may be omitted and the PLP information delivered by the SLS may be checked using a combination of the information of the below-described LMT and the bootstrap information of the SLT.

The @slsDestinationIpAddress attribute, the @slsDestinationUdpPort attribute and the @slsSourceIpAddress attribute may indicate the destination IP address, destination UDP port and source IP address of the transport packets delivering the SLS of the service, respectively. These may identify the transport session (ROUTE session or MMTP session) delivered by the SLS. These may be included in the bootstrap information.

FIG. 4 is a diagram showing a USBD and an S-TSID delivered through ROUTE according to an embodiment of the present invention.

An embodiment t4010 of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, an @serviceStatus attribute, an @fullMPDUri attribute, an @sTSIDUri attribute, a name element, a serviceLanguage element, a capabilityCode element and/or a deliveryMethod element. Each field may be omitted according to the value of the shown Use column or a plurality of fields may be present.

The @globalServiceID attribute is the globally unique identifier of the service and may be used for link with ESG data (Service@globalServiceID). The @serviceId attribute is a reference corresponding to the service entry of the SLT and may be equal to the service ID information of the SLT. The @serviceStatus attribute may indicate the status of the service. This field may indicate whether the service is active or inactive.

The @fullMPDUri attribute may reference the MPD fragment of the service. The MPD may provide a reproduction description of a service component delivered over the broadcast or broadband network as described above. The @sTSIDUri attribute may reference the S-TSID fragment of the service. The S-TSID may provide parameters associated with access to the transport session carrying the service as described above.

The name element may provide the name of the service. This element may further include an slang attribute and this field may indicate the language of the name provided by the name element. The serviceLanguage element may indicate available languages of the service. That is, this element may arrange the languages capable of being provided by the service.

The capabilityCode element may indicate capability or capability group information of a receiver necessary to significantly reproduce the service. This information is compatible with capability information format provided in service announcement.

The deliveryMethod element may provide transmission related information with respect to content accessed over the broadcast or broadband network of the service. The deliveryMethod element may include a broadcastAppService element and/or a unicastAppService element. Each of these elements may have a basePattern element as a sub element.

The broadcastAppService element may include transmission associated information of the DASH representation delivered over the broadcast network. The DASH representation may include media components over all periods of the service presentation.

The basePattern element of this element may indicate a character pattern used for the receiver to perform matching with the segment URL. This may be used for a DASH client to request the segments of the representation. Matching may imply delivery of the media segment over the broadcast network.

The unicastAppService element may include transmission related information of the DASH representation delivered over broadband. The DASH representation may include media components over all periods of the service media presentation.

The basePattern element of this element may indicate a character pattern used for the receiver to perform matching with the segment URL. This may be used for a DASH client to request the segments of the representation. Matching may imply delivery of the media segment over broadband.

An embodiment t4020 of the shown S-TSID may have an S-TSID root element. The S-TSID root element may include an @serviceId attribute and/or an RS element. Each field may be omitted according to the value of the shown Use column or a plurality of fields may be present.

The @serviceId attribute is the identifier of the service and may reference the service of the USBD/USD. The RS element may describe information on ROUTE sessions through which the service components of the service are delivered. According to the number of ROUTE sessions, a plurality of elements may be present. The RS element may further include an @bsid attribute, an @sIpAddr attribute, an @dIpAddr attribute, an @dport attribute, an @PLPID attribute and/or an LS element.

The @bsid attribute may be the identifier of a broadcast stream in which the service components of the service are delivered. If this field is omitted, a default broadcast stream may be a broadcast stream including the PLP delivering the SLS of the service. The value of this field may be equal to that of the @bsid attribute.

The @sIpAddr attribute, the @dIpAddr attribute and the @dport attribute may indicate the source IP address, destination IP address and destination UDP port of the ROUTE session, respectively. When these fields are omitted, the default values may be the source address, destination IP address and destination UDP port values of the current ROUTE session delivering the SLS, that is, the S-TSID.

This field may not be omitted in another ROUTE session delivering the service components of the service, not in the current ROUTE session.

The @PLPID attribute may indicate the PLP ID information of the ROUTE session. If this field is omitted, the default value may be the PLP ID value of the current PLP delivered by the S-TSID. In some embodiments, this field is omitted and the PLP ID information of the ROUTE session may be checked using a combination of the information of the below-described LMT and the IP address/UDP port information of the RS element.

The LS element may describe information on LCT channels through which the service components of the service are transmitted. According to the number of LCT channel, a plurality of elements may be present. The LS element may include an @tsi attribute, an @PLPID attribute, an @bw attribute, an @startTime attribute, an @endTime attribute, a SrcFlow element and/or a RepairFlow element.

The @tsi attribute may indicate the tsi information of the LCT channel. Using this, the LCT channels through which the service components of the service are delivered may be identified. The @PLPID attribute may indicate the PLP ID information of the LCT channel. In some embodiments, this field may be omitted. The @bw attribute may indicate the maximum bandwidth of the LCT channel. The @startTime attribute may indicate the start time of the LCT session and the @endTime attribute may indicate the end time of the LCT channel.

The SrcFlow element may describe the source flow of ROUTE. The source protocol of ROUTE is used to transmit a delivery object and at least one source flow may be established within one ROUTE session. The source flow may deliver associated objects as an object flow.

The RepairFlow element may describe the repair flow of ROUTE. Delivery objects delivered according to the source protocol may be protected according to forward error correction (FEC) and the repair protocol may define an FEC framework enabling FEC protection.

FIG. 5 is a diagram showing a USBD delivered through MMT according to an embodiment of the present invention.

An embodiment of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, a Name element, a serviceLanguage element, a contentAdvisoryRating element, a Channel element, a mpuComponent element, a routeComponent element, a broadbandComponent element and/or a ComponentInfo element. Each field may be omitted according to the value of the shown Use column or a plurality of fields may be present.

The @globalServiceID attribute, the @serviceId attribute, the Name element and/or the serviceLanguage element may be equal to the fields of the USBD delivered through ROUTE. The contentAdvisoryRating element may indicate the content advisory rating of the service. This information is compatible with content advisory rating information format provided in service announcement. The Channel element may include information associated with the service. A detailed description of this element will be given below.

The mpuComponent element may provide a description of service components delivered as the MPU of the service. This element may further include an @mmtPackageId attribute and/or an @nextMmtPackageId attribute. The @mmtPackageId attribute may reference the MMT package of the service components delivered as the MPU of the service. The @nextMmtPackageId attribute may reference an MMT package to be used after the MMT package referenced by the @mmtPackageId attribute in terms of time. Through the information of this element, the MP table may be referenced.

The routeComponent element may include a description of the service components of the service. Even when linear service components are delivered through the MMT protocol, NRT data may be delivered according to the ROUTE protocol as described above. This element may describe information on such NRT data. A detailed description of this element will be given below.

The broadbandComponent element may include the description of the service components of the service delivered over broadband. In hybrid service delivery, some service components of one service or other files may be delivered over broadband. This element may describe information on such data. This element may further an @fullMPDUri attribute. This attribute may reference the MPD describing the service component delivered over broadband. In addition to hybrid service delivery, the broadcast signal may be weakened due to traveling in a tunnel and thus this element may be necessary to support handoff between broadband and broadband. When the broadcast signal is weak, the service component is acquired over broadband and, when the broadcast signal becomes strong, the service component is acquired over the broadcast network to secure service continuity.

The ComponentInfo element may include information on the service components of the service. According to the number of service components of the service, a plurality of elements may be present. This element may describe the type, role, name, identifier or protection of each service component. Detailed information of this element will be described below.

The above-described Channel element may further include an @serviceGenre attribute, an @serviceIcon attribute and/or a ServiceDescription element. The @serviceGenre attribute may indicate the genre of the service and the @serviceIcon attribute may include the URL information of the representative icon of the service. The ServiceDescription element may provide the service description of the service and this element may further include an @serviceDescrText attribute and/or an @serviceDescrLang attribute. These attributes may indicate the text of the service description and the language used in the text.

The above-described routeComponent element may further include an @sTSIDUri attribute, an @sTSIDDestinationIpAddress attribute, an @sTSIDDestinationUdpPort attribute, an @sTSIDSourceIpAddress attribute, an @sTSIDMajorProtocolVersion attribute and/or an @sTSIDMinorProtocolVersion attribute.

The @sTSIDUri attribute may reference an S-TSID fragment. This field may be equal to the field of the USBD delivered through ROUTE. This S-TSID may provide access related information of the service components delivered through ROUTE. This S-TSID may be present for NRT data delivered according to the ROUTE protocol in a state of delivering linear service component according to the MMT protocol.

The @sTSIDDestinationIpAddress attribute, the @sTSIDDestinationUdpPort attribute and the @sTSIDSourceIpAddress attribute may indicate the destination IP address, destination UDP port and source IP address of the transport packets carrying the above-described S-TSID.

That is, these fields may identify the transport session (MMTP session or the ROUTE session) carrying the above-described S-TSID.

The @sTSIDMajorProtocolVersion attribute and the @sTSIDMinorProtocolVersion attribute may indicate the major version number and minor version number of the transport protocol used to deliver the above-described S-TSID, respectively.

The above-described ComponentInfo element may further include an @componentType attribute, an @componentRole attribute, an @componentProtectedFlag attribute, an @componentId attribute and/or an @componentName attribute.

The @componentType attribute may indicate the type of the component. For example, this attribute may indicate whether the component is an audio, video or closed caption component. The @componentRole attribute may indicate the role of the component. For example, this attribute may indicate main audio, music, commentary, etc. if the component is an audio component. This attribute may indicate primary video if the component is a video component. This attribute may indicate a normal caption or an easy reader type if the component is a closed caption component.

The @componentProtectedFlag attribute may indicate whether the service component is protected, for example, encrypted. The @componentId attribute may indicate the identifier of the service component. The value of this attribute may be the asset_id (asset ID) of the MP table corresponding to this service component. The @componentName attribute may indicate the name of the service component.

FIG. 6 is a diagram showing link layer operation according to an embodiment of the present invention.

The link layer may be a layer between a physical layer and a network layer. A transmission side may transmit data from the network layer to the physical layer and a reception side may transmit data from the physical layer to the network layer (t6010). The purpose of the link layer is to compress (abstract) all input packet types into one format for processing by the physical layer and to secure flexibility and expandability of an input packet type which is not defined yet. In addition, the link layer may provide option for compressing (abstracting) unnecessary information of the header of input packets to efficiently transmit input data. Operation such as overhead reduction, encapsulation, etc. of the link layer is referred to as a link layer protocol and packets generated using this protocol may be referred to as link layer packets. The link layer may perform functions such as packet encapsulation, overhead reduction and/or signaling transmission.

At the transmission side, the link layer (ALP) may perform an overhead reduction procedure with respect to input packets and then encapsulate the input packets into link layer packets. In addition, in some embodiments, the link layer may perform encapsulation into the link layer packets without performing the overhead reduction procedure. Due to use of the link layer protocol, data transmission overhead on the physical layer may be significantly reduced and the link layer protocol according to the present invention may provide IP overhead reduction and/or MPEG-2 TS overhead reduction.

When the shown IP packets are input as input packets (t6010), the link layer may sequentially perform IP header compression, adaptation and/or encapsulation. In some embodiments, some processes may be omitted. For example, the RoHC module may perform IP packet header compression to reduce unnecessary overhead. Context information may be extracted through the adaptation procedure and transmitted out of band. The IP header compression and adaption procedure may be collectively referred to as IP header compression. Thereafter, the IP packets may be encapsulated into link layer packets through the encapsulation procedure.

When MPEG 2 TS packets are input as input packets, the link layer may sequentially perform overhead reduction and/or an encapsulation procedure with respect to the TS packets. In some embodiments, some procedures may be omitted. In overhead reduction, the link layer may provide sync byte removal, null packet deletion and/or common header removal (compression). Through sync byte removal, overhead reduction of 1 byte may be provided per TS packet. Null packet deletion may be performed in a manner in which reinsertion is possible at the reception side. In addition, deletion (compression) may be performed in a manner in which common information between consecutive headers may be restored at the reception side. Some of the overhead reduction procedures may be omitted. Thereafter, through the encapsulation procedure, the TS packets may be encapsulated into link layer packets. The link layer packet structure for encapsulation of the TS packets may be different from that of the other types of packets.

First, IP header compression will be described.

The IP packets may have a fixed header format but some information necessary for a communication environment may be unnecessary for a broadcast environment. The link layer protocol may compress the header of the IP packet to provide a mechanism for reducing broadcast overhead.

IP header compression may employ a header compressor/decompressor and/or an adaptation module. The IP header compressor (RoHC compressor) may reduce the size of each IP packet header based on the RoHC scheme. Thereafter, the adaptation module may extract context information and generate signaling information from each packet stream. A receiver may parse signaling information associated with the packet stream and attach context information to the packet stream. The RoHC decompressor may restore the packet header to reconFIG. an original IP packet. Hereinafter, IP header compression may mean only IP header compression by a header compression or a combination of IP header compression and an adaptation process by an adaptation module. The same is true in decompressing.

Hereinafter, adaptation will be described.

In transmission of a single-direction link, when the receiver does not have context information, the decompressor cannot restore the received packet header until complete context is received. This may lead to channel change delay and turn-on delay. Accordingly, through the adaptation function, configuration parameters and context information between the compressor and the decompressor may be transmitted out of band. The adaptation function may provide construction of link layer signaling using context information and/or configuration parameters. The adaptation function may use previous configuration parameters and/or context information to periodically transmit link layer signaling through each physical frame.

Context information is extracted from the compressed IP packets and various methods may be used according to adaptation mode.

Mode #1 refers to a mode in which no operation is performed with respect to the compressed packet stream and an adaptation module operates as a buffer.

Mode #2 refers to a mode in which an IR packet is detected from a compressed packet stream to extract context information (static chain). After extraction, the IR packet is converted into an IR-DYN packet and the IR-DYN packet may be transmitted in the same order within the packet stream in place of an original IR packet.

Mode #3 (t6020) refers to a mode in which IR and IR-DYN packets are detected from a compressed packet stream to extract context information. A static chain and a dynamic chain may be extracted from the IR packet and a dynamic chain may be extracted from the IR-DYN packet. After extraction, the IR and IR-DYN packets are converted into normal compression packets. The converted packets may be transmitted in the same order within the packet stream in place of original IR and IR-DYN packets.

In each mode, the context information is extracted and the remaining packets may be encapsulated and transmitted according to the link layer packet structure for the compressed IP packets. The context information may be encapsulated and transmitted according to the link layer packet structure for signaling information, as link layer signaling.

The extracted context information may be included in a RoHC-U description table (RDT) and may be transmitted separately from the RoHC packet flow. Context information may be transmitted through a specific physical data path along with other signaling information. The specific physical data path may mean one of normal PLPs, a PLP in which low level signaling (LLS) is delivered, a dedicated PLP or an L1 signaling path. Here, the RDT may be context information (static chain and/or dynamic chain) and/or signaling information including information associated with header compression. In some embodiments, the RDT shall be transmitted whenever the context information is changed. In addition, in some embodiments, the RDT shall be transmitted every physical frame. In order to transmit the RDT every physical frame, the previous RDT may be reused.

The receiver may select a first PLP and first acquire signaling information of the SLT, the RDT, the LMT, etc., prior to acquisition of a packet stream. When signaling information is acquired, the receiver may combine the signaling information to acquire mapping between service—IP information—context information—PLP. That is, the receiver may check which service is transmitted in which IP streams or which IP streams are delivered in which PLP and acquire context information of the PLPs. The receiver may select and decode a PLP carrying a specific packet stream. The adaptation module may parse context information and combine the context information with the compressed packets. To this end, the packet stream may be restored and delivered to the RoHC decompressor. Thereafter, decompression may start. Here, the receiver may detect IR packets to start decompression from an initially received IR packet (mode 1), detect IR-DYN packets to start decompression from an initially received IR-DYN packet (mode 2) or start decompression from any compressed packet (mode 3).

Hereinafter, packet encapsulation will be described.

The link layer protocol may encapsulate all types of input packets such as IP packets, TS packets, etc. into link layer packets. To this end, the physical layer processes only one packet format independently of the protocol type of the network layer (here, an MPEG-2 TS packet is considered as a network layer packet). Each network layer packet or input packet is modified into the payload of a generic link layer packet.

In the packet encapsulation procedure, segmentation may be used. If the network layer packet is too large to be processed in the physical layer, the network layer packet may be segmented into two or more segments. The link layer packet header may include fields for segmentation of the transmission side and recombination of the reception side. Each segment may be encapsulated into the link layer packet in the same order as the original location.

In the packet encapsulation procedure, concatenation may also be used. If the network layer packet is sufficiently small such that the payload of the link layer packet includes several network layer packets, concatenation may be performed. The link layer packet header may include fields for performing concatenation. In concatenation, the input packets may be encapsulated into the payload of the link layer packet in the same order as the original input order.

The link layer packet may include a header and a payload. The header may include a base header, an additional header and/or an optional header. The additional header may be further added according to situation such as concatenation or segmentation and the additional header may include fields suitable for situations. In addition, for delivery of the additional information, the optional header may be further included. Each header structure may be pre-defined. As described above, if the input packets are TS packets, a link layer header having packets different from the other packets may be used.

Hereinafter, link layer signaling will be described.

Link layer signaling may operate at a level lower than that of the IP layer. The reception side may acquire link layer signaling faster than IP level signaling of the LLS, the SLT, the SLS, etc. Accordingly, link layer signaling may be acquired before session establishment.

Link layer signaling may include internal link layer signaling and external link layer signaling. Internal link layer signaling may be signaling information generated at the link layer. This includes the above-described RDT or the below-described LMT. External link layer signaling may be signaling information received from an external module, an external protocol or a higher layer. The link layer may encapsulate link layer signaling into a link layer packet and deliver the link layer packet. A link layer packet structure (header structure) for link layer signaling may be defined and link layer signaling information may be encapsulated according to this structure.

FIG. 7 is a diagram showing a link mapping table (LMT) according to an embodiment of the present invention.

The LMT may provide a list of higher layer sessions carried through the PLP. In addition, the LMT may provide additional information for processing link layer packets carrying the higher layer sessions. Here, the higher layer session may also be referred to as multicast. Information on IP streams or transport sessions transmitted through a specific PLP may be acquired through the LMT. In contrast, information on through which PLP a specific transport session is delivered may be acquired.

The LMT may be delivered in any PLP identified as carrying LLS. Here, the PLP in which the LLS is delivered may be identified by an LLS flag of L1 detail signaling information of a physical layer. The LLS flag may be a flag field indicating whether the LLS is delivered in the PLP, each PLP. Here, L1 detail signaling information may correspond to the below-described PLS2 data.

That is, the LMT may be delivered in the same PLP along with the LLS. Each LMT shall describe mapping between PLPs and IP addresses/ports as described above. As described above, the LLS may include an SLT and the IP address/port described in the LMT may be any IP address/port associated with any service described in the SLT delivered in the same PLP as the LMT. In some embodiments, the PLP identifier information in the above-described SLT, SLS, etc. may be used to confirm information indicating through which PLP a specific transport session indicated by the SLT or SLS is transmitted may be confirmed.

In another embodiment, the PLP identifier information in the above-described SLT, SLS, etc. will be omitted and PLP information of the specific transport session indicated by the SLT or SLS may be confirmed by referring to the information in the LMT. In this case, the receiver may combine the LMT and other IP level signaling information to identify the PLP. Even in this embodiment, the PLP information in the SLT, SLS, etc. is not omitted and may remain in the SLT, SLS, etc.

The LMT according to the shown embodiment may include a signaling_type field, a PLP_ID field, a num_session field and/or information on each session. Although the LMT of the shown embodiment describes IP streams transmitted through one PLP, a PLP loop may be added to the LMT to describe information on a plurality of PLPs in some embodiments. In this case, the LMT may describe, in a PLP loop, PLPs for any IP address/port associated with any service described in the SLT delivered together, as described above.

The signaling_type field may indicate the type of signaling information delivered by the table. The value of signaling_type field for the LMT may be set to 0x01. The signaling_type field may be omitted. The PLP_ID field may identify a target PLP to be described. If the PLP loop is used, each PLP_ID field may identify each target PLP. The PLP_ID field and subsequent fields thereof may be included in the PLP loop. The below-described PLP_ID field is an identifier for one PLP of the PLP loop and the below-described fields may be fields for the corresponding PLP.

The num_session field may indicate the number of higher layer sessions delivered through the PLP identified by the corresponding PLP_ID field.

According to the number indicated by the num_session field, information on each session may be included. This information may include a src_IP_add field, a dst_IP_add field, a src_UDP_port field, a dst_UDP_port field, an SID_flag field, a compressed_flag field, an SID field and/or a context_id field.

The src_IP_add field, the dst_IP_add field, the src_UDP_port field and the dst_UDP_port field may indicate the source IP address, the destination IP address, the source UDP port and the destination UDP port of the transport session among the higher layer sessions delivered through the PLP identified by the corresponding PLP_ID field.

The SID_flag field may indicate whether the link layer packet delivering the transport session has an SID field in the optional header. The link layer packet delivering the higher layer session may have an SID field in the optional header and the SID field value may be equal to that of the SID field in the LMT.

The compressed_flag field may indicate whether header compression is applied to the data of the link layer packet delivering the transport session. In addition, presence/absence of the below-described context_id field may be determined according to the value of this field. If header compression is applied (compressed_flag=1), the RDT may be present and the PLP ID field of the RDT may have the same value as the PLP_ID field associated with this compressed_flag field.

The SID field may indicate the SIDs (sub stream IDs) of the link layer packets delivering the transport session. These link layer packets may include SIDs having the same values as this SID field in the optional header thereof. To this end, the receiver may filter link layer packets using LMT information and the SID information of the link layer packet header, without parsing all link layer packets.

The context_id field may provide a reference for a context_id (CID) in the RDT. The CID information of the RDT may indicate the context ID of the compression IP packet stream. The RDT may provide context information of the compression IP packet stream. Through this field, the RDT and the LMT may be associated.

In the above-described embodiments of the signaling information/table of the present invention, the fields, elements or attributes may be omitted or may be replaced with other fields. In some embodiments, additional fields, elements or attributes may be added.

In an embodiment of the present invention, service components of one service may be delivered through a plurality of ROUTE sessions. In this case, an SLS may be acquired through bootstrap information of an SLT. An S-TSID and an MPD may be referenced through the USBD of the SLS. The S-TSID may describe not only the ROUTE session delivered by the SLS but also transport session description information of another ROUTE session carried by the service components. To this end, the service components delivered through the plurality of ROUTE sessions may all be collected. This is similarly applicable to the case in which the service components of one service are delivered through a plurality of MMTP sessions. For reference, one service component may be simultaneously used by the plurality of services.

In another embodiment of the present invention, bootstrapping of an ESG service may be performed by a broadcast or broadband network. By acquiring the ESG over broadband, URL information of the SLT may be used. ESG information may be requested using this URL.

In another embodiment of the present invention, one service component of one service may be delivered over the broadcast network and the other service component may be delivered over broadband (hybrid). The S-TSID may describe components delivered over the broadcast network such that the ROUTE client acquires desired service components. In addition, the USBD may have base pattern information to describe which segments (which components) are delivered through which path. Accordingly, the receiver may confirm a segment to be requested from the broadband service and a segment to be detected in a broadcast stream.

In another embodiment of the present invention, scalable coding of a service may be performed. The USBD may have all capability information necessary to render the service. For example, when one service is provided in HD or UHD, the capability information of the USBD may have a value of "HD or UHD".

The receiver may check which component is reproduced in order to render the UHD or HD service using the MPD.

In another embodiment of the present invention, through a TOI field of the LCT packets delivered through the LCT channel delivering the SLS, which SLS fragment is delivered using the LCT packets (USBD, S-TSID, MPD, etc.) may be identified.

In another embodiment of the present invention, app components to be used for app based enhancement/an app based service may be delivered over the broadcast network as NRT components or may be delivered over broadband. In addition, app signaling for app based enhancement may be performed by an application signaling table (AST) delivered along with the SLS. In addition, an event which is signaling for operation to be performed by the app may be delivered in the form of an event message table (EMT) along with the SLS, may be signaled in the MPD or may be in-band signaled in the form of a box within DASH representation. The AST, the EMT, etc. may be delivered over broadband. App based enhancement, etc. may be provided using the collected app components and such signaling information.

In another embodiment of the present invention, a CAP message may be included and provided in the above-described LLS table for emergency alert. Rich media content for emergency alert may also be provided. Rich media may be signaled by a CAP message and, if rich media is present, the rich media may be provided as an EAS service signaled by the SLT.

In another embodiment of the present invention, linear service components may be delivered over the broadcast network according to the MMT protocol. In this case, NRT data (e.g., app components) of the service may be delivered over the broadcast network according to the ROUTE protocol. In addition, the data of the service may be delivered over broadband. The receiver may access the MMTP session delivering the SLS using the bootstrap information of the SLT. The USBD of the SLS according to the MMT may reference the MP table such that the receiver acquires linear service components formatted into the MPU delivered according to the MMT protocol. In addition, the USBD may further reference the S-TSID such that the receiver acquires NRT data delivered according to the ROUTE protocol. In addition, the USBD may further reference the MPD to provide a reproduction description of data delivered over broadband.

In another embodiment of the present invention, the receiver may deliver location URL information capable of acquiring a file content item (file, etc.) and/or a streaming component to a companion device through a web socket method. The application of the companion device may acquire components, data, etc. through a request through HTTP GET using this URL. In addition, the receiver may deliver information such as system time information, emergency alert information, etc. to the companion device.

FIG. 8 illustrates a configuration of a broadcast signal transmission apparatus for future broadcast services according to an embodiment of the present invention.

The broadcast signal transmission apparatus for future broadcast services according to the present embodiment may include an input formatting block 1000, a bit interleaved coding & modulation (BICM) block 1010, a frame building block 1020, an OFDM generation block 1030 and a signaling generation block 1040. Description will be given of an operation of each block of the broadcast signal transmission apparatus.

In input data according to an embodiment of the present invention, IP stream/packets and MPEG2-TS may be main input formats, and other stream types are handled as general streams.

The input formatting block 1000 may demultiplex each input stream into one or a plurality of data pipes, to each of which independent coding and modulation are applied. A DP is the basic unit for robustness control, which affects QoS. One or a plurality of services or service components may be carried by one DP. The DP is a logical channel in a physical layer for delivering service data or related metadata capable of carrying one or a plurality of services or service components.

Since QoS depends on characteristics of a service provided by the broadcast signal transmission apparatus for future broadcast services according to the embodiment of the present invention, data corresponding to respective services needs to be processed using different schemes.

BICM block 1010 may include a processing block for a profile (or system) to which MIMO is not applied, and a processing block for a profile (or system) to which MIMO is applied and may comprise a plurality blocks for processing each Data Pipe.

A processing block of the BICM block to which MIMO is not applied may include a data FEC encoder, a bit interleaver, a constellation mapper, a signal space diversity (SSD) encoding block and a time interleaver. A processing block of the BICM block to which MIMO is applied may is distinguished from the processing block of the BICM block to which MIMO is not applied in that the processing block further includes a cell-word demultiplexer and a MIMO encoding block The data FEC encoder performs FEC encoding on an input BBF to generate FECBLOCK procedure using outer coding (BCH) and inner coding (LDPC). The outer coding (BCH) is optional coding method. The bit interleaver may interleave outputs of the data FEC encoder to achieve optimized performance with a combination of LDPC codes and a modulation scheme while providing an efficiently implementable structure. The constellation mapper may modulate each cell word from the bit interleaver or the cell-word demultiplexer in the advanced profile using either QPSK, QAM-16, non-uniform QAM (NUQ-64, NUQ-256, or NUQ-1024) or non-uniform constellation (NUC-16, NUC-64, NUC-256, or NUC-1024) mapping to give a power-normalized constellation point. This constellation mapping is applied only for DPs. It is observed that QAM-16 and NUQs are square shaped, while NUCs have arbitrary shapes. Both NUQs and NUCs are defined specifically for each code rate and the particular one used is signaled by the parameter DP_MOD field in the PLS2 data. The time interleaver may operates at a DP level. Parameters of time interleaving (TI) may be set differently for each DP. The time interleaver according to an embodiment of the present invention may be positioned between a BICM chain block and a frame builder.

Here, the time interleaver according to an embodiment of the present invention may use both a convolutional interleaver (CI) and a block interleaver (BI) or selectively using either the CI or the BI according to a physical layer pipe (PLP) mode. A PLP according to an embodiment of the present invention is a physical path corresponding to the same concept as that of the above-described DP, and a name of the PLP may be changed by a designer. A PLP mode according to an embodiment of the present invention may include a single PLP mode or a multi-PLP mode according to the number of PLPs processed by a broadcast signal transmitter or a broadcast signal transmission apparatus. In the present invention, time interleaving in which different time interleaving schemes are applied according to PLP modes may be referred to as hybrid time interleaving.

The hybrid time interleaver may include a BI and a CI. That is, when PLP_NUM=1, the BI is not applied (BI is turned OFF) and only the CI is applied. When PLP_NUM>1, both the BI and the CI may be applied (BI is turned ON). A structure and an operation of the CI applied when PLP_NUM>1 may be different from a case of PLP_NUM=1. The hybrid time deinterleaver may perform an operation corresponding to an inverse operation of the hybrid time interleaver described above.

The cell-word demultiplexer is used for dividing a single cell-word stream into dual cell-word streams for MIMO processing. The MIMO encoding block may process an output of the cell-word demultiplexer using a MIMO encoding scheme. The MIMO encoding scheme of the present invention may be defined as full-rate spatial multiplexing (FR-SM) to provide capacity increase with relatively small complexity increase at the receiver side. MIMO processing is applied at the DP level. NUQ (e1,i and e2,i) corresponding to a pair of constellation mapper outputs is fed to an input of a MIMO encoder and paired MIMO encoder output (g1,i and g2,i) is transmitted by the same carrier k and OFDM symbol I of respective TX antennas thereof.

The frame building block 1020 may map the data cells of the input DPs into the OFDM symbols within a frame, and perform frequency interleaving for frequency-domain diversity.

A frame according to an embodiment of the present invention is further divided into a preamble, one or more frame signaling symbols (FSSs), normal data symbols. The preamble provides a collection of basic transmission parameters for efficient transmission and reception of a signal. And the preamble indicates whether the emergency alert service (EAS) is provided in a current frame or not. A main purpose of the FSS is to carry PLS data. For fast synchronization and channel estimation, and hence fast decoding of PLS data, the FSS has a dense pilot pattern than a normal data symbol.

The frame building block 1020 may include a delay compensation block for adjusting timing between DPs and corresponding PLS data to ensure that the DPs and the corresponding PLS data are co-timed at a transmitter side, a cell mapper for mapping PLS, DPs, auxiliary streams, dummy cells, etc. to active carriers of the OFDM symbols in the frame and a frequency interleaver.

The frequency interleaver may randomly interleave data cells received from the cell mapper to provide frequency diversity. In addition, the frequency interleaver may operate on data corresponding to an OFDM symbol pair including two sequential OFDM symbols or an OFDM symbol using a different interleaving-seed order to obtain maximum interleaving gain in a single frame.

The OFDM generation block 1030 modulates OFDM carriers by cells produced by the frame building block, inserts pilots, and produces a time domain signal for transmission. In addition, this block subsequently inserts guard intervals, and applies peak-to-average power ratio (PAPR) reduction processing to produce a final RF signal.

The signaling generation block 1040 may create physical layer signaling information used for an operation of each functional block. Signaling information according to an embodiment of the present invention may include PLS data. The PLS data includes PLS1 data and PLS2 data.

The PLS1 data is a first set of PLS data carried in an FSS symbol in a frame having a fixed size, coding and modulation, which carries basic information about the system in addition to the parameters needed to decode the PLS2 data. The PLS1 data provides basic transmission parameters including parameters required to enable reception and decoding of the PLS2 data. In addition, the PLS1 data remains constant for the duration of a frame group. The PLS2 data is a second set of PLS data transmitted in an FSS symbol, which carries more detailed PLS data about the system and the DPs. The PLS2 contains parameters that provide sufficient information for the receiver to decode a desired DP. The PLS2 signaling further includes two types of parameters, PLS2 static data (PLS2-STAT data) and PLS2 dynamic data (PLS2-DYN data). The PLS2 static data is PLS2 data that remains static for the duration of a frame group and the PLS2 dynamic data is PLS2 data that dynamically changes frame by frame.

PLS2 data may include FIC_FLAG information. FIC (fast information channel) is a dedicated channel for carrying cross-layer information to enable fast service acquisition and channel scanning. FIC_FLAG is a 1-bit field and indicates whether the FIC is used in a current frame. If this field is set to '1', the FIC is provided in the current frame. If this field set to '0', the FIC is not carried in the current frame. The BICM block 1010 may include BICM block for protection of the PLS data including a PLS FEC encoder, a bit interleaver and a constellation mapper.

The PLS FEC encoder may include a scrambler for scrambling PLS1 data and PLS2 data, a BCH encoding/zero insertion block for outer encoding on the scrambled PLS 1,2 data using a shortened BCH code for PLS protection, and insert zero bits after BCH encoding, an LDPC encoding block for LDPC encoding using an LDPC code and an LDPC parity puncturing block. The bit interleaver may interleave each of shortened and punctured PLS1 data and PLS2 data. The constellation mapper may map the bit-interleaved PLS1 data and PLS2 data to constellations.

The broadcast signal reception apparatus for future broadcast services according to the embodiment of the present invention may correspond to the broadcast signal transmission apparatus for future broadcast services described with reference to FIG. 8.

The broadcast signal reception apparatus for future broadcast services according to the embodiment of the present invention may include a synchronization & demodulation module carrying out demodulation corresponding to a reverse procedure of a procedure performed by the broadcast signal transmission apparatus, a frame parsing module parsing input signal frames and extracting data through which a service selected by a user is transmitted, a demapping & decoding module which convert input signals into bit domain data and then deinterleave the same as necessary, perform demapping of mapping applied for transmission efficiency and correct an error generated on a transmission channel through decoding, an output processor performing reverse procedures of various compression/signal processing procedures which are applied by the broadcast signal transmission apparatus and a signaling decoding module obtaining PLS information from a signal demodulated by the synchronization & demodulation module. The frame parsing module, the demapping & decoding module and the output processor may execute functions thereof using data output from the signaling decoding module.

Hereinafter, time interleaver is described. According to an embodiment of the present invention, each TI group is either mapped directly to one frame or spread over PI frames. Each TI group is also divided into more than one TI block (N_TI), where each TI block corresponds to one usage of a time interleaver memory. The TI blocks within the TI group may contain slightly different numbers of XFECBLOCKs. Typically, the time interleaver may also function as a buffer for DP data prior to a process of frame building.

The Time interleaving according to an embodiment of the present invention is a twisted row-column block interleaver. The twisted row-column block interleaver according to an embodiment of the present invention may column-wise write a first XFECBLOCK into a first column of a TI memory, and a second XFECBLOCK into a next column, and so on). Then, in an interleaving array, cells are diagonal-wise read diagonal-wise from a first row (rightwards along a row beginning with a left-most column) to a last row, Nr cells are read out. Moreover, in order to achieve single-memory deinterleaving at a receiver side regardless of a number of XFECBLOCKs in a TI block the twisted row-column block interleaver may insert the virtual XFEC-BLOCKs into the TI memory. The virtual XFECBLOCKs must be inserted in front of other FECBLOCKS to achieve single-memory deinterleaving at a receiver side.

Figure 9:
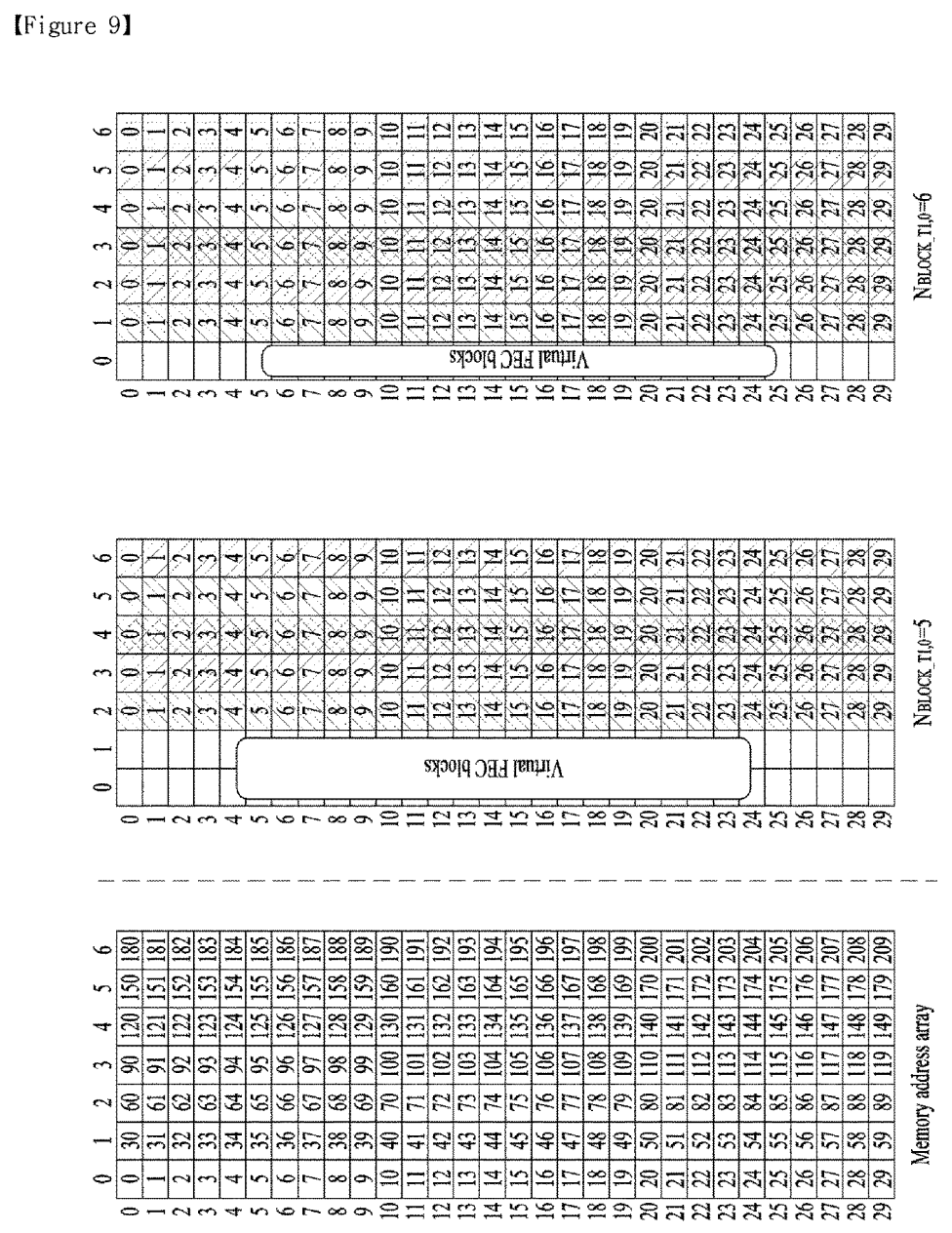

FIG. 9 illustrates a write operation of a time interleaver according to an embodiment of the present invention.

A left block in the FIG. illustrates a TI memory address array, and right blocks in the FIG. illustrate a write operation when two virtual FEC blocks and one virtual FEC block are inserted into heads of two contiguous TI groups, respectively.

The frequency interleaver according to the present embodiment may include an interleaving address generator for generating an interleaving address for applying corresponding data to a symbol pair.

FIG. 10 illustrates an interleaving address generator including a main pseudo-random binary sequence (PRBS) generator and a sub-PRBS generator according to each FFT mode which are included in a frequency interleaver according to an embodiment of the present invention.

(a) illustrates the block diagrams of the interleaving-address generator for 8 K FFT mode, (b) illustrates the block diagrams of the interleaving-address generator for 16 K FFT mode and (c) illustrates the block diagrams of the interleaving-address generator for 32 K FFT mode.

The interleaving process for the OFDM symbol pair is described as follows, exploiting a single interleaving-sequence. First, available data cells (the output cells from the Cell Mapper) to be interleaved in one OFDM symbol $O_{m,l}$ is defined as $O_{m,l}=[x_{m,l,0}, \ldots, x_{m,l,p}, \ldots, x_{m,l,Ndata-1}]$ for $l=0, \ldots, N_{sym}-1$, where $x_{m,l,p}$ is the $p^{th}$ cell of the $l^{th}$ OFDM symbol in the $m^{th}$ frame and $N_{data}$ is the number of data cells: $N_{data}=C_{FSS}$ for the frame signaling symbol(s), $N_{data}=C_{data}$ for the normal data, and $N_{data}=C_{FES}$ for the frame edge symbol. In addition, the interleaved data cells are defined as $P_{m,l}=[v_{m,l,0}, \ldots, v_{m,l,Ndata-1}]$ for $l=0, \ldots, N_{sym}-1$.

For the OFDM symbol pair, the interleaved OFDM symbol pair is given by $v_{m,l,Hi(p)}=X_{m,l,p}$, $p=0, \ldots, N_{data}-1$, for the first OFDM symbol of each pair, $v_{m,l,p}=X_{m,l,Hi(p)}$, $p=0, \ldots, N_{data}-1$ for the second OFDM symbol of each pair, where $H_l(p)$ is the interleaving address generated based on a PRBS generator and a cyclic shift value (symbol offset) of a sub-PRBS generator.

Hereinafter, broadcast services provided in a next generation broadcast system according to an embodiment of the present invention will be described. Specifically, a service conceptual model will be described.

In this disclosure, the service conceptual model is a logical model, and describes a configuration of a service element as a completed service. The model may provide an abstract description of an element realized by signaling, guide information, presentation information, and other normative elements of the corresponding standard. In addition, the model may not have a direct 1:1 correspondence with specific signaling or other data or media formats specified by that standard. Further, in this disclosure, the conceptual model may be more general than that realized by other normative elements of the standard.

A first principle of the model is that it contains components of services but does not contain information about sources of service components (i.e., how they are delivered). Handling components from various sources may belong to the realm of service delivery rather than the realm of the conceptual service model.

Hereinafter, the structural types and roles of components according to an embodiment of the present invention will be described. In this disclosure, a component may be referred to as a service component, a content component, or a media component, which constitutes a broadcast service.

In an embodiment, a component may include a continuous component, an elementary component, a composite component, a PickOne component, a complex component, a presentable component, a locally cashed file, a network content item, a notification stream, an application (or an app), an ATSC 3.0 application, a linear service, an app-based service, an app-based feature and/or data services. In an additional embodiment, the component may further include a download application component and/or a native application component. A description of each component is illustrated in Table 1 below.

TABLE 1

| | |
|---|---|
| Continuous Component | A Content Component that is presented in a continuous stream (e.g., audio, video or closed captioning). |
| Elementary Component | A Continuous Component that is a single encoding (e.g., a single encoding of a sound sequence, or a single encoding of a picture sequence, or a single closed caption track). |
| Composite Component | A Content Component that consists of a collection of Continuous Components which have the same Content type, and which represent the same scene, and which are to be combined in some combination to produce a presentation (e.g., music, dialog and effects audio components that are to be mixed to give complete audio, or left and right 3D views that are to be combined to give 3D pictures). |
| PickOne Component | A Content Component that consists of a collection of Continuous Components which have the same Content type, and which represent the same scene, and exactly one of which is to be selected to produce a presentation (e.g., a collection of audio components encoded from the same sound sequence with different bitrates, or a collection of video components encoded from the same picture sequence with different bit rates, or a regular closed caption track and an "easy reader" closed caption track for the same dialog). |
| Complex Component | Either a Composite Component or a PickOne Component |
| Presentable Component | A Continuous Component that is intended for presentation to the user. Such a component may be an Elementary Component or a Complex Component. |
| Locally Cached File | File that is delivered in non-real-time and stored on the device for later consumption; Locally Cached File is typically not consumed or presented until the it has been fully received and cached; Locally Cached file may be delivered via broadcast or broadband. |
| Locally Cached Content Item | A collection of one or more Locally Cached Files which are intended to be consumed as an integrated whole; a Locally Cached Content Item is typically not consumed or presented until the requisite Locally Cached Files have been fully received and cached. |
| Network Content Item | A Continuous Component (e.g., an audio/video clip) or a collection of one or more files (e.g., a slide show or a collection of inter-linked HTML pages) that is intended to be consumed as an integrated whole, and that is delivered on demand for immediate presentation. |

TABLE 1-continued

| | |
|---|---|
| | Network Content Items are delivered via broadband and are normally progressively presented prior to receiving the entire file(s). |
| Notification Stream | A stream of messages intended to be consumed by one or more Applications; the messages may instruct and notify the Application(s) to perform some action(s) at particular time(s) such as fetch updated sports stats, insert personalized content, etc. |
| Downloaded Application | A collection of downloaded documents constituting a self-contained function, such as providing interactivity or targeted ad insertion. The documents of an application may include HTML, JavaScript, CSS, XML and multimedia files. An application may access other data that are not part of the application itself. |
| Native Application | Software built in to a receiver to perform a function using downloaded data, such as Electronic Service Guide (ESG) or Emergency Alerting (EA). |
| Application or App | A collection of documents constituting a self-contained enhanced or interactive service. The documents of an application may include HTML, JavaScript, CSS, XML and multimedia files. An application may access other data that are not part of the application itself. An Application is a special case of a Locally Cached Content Item. |
| ATSC 3.0 Application | Application conforming to the ATSC 3.0 Application Runtime Environment Specification. |
| Linear Service | A Service where the primary content consists of Continuous Components that are delivered according to a schedule and time base defined by the broadcast. |
| App-based Service | A Service that consists of one or more App-based Features. |
| App-based Feature | One or more Applications with zero or more Notification Streams, and zero or more Locally Cached Content Items and/or Network Content Items, intended to enhance a Linear Service or form the basis of an App-based Service. |
| Data Service | A Service that is not directly visible to viewers where the primary content consists of Non-Continuous Components delivered in non-real time and signaled in a standardized manner such that a receiving device may utilize the Components in a meaningful way. (Note that there are currently two types of Data Services defined: delivering Electronic Service Guide (ESG) data and Emergency Alert System (EAS) data.) |

The continuous component may be a content component that is presented in a continuous stream (e.g., audio, video, or closed captioning).

The elementary component may be a continuous component that is a single encoding (e.g., a single encoding of a sound sequence, or a single encoding of a picture sequence, or a single closed caption track).

The composite component may be a content component that consists of a collection of continuous components which have the same content type, and which represent the same scene, and which are to be combined in some combination to produce a presentation (e.g., music, dialog and effects audio components that are to be mixed to give complete audio, or left and right 3D views that are to be combined to give 3D pictures).

The PickOne component may be a content component that consists of a collection of continuous components which have the same Content type, and which represent the same scene, and exactly one of which is to be selected to produce a presentation (e.g., a collection of audio components encoded from the same sound sequence with different bitrates, or a collection of video components encoded from the same picture sequence with different bit rates, or a regular closed caption track and an "easy reader" closed caption track for the same dialog).

The complex component may be either a composite component or a PickOne component.

The presentable component may be a continuous component that is intended for presentation to the user. Such a component can be an Elementary Component or a Complex Component.

The locally cashed file may be a file that is delivered in non-real-time and stored on the device for later consumption, locally cached file is typically not consumed or presented until the it has been fully received and cached, locally cached file can be delivered via broadcast or broadband.

The locally cashed content item may be a collection of one or more locally cached files which are intended to be consumed as an integrated whole, a locally cached content Item is typically not consumed or presented until the requisite locally cached files have been fully received and cached.

The network content item may be a continuous component (e.g., an audio/video clip) or a collection of one or more files (e.g., a slide show or a collection of inter-linked HTML pages) that is intended to be consumed as an integrated whole, and that is delivered on demand for immediate presentation. Network content Items are delivered via broadband and are normally progressively presented prior to receiving the entire file(s).

The notification stream may be a stream of messages intended to be consumed by one or more Applications; the messages may instruct and notify the application(s) to perform some action(s) at particular time(s) such as fetch updated sports stats, insert personalized content, etc.

The download application may be a collection of downloaded documents constituting a self-contained function, such as providing interactivity or targeted ad insertion. The documents of an application can include HTML, JavaScript, CSS, XML and multimedia files. An application can access other data that are not part of the application itself.

The native application may be software built in to a receiver to perform a function using downloaded data, such as electronic service guide (ESG) or emergency alerting (EA).

In this disclosure, the download application and the native application may be collectively referred to as an application to be described below.

The application (or an app) may be a collection of documents constituting a self-contained enhanced or interactive service. The documents of an application can include HTML, JavaScript, CSS, XML and multimedia files. An application can access other data that are not part of the application itself. An application is a special case of a locally cached content item.

The ATSC 3.0 application may be an application conforming to the ATSC 3.0 application runtime environment specification.

The linear service may be a service where the primary content consists of continuous components that are delivered according to a schedule and time base defined by the broadcast.

The App-based service may be a service that consists of one or more App-based Features.

The app-based feature may be one or more applications with zero or more notification streams, and zero or more locally cached content Items and/or network content items, intended to enhance a linear service or form the basis of an app-based Service.

The data service may be a service that is not directly visible to viewers where the primary content consists of non-continuous components delivered in non-real time and signaled in a standardized way such that a receiving device may utilize the components in a meaningful way. (Note that there are currently two types of data services defined: delivering electronic service guide (ESG) data and emergency alert system (EAS) data).

In this disclosure, the content component included in the complex component may not be an essential elementary component. Some or all of them may themselves be complex components.

The elementary components may not necessarily be suitable for presentation by themselves. This component may be combined with other content component for meaningful presentation. This example may be an enhancement layer of scalable video encoding.

A component may itself be a presentable component and may also be a member of a complex component. For example, a service may have video encoding intended to be presented as a view of an elementary 2D video component itself or a complex 3D video component.

The composite component may be considered as a list of content components with a check box next to each. A receiver may select a subset of these content components to be combined for creation of a presentation. Similarly, the PickOne component may be considered as a list of content components with radio buttons next to each. The receiver must accurately select one of these content components to be used for creation of a presentation (this analogy may not be accurate. There may be restrictions on the combination of check boxes that may be checked in the composite component. For example, considering scalable video coding having a base layer and two enhancement layers, the possible selections may be the base layer itself, the base layer and a first enhancement layer, or all three layers).

FIG. 11 illustrates a configuration of a complex video component according to an embodiment of the present invention.

Referring to FIG. 11, a complex video component may include a base layer and two layers of scalable video coding. In an embodiment, scalable video coding may include a base layer component, a first enhancement layer component, and a second enhancement layer component, which are elementary components. In this case, the base layer component may be a component which may be presented without the first enhancement layer component and the second enhancement layer component, and the first enhancement layer component and the second enhancement layer component may be components which are impossible to present without the base layer component.

The receiver may present a low quality picture with the base layer component itself, present a better quality picture by combining the base layer component and the first enhancement layer component, or present a high quality picture by combining both all the base layer and enhancement layer components, depending on receiver capabilities and elementary components that may be received.

FIG. 12 illustrates a PickOne video component according to an embodiment of the present invention.

Referring to FIG. 12, a PickOne video component may include 2D encoding of the same video scene and side-by-side 3D encoding. Here, the 3D encoding consists of a left 3D view and a right 3D view, each of which is a half a normal image width and is juxtaposed side by side so as to be encoded as one picture. The receiver may decode the picture, stretch each to return to a half of its normal size, and feed them as left and right views to a 3D display circuit.

In an embodiment, the receiver may selectively reproduce either 2D encoding or 3D encoding according to performance of the receiver. For example, the receiver may select 2D encoding according to performance thereof and present it as a 2D picture or may select 3D encoding according to performance thereof and present it as a 3D picture.

With these definitions, a service may be described through presentable components included therein. If any of these presentable components are complex components, they may be described through their members (recursively described, etc., if necessary). Each presentable audio component may represent a sound for a specific scene in a specific language, and each presentable video component may represent a picture for a specific scene with a specific camera angle. In a simple case, such as ATSC 1.0, these may be just elementary components.

FIG. 13 illustrates a complex video component according to an embodiment of the present invention.

As a more complex example of a complex component, a presentable video component may be a composite component including a left view component and a right view component of 3D video. Each of these view components may resultantly be a PickOne component including encodings at different resolutions. FIG. 13 illustrates this example.

FIG. 14 illustrates a complex audio component according to an embodiment of the present invention.

Similarly, the presentable audio component may be a component including a PickOne component including a completed main component and a component including unmixed music, dialogue, and effects. The completed main audio component and music component may be a PickOne component including an elementary component consisting of encoding at different bit rates, while the dialogue and effect components may be elementary components (as used in ATSC A/52 and A/53). FIG. 14 illustrates this example.

A model based on the above definitions may contain all the features required in a broadcast system (e.g., ATSC 3.0 system) according to an embodiment of the present invention. This model may be very simple in simple situations and may have a straightforward hierarchical structure in more complex situations.

This approach may considerably simplify a certain part of the service model. It may also provide a simpler picture in which a service directly lists only the presentable components of the service and then hierarchically lists member components of a certain complex component.

In order to bind possible unbounded iterations of a component model, the following restrictions are imposed: A certain continuous component must be adjusted to layers of three levels. Here, an upper level is composed of PickOne components, a middle level is composed of composite components, and a lower level is composed of the PickOne components. Certain specific continuous components may include certain three subsets thereof including all three levels and a null subset in which a continuous component is simply an elementary component. This is the same as that illustrated in FIG. 12.

When the types and roles of the components (or content components) are defined in this manner, the relationship and structure of the components included in the service may be efficiently and simply explained. Accordingly, a transmitter (e.g., a broadcast transmitting apparatus) may efficiently and simply signal a service using the same, and a receiver (e.g., a broadcast receiving apparatus) may efficiently and simply acquire information signaling a service using the same.

Next, various types of broadcast services (for example, ATSC 3.0 service) defined in a service conceptual model according to an embodiment of the present invention will be described.

The following two types of broadcast service may be defined in the service conceptual model and have presently defined presentable content components thereof as indicated.

(1) Linear service: A service in which primary content includes continuous components that are consumed according to a schedule and a time base defined by broadcast (except that various types of time-shifted viewing mechanism may be used by a consumer to shift consumption times)

A component of the linear service may include the following.

One or more continuous components that may include video, audio, and closed caption Time base used to synchronize a component Zero or more app-based enhancements (or app-based features). A component of these enhancements (or features) may include the following:

1) One or more applications
2) Stream of one or more activation notifications (or zero or more notification streams)
3) Zero or more locally cached content items (excluding an application as a special case of the locally cached content items)
4) Zero or more network content items Optionally, one of the applications in the app-based enhancement (or feature) may be designated as a "primary app". If there is a designated primary app, it may be activated as soon as an underlying service is selected. In an embodiment, other applications may be activated by notifications in a notification stream In an embodiment, an application in the app-based enhancement may be a download application intended to be run in the ATSC 3.0 runtime environment or may be a native application as part of a built-in receiver code.

(2) App-based service: A component of a non-linear service based on an application that provides functions of a user interface and a service. A component of the app-based service may include the following:

At least one app-based enhancement (or feature) having a limitation that at least one app-based enhancement (or feature) in the app-based service should include a designated primary app.

Optional time base that may be used to support a timed action

Zero or more notification streams

Two examples of app-based services based on native applications include an ESG service for delivering ESG data to be used by a program guide application or an EAS service for delivering rich media information for an emergency alert application to supplement emergency alert. If the EAS or ESG data service is present in a broadcast stream, the native application may be automatically activated to process a data file when received. In general, a native user interface may be provided so that a viewer may access EPG and EAS rich media content.

In an embodiment, the following one type of broadcast service (e.g., data service) may be further defined in the service conceptual model described above. Other service types and components may also be defined later.

(3) Data service: A service consisting of non-continuous components in which primary content is signaled in a standardized manner and delivered in a non-real-time manner so that a receiving device may use the components in a meaningful manner. Also, it is noted that downloadable apps may make use of the data within the data service. Two examples of the data service may be ESG and EAS services. Components of the data service may include the following:

Zero or more locally cached content item

Zero or more network content items

In an embodiment, a component may be shared among a plurality of services. Detailed properties of this type of broadcast service (e.g., ATSC 3.0 service) may be defined in a service object model described below.

Here, the properties of the continuous component according to an embodiment of the present invention will be described.

The continuous component may have four types of categories of properties.

Basic continuous component properties: This properties may be applied to all continuous components. In an embodiment, this properties may include a unique content identifier (having a unique range), a content structure (elementary, composite, PickOne) and a content type (audio, video, closed caption, etc.).

Elementary component properties: This properties may be applied only to elementary components. In an embodiment, this properties may include basic properties of component encoding, such as the number of audio channels or video resolutions.

Complex component properties: This properties may be applied only to complex components. In an embodiment, this properties may include members of complex components and their roles, such as dialog tracks for audio, left view for 3D video.

Presentable component properties: This properties may be applied only to a presentable component. This properties may include such as targeting properties or content advisor ratings.

A continuous component may be streamed through broadcast or broadband for consumption as part of a linear service, and/or stored in a device like a locally cached content item. In addition, the continuous component may be stored in the device like a locally cached content item, delivered in non-real time via broadcast or broadband, and/or streamed through a broadband like a network content item. A viewer may generally access both the locally cached service and the network content item through a user interface provided by the app-based service (e.g., on-demand service). In an embodiment, the viewer may access both the locally cached service and the network content item through a user interface provided by an app-based enhancement (or feature) (e.g., an app-based service providing on-demand content) or through a user interface provided by a receiver in the case of the data service.

A detailed definition of the properties regarding the various types of components may be represented in a service object model described below.

Here, the properties of the locally cached and network content items according to an embodiment of the present invention will be described. The detailed definition of the properties of the locally cached and network content items may be represented in the service object model described below.

The locally cached content item and the network content item are intended to be consumed by an app-based service or an app-based enhancement. In an embodiment, the locally cached content item and the network content item are intended to be consumed by an app-based feature (or enhancement) (of one of a linear service and an app-based service), or may be intended to be consumed in the case of a content item to be delivered in the data service.

The locally cached content item may be delivered through broadcast or broadband and may generally be fully received and locally cached prior to initial presentation.

The network content item may be accessed via broadband from a remote server and may be available for immediate presentation to a viewer. That is, the presentation of successive network content items may start as soon as there is sufficient media to avoid underflow, and presentation of the network content item consisting of a collection of files may start as soon as sufficient files for coherent presentation are obtained.

An app-based service providing on-demand content may provide the locally cached content item, the network content item, or a combination of both. In an embodiment, the properties of an application may be specified in the ATSC 3.0 application run type environment standard.

Here, a program and a segment according to an embodiment of the present invention will be described.

The program may be a time section of a linear service having a scheduled start time and duration, intended by a broadcaster so as to be treated as a single program unit from a consumption standpoint. Such a "program" within the linear service may generally be disjointed in time (although a temporal overlap may occur when a credit of an included program is "squeezed back" to be displayed simultaneously at the time when a next program is opened.

The term of program may refer to a locally cached or network content item having the same structure like a program in the linear service, but may not be consumed in a scheduled time or may not have a time base defined in broadcast.

Each program may be considered to have an associated "show" that constitutes primary content of the program (from a consumption perspective). Many of the properties that are often considered properties of a program may actually be properties of a show. Other properties such as an identifier of a service containing a program or a start time of a program (regarding programs included in the linear service) may be properties of the program. These properties may be different for different programs based on the same show.

Detailed definitions of show and program properties may be represented in a service object model described below.

In an embodiment, a program may consist of one or more time intervals during which a portion of the show is played and zero or more time intervals during which another "interstitial" medium is played. These time intervals may be referred to as "segment" or more specifically, "show segment" and "interstitial segment", respectively.

The detailed definition of the segment properties may appear in the service object model described below.

In an embodiment, segments that are part of the program may have a specific start time and duration, like pre-recorded content. These may be referred to as "anchored" segments. In other embodiments, the segments may not have a specific start time or duration within the program, like live news or sports content. These may be referred to as "non-anchored" segments. These are for the target ad to be delivered for the receiver to be inserted into a program, i.e., into the slot(s) of the program(s) to be inserted, but no determination is made about a location to which they are inserted.

Here, an object model for a service (for example, an ATSC 3.0 service) according to an embodiment of the present invention will be described. To this end, a core concept of a UML object model methodology used for the service object model (hereinafter, also referred to as the object model) will be introduced.

In this disclosure, the service object model may include classes, inheritance relationships between classes, and other relationships between classes. The object model is a high-level design model but not a deployment model. As such, the object model may not include a data type of a class attribute. These may be defined in the normative text of a broadcast standard (e.g., the ATSC 3.0 standard), which describes semantics of the attribute and may be the best method for representing the semantics in the delivered signaling. Also, since the conceptual model of a broadcast service (e.g., ATSC 3.0 service) is a purely service model, it may also include a certain operation, not an operational model of how the receiver accesses and presents the service.

Hereinafter, the relationships among the classes in the object model and definitions of individual classes according to an embodiment of the present invention will be described with reference to FIGS. 15 and 16. For ease of explanation, many attributes may be omitted from the drawing.

FIG. 15 illustrates a type of a broadcast service and a type of a component included in each type of a service according to an embodiment. Since each type of service is the same as described above, a detailed description thereof will be omitted. In this disclosure, a broadcast service may be abbreviated as a service.

Referring to FIG. 15, a service may include at least one of a linear service and an application-based service. The linear service may include zero or more presentable video components. In an embodiment, the presentable video component may have a role that indicates the role of the presentable video component, as an attribute. In addition, the linear service may include zero or more presentable audio components. In addition, the linear service may include zero or more presentable closed caption components.

In addition, the linear service may include one time base that provides a reference time that is a basis for synchronization. In addition, the linear service may include zero or more app-based enhancements (features).

An app-based service may include one or more app-based features. The app-based service may include zero or more time bases. Here, as described above, the time base may provide a reference time as a reference of synchronization.

The app-based enhancement may include one or more applications (apps). In this case, the app may have a primary attribute indicating whether the app is a primary app required for an app-based service. If the app is a primary application, the app may be activated immediately if a service containing the app is selected. In addition, the app-based enhancement may contain zero or more locally cached content items. Here, the locally cached content item may be a collection of files constituting one application. In addition, the app-based enhancement may include zero or more network content items. In addition, the app-based enhancement may include zero or more notification streams.

In a further embodiment, the broadcast service may further comprise a data service. In this case, the data service may contain zero or more locally cached content items. The data service may also include zero or more network content items.

The properties of these services and their components are described in detail below.

FIG. 16 illustrates contains relationships between a continuous component and components having sub-attributes of the continuous component according to an embodiment of the present invention. Specifically, FIG. 16 illustrates the contains relationships between continuous component classes and how they correspond to a 3-layer model.

Every continuous component may have a structure that conforms to three levels of component hierarchy. In an embodiment, the continuous component may be a PickOne component, a composite component, or an elementary component.

The PickOne component at a first level of the component hierarchy may include zero or more composite components, zero or more PickOne component, and zero or more elementary components, and may have an overall constraint that it should include at least two components. The PickOne component at the first level of the component hierarchy may not be included in a certain complex component.

The composite component may have zero or more PickOne components and zero or more elementary components and may have a constraint that it should include at least two components. The composite component may be included within zero or more PickOne components at the first level of the hierarchy.

The PickOne component at a third level of the component hierarchy may include two or more elementary components. A PickOne component at the third level of the hierarchical layer may be included in zero or more PickOne components and zero or more composite components.

Although not illustrated in the diagram of FIG. 16, an elementary component may be an elementary video component, an elementary audio component, or an elementary closed caption (CC) component.

FIG. 17 illustrates a contains relationship between a locally cached item class and a locally cached file class according to an embodiment of the present invention.

Referring to FIG. 17, a locally cached content item may include one or more locally cached files, and the locally cached file may belong to one or more locally cached content items. The locally cached content item may be intended to be consumed by an app-based service or enhancement (feature). According to an embodiment, the locally cached content item may be intended to be consumed by the receiver in the case of data services.

One approach shown in the corresponding class is that the locally cached content item may be basically a presentable locally cached file-based components, i.e., a collection of locally cached files that may be consumed without being combined with other files, and the locally cached file may be basically a locally cached file-based component, i.e., a component as an atomic unit.

FIG. 18 illustrates an association between a presentable video component class, a presentable audio component class, and a presentable CC component class in a service including video according to an embodiment of the present invention.

Referring to FIG. 18, the presentable component may be a presentable video component, a presentable audio component, or a presentable CC component.

In an embodiment, each presentable video component may include zero or more associated presentable audio components, and each presentable audio component may be associated with zero or more associated presentable CC components (here, "associated" means they are suitable to be presented together).

In a service that includes the presentable video component, each presentable audio component may be associated with one or more presentable video compositions.

FIG. 19 illustrates an inheritance relationship and a contains relationship among a service, a program, a show and a segment class, and sub-classes thereof according to an embodiment of the present invention.

Referring to FIG. 19, the linear service may include zero or more programs in the form of a time segment of linear content in a service. The program may be included as a time segment within zero or more linear services. The linear service may include zero or more app-based enhancements (features). An app-based service may include zero or more app-based features. The app-based feature may include zero or more programs in the form of one of a locally cached content item or a network content item. The program may be a locally cached content item and/or a network content item in zero or more app-based features.

A program may include one or more segments, and the segments may be included in zero or more programs. Each segment may be a show segment or an interstitial segment.

By definition, a program may exactly be based on one show. (A show is part of a program not considered an interstitial medium by a service provider).

A show may include one or more show segments.

Since "program" may be a time section (section of a linear service having a specified start time and period) of a linear service, the program may be NRT content (or locally cached content item) or an on-demand component (or network content item) which may have many properties of a linear service or have the same structure as the time section of the linear service. For example, the program may include a continuous component and one or more app-based enhancements (features).

Herein, service model classes and their attributes according to an embodiment of the present invention will be described with reference to Tables 2 to 31. A broadcast service according to an embodiment of the present invention may be described as a service object model including classes, inheritance relationship between classes, contains relationship between classes, and association between classes.

The classes defined for the service object model, which have attributes and relationships, are as illustrated in the following tables. Notation [n . . . m] or [n] after the attribute name may indicate the multiplicity of the attribute, and here, [n . . . m] means that the attribute may have a value between n and m, and [n] means that the attribute must have exactly n values. A large number of classes may have additional attributes inherited from other classes by means of an inheritance relationship defined in the class definition.

Strictly speaking, the relationship between two classes may be listed among the relations of all the classes. However, in an implementation example of the object model, it is common that one of the classes may be seen as "primary" in a relationship and is expressed as an attribute of that class for a relationship. (In this implementation example, a value of the attribute for a given object in that class may be identifiers of some kind of objects in another class associated with the given object. In the class definitions illustrated in the tables below, each relationship may be listed only one time in the definition of a class within a relationship that is potentially (but not necessarily) considered to be a "primary" class.

Table 2 illustrates a continuous component class according to an embodiment of the present invention. Referring to Table 2, the continuous component class represents the continuous component described above. In an embodiment, the continuous component class may include as an attribute a "component identifier (ComponentId)" indicating a unique identifier of a component.

TABLE 2

Continuous Component <>
represents a Continuous Component
Attributes
    ComponentId [1] - unique identifier of component [scope of uniqueness TBD]

Table 3 illustrates an audio component class according to an embodiment of the present invention. Referring to Table 3, the audio component class represents a continuous component whose content type is audio. In an embodiment, the audio component class may include "sub-class relationship with continuous component class" as a relationship.

TABLE 3

Audio Component <>
represents a Continuous Component of content type audio
Relationships
    Sub-class relationship with Continuous Component class Table 4 illustrates a video component class according to an embodiment of the present invention. Referring to Table 4, the video component class represents a continuous component whose content type is video. In an embodiment, the video component class may include "sub-class relationship with continuous component class" as a relationship.

TABLE 4

Video Component <>
represents a Continuous Component of content type video
Relationships
    Sub-class relationship with Continuous Component class Table 5 illustrates a closed caption (CC) component class according to an embodiment of the present invention. Referring to Table 5, a CC component represents a continuous component having a content type of CC. In an embodiment, the CC component class may include as a "sub-class relationship with a continuous component class" as a relationship.

TABLE 5

CC Component <>
represents a Continuous Component of content type closed caption
Relationships
    Sub-class relationship with Continuous Component class Table 6 illustrates an elementary audio component class according to an embodiment of the present invention. Referring to Table 6, the elementary audio component class represents an elementary component whose content type is audio. In an embodiment, an elementary audio component class may include as attributes a codec, the number of audio channels, an encoding bit rate, a language, a mode, and/or other encoding parameters. In an embodiment, other encoding parameters may be codec-dependent. In an embodiment, the mode may be at least any one of complete main, music, dialogue, effects, audio for the visually-impaired, audio for the hearing-impaired, and commentary. In an embodiment, the elementary audio component class may include "sub-class relationship with continuous component class" as a relationship.

TABLE 6

Elementary Audio Component
represents an Elementary Component
Attributes
    Codec [1]
    Number of audio channels [1]
    Encoding bit-rate [1]
    Language [0 . . . 1]
    Mode [1]
    Possible values
        Complete main
        Music
        Dialog
        Effects
        Visually impaired
        Hearing impaired
        Commentary
    Other encoding parameters (possibly codec dependent)
Relationships
    Sub-class relationship with Audio Component class Table 7 illustrates an elementary video component class according to an embodiment of the present invention. Referring to Table 7, the elementary video component class represents an elementary component whose content type is video. In an embodiment, the elementary video component class may include as attributes a codec, resolution, aspect ratio, scanning scheme, frame rate, or "stop" picture mode, and/or other encoding parameters. In an embodiment, the resolution may be expressed in pixel units of width×height. In an embodiment, other encoding parameters may be codec-dependent. In an embodiment, the elementary video component class may include "sub-class relationship with a continuous component class" as a relationship.

TABLE 7

Elementary Video Component
represents an Elementary Component
Attributes
    Codec [1]
    Resolution (width × height, in pixels) [1]
    Aspect ratio [1]
    Interlaced/Progressive [1]
    Frame rate, or "still" picture mode [1]
    Other encoding parameters (possibly codec dependent)
Relationships
    Sub-class relationship with Video Component class Table 8 illustrates an elementary closed caption (CC) component class according to an embodiment of the present invention. Referring to Table 8, the elementary CC component class represents an element component whose content type is CC. In an embodiment, the elementary CC component class may include a codec (i.e., encoding format), language and/or type as attributes. In an embodiment, the type may be any one of a general caption and an easy-reader for a person of low vision. In an embodiment, the elementary CC component class may include "sub-class relationship with continuous component classes" as a relationship.

TABLE 8

Elementary CC Component
represents an Elementary Component
Attributes
    "Codec" (i.e., encoding format) [1]

TABLE 8-continued

Language [1]
Type [1]
Possible values
    Normal
    Easy-reader
Relationships
    Sub-class relationship with CC Component class Table 9 illustrates a composite audio component class according to an embodiment of the present invention. Referring to Table 9, the composite audio component class represents a composite component whose content type is audio. In an embodiment, the composite audio component class may include at least one of "an audio relationship with an audio component class" and a "sub-class relationship with a continuous component class" as a relationship. Here, "audio relationship with audio component class" may be restricted that, for each instantiation of the relationship, all of the included objects (audio components) represent the same sound scene.

TABLE 9

Composite Audio Component
represents a Composite Component
Relationships
    "ContainsAudio" relationship with Audio Component class - with the
    restriction that for each instantiation of the relationship all of the
    included objects (audio components) represent the same sound scene
    Sub-class relationship with Audio Component class Table 10 illustrates a composite video component class according to an embodiment of the present invention. Referring to Table 10, the composite video component class represents a composite component whose content type is video. In an embodiment, the composite video component class may include at least one of "an inclusion video relationship with a video component class "and a "sub-class relationship with a continuous component class "Here, "inclusion video relation with audio component class "may be limited to each of the included objects (video components) for each instantiation of the relationship to represent the same sound scene.

In an embodiment, the attributes of the included video relationship may include roles. Here, the role may indicate a role of a component included within the composite component. In an embodiment, the role may include "enhancement layer for scalable video encoding", "3D video left/right view", "3D video depth information", "portion of video array", and/or "follow-subject meta data". In an embodiment, the enhancement layer for scalable video encoding may have a level. In an embodiment, a portion of the video array may represent an xth y line from the left in the entire video matrix n×m divided into a plurality of screens. In an embodiment, if the "follow-subject" feature is supported by a stream of frame-by-frame metadata indicating an area of the main video component that is focused on the subject, the follow-subject meta data may indicate subject name, subject location, and/or subject size.

TABLE 10

Composite Video Component
represents a Composite Component
Relationships
    "ContainsVideo" relationship with VideoComponent class - with the
    restriction that for each instantiation of the relationship all of the contained
    objects (video components) represent the same video scene
    Attributes of Contains Video Relationship
        Role - role of the contained component in the Composite Component
        Possible values
            Enhancement layer for scalable video encoding, with level
            3D video left/right view
            3D video depth information
            Part of video array, <x, y> of <n, m> (from bottom left to top right, by row)
            Follow-Subject metadata (name of subject, location of subject, size of subject), in the case when the "follow-subject" feature is supported by a stream of frame-by-frame metadata indicating an area of the main video component that is focused on the subject.
Sub-class relationship with Video Component class Table 11 illustrates a PickOne component class according to an embodiment of the present invention. Referring to Table 11, the PickOne component class may represent a PickOne component. In an embodiment, the PickOne component class may include at least one of a "contains relationship with a continuous component class" and a "sub-class relationship with a continuous component class". Here, the "contains relationship with the continuous component class may be restricted to that for each instantiation of the relationship all the included components are of the same content type and represent the same video scene or audio scene.

TABLE 11

PickOne Component
represents a PickOne Component
Relationships
    "Contains" relationship with Continuous Component class -
    with the restriction that for each instantiation of the relationship
    all the included components are of the same content type and
    represent the same video scene or audio scene
    Sub-class relationship with Continuous Component class Table 12 illustrates a presentable component class according to an embodiment of the present invention. Referring to Table 12, the presentable component class represents a presentable component. In an embodiment, the presentable component class may include a targeting/personalization properties, a content advisory rating, and/or a target device as attributes. Here, the target device may include a primary device, a companion device, and/or a primary screen inset. In an embodiment, the primary screen inset may be picture-in-picture.

TABLE 12

Presentable Component <>
represents a Presentable Component
Attributes
    Targeting/personalization properties
    Content Advisory Rating
    Content/Service protection properties
    Target device(s) [0 . . . n]
    Possible values
        Primary Device
        Companion Device
        Inset on Primary Screen ("Picture-in-Picture")

Table 13 illustrates a presentable video component class according to an embodiment of the present invention. Referring to Table 13, the presentable video component class may include a presentable component of a video content type, i.e., all objects in a video component class that satisfy the definition of the presentable component. In an embodiment, the presentable video component class may include at least one of an "associated audio relationship with a presentable audio component class", an "associated CC relationship with a presentable CC component class", and a "sub-class relationship with a video component", as a relationship. Here, the associated audio relationship with the presentable audio component class may indicate that the associated presentable audio component is suitable for presentation with the presentable video component. In addition, the associated CC relationship with the presentable audio component class may indicate that the associated CC component is suitable for presentation with the presentable video component.

TABLE 13

Presentable Video Component
represents a Presentable Component of video content type - i.e.,
contains all objects in the Video Component class that satisfy the
definition of a Presentable component
Relationships
    "AssociatedAudio" relationship with Presentable Audio Component
    class - represents that the associated Presentable Audio Component is
    suitable for presentation along with the Presentable Video Component
    "Associated CC" relationship with Presentable CC Component class -
    represents that the associated Presentable CC Component is suitable
    for presentation along with the Presentable Video Component
    Sub-class relationship with Video Component Table 14 illustrates a presentable audio component class according to an embodiment of the present invention. Referring to Table 14, the presentable audio component class may include a presentable component of an audio content type, i.e., all objects within the audio component class that satisfy the definition of the presentable component. In an embodiment, the presentable audio component class may include a "sub-class relationship with audio component "as a relationship.

TABLE 14

Presentable Audio Component
represents a Presentable Component of audio content type - i.e., contains
all objects in the Audio Component class that satisfy the definition of a
Presentable component
Relationships
    Sub-class relationship with Audio Component Table 15 illustrates a presentable CC component class according to an embodiment of the present invention. Referring to Table 15, the presentable CC component class may include a presentable component of a CC content type, that is, all the objects within the CC component class satisfying the definition of the presentable component. In an embodiment, the presentable CC component class may include a "sub-class relationship with audio component" as a relationship.

TABLE 15

Presentable CC Component
represents a Presentable Component of closed caption content type- i.e.,
contains all objects in the CC Component class that satisfy the definition
of a Presentable component
Relationships
    Sub-class relationship with CC Component Table 16 illustrates a network content item class according to an embodiment of the present invention. Referring to Table 16, the network content item class represents a content component that is delivered on-demand via broadband. In an embodiment, the network content item class may include a network content ID indicating a unique identifier of the network content item, a component location indicating a location where the network content item may be accessed, a component name indicating a human readable name of the network content item that can be represented in multiple languages, a playback length indicating a playback time of the network content item, a usage start time indicating a date and time when the network content item is available, a usage period indicating a length of time during which the network content item is maintained to be available, a targeting/personalization properties, a content/service protection properties, a content advisory rating, and/or an accessibility feature, as attributes. In an embodiment, the playback length attribute may only be a meaningful playback time for a network content item, such as an audio or video clip with a defined playback time. In an embodiment, the accessibility feature may include an identifier and/or value.

TABLE 16

Network Content Item
represents a content component that is delivered on demand via broadband
    Attributes
        NetworkContentItemId [1] - unique identifier of the Network Content Item
        ComponentLocation [1 . . . n] - location where the Network Content Item may be
        accessed
        ComponentName [0 . . . n] - human readable name of the Network Content Item,
        possibly in multiple languages
        PlaybackLength [0 . . . 1] - playout time of the Network Content Item (only meaningful
        for Network Content Items such as audio or video clips that have a defined playout
        time)
        AvailabilityStart [0.1] - date and time at which Network Content Item becomes
        available
        AvailablityDuration [0 . . . 1] - length of time Network Content Item remains available
        Targeting/personalization properties TABLE 16-continued Content/Service protection properties
ContentAdvisoryRating
Accessibility Feature [0 . . . n]
                              For each feature
        Id
        Value[ ]

Table 17 illustrates a locally cached content item class according to an embodiment of the present invention. Referring to Table 17, the locally cached content item class represents a locally cached content item. In an embodiment, the locally cached content item class may include a content item ID indicating a unique identifier of the locally cached content item, human readable name of the locally cached content item represented in multiple languages, updatable indicating an indicator regarding whether the locally cached content item is to be monitored for updating, an expiration indicating a date and time after which the locally cached content item should be discarded, a content item size indicating a size of the locally cached content item by bytes, a playback length indicating a playback time of the locally cached content item, a targeting/personalization properties, content/service protection properties, a content advisory rating, and/or accessibility feature, as an attribute. In an embodiment, the playback length attribute may be only a meaningful playback time for a locally cached item, such as an audio or video clip with a defined playback time. In an embodiment, the accessibility feature may include an identifier and/or value. In an embodiment, a locally cached content item class may include a contains relationship with the locally cached content item as a relationship.

TABLE 17

Locally Cached Content Item
represents a Locally Cached Content Item
Attributes
    ContentItemId [1] - unique identifier of the Locally Cached Content Item (scope of
    uniqueness TBD)
    ContentItemName [0 . . . n] - human readable name of the Locally Cached Content
    Item, possibly in multiple languages
    Updatable [1] - indication whether or not the Locally Cached Content Item should
    be monitored for updates
    Expiration [0 . . . 1] - date and time after which the Locally Cached Content Item
    should be discarded
    ContentItemSize [1] - size of the Locally Cached Content Item, in bytes
    PlaybackLength [0 . . . 1] - playout time of the Locally Cached Content Item (only
    meaningful for Locally Cached Content Items such as audio or video clips that have
    a defined playout time)
    Targeting/personalization properties [details TBD by S34-3 & S33-2]
    Content/Service protection properties [details TBD by S36]
    Accessibility Feature [0 . . . n]
                                For each feature
            Id
            Value[ ]
Relationships
    "Contains" relationship with Locally Cached File class Table 18 illustrates a locally cached file class according to an embodiment of the present invention. Referring to Table 18, the locally cached file class represents a locally cached file. In an embodiment, the locally cached file class may include at least one of a content location, a content type, and an accessibility feature as an attribute. Here, the content location attribute may indicate the content-location defined in the IETF RFC 2616 document, and the content type attribute may indicate a content-type defined in the IETF RFC 2616 document. In an embodiment, the accessibility feature may include an identifier and/or value.

TABLE 18

Locally Cached File
represents a Locally Cached file
Attributes
    ContentLocation - Content-Location as defined in IETF RFC
    2616
    ContentType - Content-Type, as defined in IETF RFC 2616
    Accessibility Feature [0 . . . n]
                                For each feature
            Id
            Value[ ]

Table 19 illustrates an app class according to an embodiment of the present invention. Referring to Table 19, the app class may indicate a locally cached content item that satisfies the specifications for an application for a broadcast service, e.g., a locally cached content item that satisfies the specifications developed by S34-4 for an ATSC 3.0. In an embodiment, the app class may include one or more attributes. In an embodiment, the app class may include a sub-class relationship with a locally cached content item class as a relationship.

TABLE 19

App
represents a Locally Cached Content Item that meets the specifications
developed by S34-4 for an ATSC 3.0 application.
Attributes
Relationships
    "Sub-class" relationship with Locally Cached Content Item class Table 20 illustrates an app-based enhancement (or app-based feature) class according to an embodiment of the present invention. Referring to Table 20, the app-based feature class may represent an app-based feature. In an embodiment, the app-based feature class may include at least one of essential capabilities indicating receiver capabilities needed for a meaningful rendition of the feature, non-essential capabilities indicating receiver capabilities useful for optimal rendition of feature but not absolutely necessary for meaningful rendition of feature, and a target device for adjunct data services, e.g., app-based feature of only a linear service, as an attribute.

In an embodiment, the app-based feature class may include at least one of a "contains relationship with an app class" for applications in the app-based feature, a "contains relationship with a locally cached content item class" for a locally cached content item used by an application in the app-based feature, a "contains relationship with a notification stream class" for a notification stream that delivers a notification to synchronize an action of the application with an underlying linear time base, and a "contains relationship with network content item class" for a network content item managed by application(s).

TABLE 20

App-Based Enhancement
represents an App-Based Enhancement
Attributes
    Essential capabilities [0 . . . 1] - receiver capabilities needed for meaningful rendition of feature
    Non-essential capabilities [0 . . . 1] - receiver capabilities useful for optimal rendition of feature, but not absolutely necessary for meaningful rendition of feature
    Target device [0 . . . n] - for adjunct data services only
    Possible values
        Primary device
        Companion device
Relationships
    "Contains" relationship with App class - for the applications in the App-Based Enhancement
    "Contains" relationship with Locally Cached Content Item class - for Locally Cached Content Items used by the applications in the App-Based Enhancement
    "Contains" relationship with Notification Stream class - for Notifications Stream that delivers notifications to synchronize the actions of the applications with an underlying Linear Time Base.
    "Contains" relationship with Network Content Item class - for Network Content Items to be managed by the application(s).

Table 21 illustrates a time base class according to an embodiment of the present invention. Referring to Table 21, the time base class represents metadata used to establish a time line for synchronizing the components of a linear service. In an embodiment, the time base class may include a time base ID indicating an identifier of a time base class time base and/or a clock rate indicating a clock rate of a time base may be included as an attribute.

TABLE 21

Time Base
represents metadata used to establish a time line for synchronizing the components of a Linear Service
Attributes
    Time Base ID - identifier of Time Base [scope of uniqueness TBD]
    Clock Rate - clock rate of the time base Table 22 illustrates a notification stream class according to an embodiment of the present invention. Referring to Table 22, the notification stream class may represent a notification stream used to deliver synchronized notifications for actions to be taken. In an embodiment, the notification stream class may include as attribute a notification stream ID indicating an identifier of the notification stream.

TABLE 22

Notification Stream
represents Notification Stream used to deliver synchronized notifications of actions to be taken
Attributes
    Notification Stream ID - identifier of Notification Stream [scope of uniqueness TBD]

Table 23 illustrates a service class according to an embodiment of the present invention. Referring to Table 23, the service class represents a broadcast service such as defined in a service, e.g., an ATSC 3.0 glossary. In an embodiment, the service class may include, as an attribute, at least one of a service ID indicating a unique identifier for a service, a service name indicating a human readable name of the service represented in multiple languages, a major channel number indicating the major channel number of the service for service selection, a minor channel number indicating a minor channel number of a service for service selection, a description indicating a textual description of the service expressed in multiple languages, a genre indicating genre(s) of the service, an icon indicating an icon used to express a service (e.g., in an ESG), a language indicating a primary language used in the service, usage report information indicating a parameter to be used for service usage reporting for the service, targeting/personalization properties indicating targeting properties for the service (to be used for searches, recommendations and/or user selection in the ESG), content/service protection properties indicating service protection properties for the service, a content advisory rating indicating a content advisory rating(s) for the service, essential capabilities indicating receiver capabilities needed for meaningful rendition of service, and non-essential capabilities indicating receiver capabilities useful for optimal rendition of service, but not absolutely necessary for meaningful rendition. In an embodiment, the targeting/personalization properties, the content/service protection properties, or content advisory rating attribute may be discontinued for a personal program, a local cached content item, or a network content item.

TABLE 23

Service
represents a Service (as defined in the ATSC 3.0 glossary)
Attributes
    ServiceId [1] - unique identifier for Service [scope of uniqueness TBD]
    ServiceName [0 . . . n] - human readable name of the service, possibly in multiple languages
    MajorChanNum [0 . . . 1] - major "channel number" of the service, for service selection
    MinorChanNum [0 . . . 1] - minor "channel number" of the service, for service selection
    Description [0 . . . n] - textual description of the service, possibly in multiple languages
    Genre [0 . . . n] - genre(s) of the service
    Icon [0 . . . n] - icon used to represent the service (e.g., in ESG), possibly in multiple sizes
    Language [0 . . . 1] - primary language used in the service
    UsageReportInfo [details TBD by S34-3 & S33-2] - parameters to be used for service usage reporting for this service (e.g., URL, reporting interval, etc.)
    Targeting/personalization properties [details TBD by S34-3 & S33-2] - targeting properties for the service (e.g., to be used for searches, recommendations and/or user selection in the ESG) - may be overridden for individual Programs, Locally Cached Content Items, or Network Content Items
    Content/Service protection properties [details TBD by S36] - service protection properties for the service - may be overridden for individual Programs, Locally Cached Content Items, or Network Content Items
    ContentAdvisoryRating [0 . . . n] - Content advisory rating(s) for the service - may be overridden for individual Programs, Locally Cached Content Items, or Network Content items
    Essential capabilities [0 . . . 1] - receiver capabilities needed for meaningful rendition of service
    Non-essential capabilities [0 . . . 1] - receiver capabilities useful for optimal rendition of service, but not absolutely necessary for meaningful rendition Table 24 illustrates a linear service class according to an embodiment of the present invention. Referring to Table 24, the linear service class may represent a linear service. In an embodiment, the linear service class includes, as a relationship, "contains relationship with presentable video component class", "contains relationship with presentable audio component class", "contains relationship with presentable CC component class", "contains relationship with time base class" "contains relationship with an app-based enhancement (feature) class" and/or "sub-class relationship with a service class". In an embodiment, the contains relationship with the presentable video component class may include the role of the video component as an attribute. In an embodiment, the attributes may include primary (default) video, alternative camera views, other alternative native video components, sign language (e.g., ASL) inset, and/or follow subject video. Here, the follow subject video may have the name of the following subject in case where the follow-subject feature is supported by a separate video component.

TABLE 24

Linear Service
represents a Linear Service (as described in section Error! Reference source not found. of this document)
Relationships
    "Contains" relationship with Presentable Video Component class
    Attributes of
        Role of video component [1]
        Possible values
            Primary (default) video
            Alternative camera view
            Other alternative video component
            Sign language (e.g., ASL) inset
            Follow subject video, with name of subject being followed, in the case when the follow-subject feature is supported by a separate video component.

TABLE 24-continued

"Contains" relationship with Presentable Audio Component class
    "Contains" relationship with Presentable CC Component class
    "Contains" relationship with Time Base class
    "Contains" relationship with App-Based Feature class
    "Sub-class" relationship with Service class Table 25 illustrates an app-based service class according to an embodiment of the present invention. Referring to Table 25, the app-based service class represents an app-based service. In an embodiment, the app-based service class may include, as a relationship, a "contains relationship with a time base class", an "contains relationship with an app-based enhancement class', and/or a "sub-class relationship with service class".

TABLE 25

App-Based Service
represents an App-Based Service (as described in Section Error! Reference source not found. of this document)
Relationships
    "Contains" relationship with Time Base class
    "Contains" relationship with App-Based Enhancement class.
    "Sub-class" relationship with Service class Table 26 illustrates a data service class according to an embodiment of the present invention. As described above, the broadcast service may further include a data service. Referring to Table 26, the data service class may represent the above-described data service. In an embodiment, the data service class may include, as a relationship, a "contains relationship with a locally cached content item class" for locally cached content items used by the applications in an app-based feature (enhancement), a "contains relationship with a network content item class" for network content items to be managed by the application(s), and/or a "sub-class relationship with a service class".

TABLE 26

Data Service
represents a Data Service (as described in Section Error! Reference source not found. of this document)
Relationships
    "Contains" relationship with Locally Cached Content Item class - for Locally Cached Content Items used by the applications in the App-Based Feature
    "Contains" relationship with Network Content Item class - for Network Content Items to be managed by the application(s).
    "Sub-class" relationship with Service class It should be noted that the NRT content item component (or locally cached content item component) may have the same structure as in the program but may be delivered in the form of a file rather than a streaming form. Such a program may have additional data services, such as an interactive service associated therewith. Specifically, such a program may, for example, have an app-based feature (enhancement) associated therewith to provide an interactive experience while it is viewed.

Table 27 illustrates a program class according to an embodiment of the present invention. Referring to Table 27, the program class may represent the above-described program. The program class may include, as attributes, a program ID indicating a unique identifier of the program, a start time indicating a date and a time scheduled to start the program, a program duration indicating a scheduled time from the start to the end of the program, a textual title indicating a title of the program expressed in multiple languages, a textual description indicating the description of the program expressed in the multiple languages, a genre indicating the genre of the program, a graphical icon indicating an icon to represent the program (e.g., in ESG) expressed in multiple sizes, a content adversary rating indicating a content advisory rating for the program expressed in multiple regions, targeting/personalization properties indicating properties to be used to determine targeting of the program, a content/service protection properties indicating properties to be used for service protection and/or content protection of the program, and other properties defined in the ESG model.

In an embodiment, the program class may include, as a relationship, "ProgramOf Relationship with Linear Service Class", "ContentItemOf Relationship with App-Based Service Class", "OnDemandComponentOf Relationship with App-Based Service Class, "Contains relationship with Presentable Video Component Class", "Contains relationship with Presentable Audio Component Class", "Contains relationship with App-Based enhancement (feature) class", "Contains relationship with a time base class", "Based-on relationship with Show Class", and/or "Contains relationship with Segment Class". Here, the Contains relationship with the presentable video component class may include a role of the video component as an attribute. Here, the role of the video component may include primary (default) video, alternative camera view, other alternate video components, sign language (e.g., ASL) inset, and/or follow subject video. In an embodiment, the follow subject video may have the name of the following subject if the follow-subject feature is supported by a separate video component. In an embodiment, the attribute of the contains relationship of the segment class may include a relative segment start time indicating a start time of a segment for the start of the program.

TABLE 27

Program
represents a Program (as defined in Section Error! Reference source not found. of this document)
Attributes
    ProgramIdentifier [1] - unique identifier of the Program [scope of uniqueness TBD]
    StartTime [1] - wall clock date and time the Program is scheduled to start
    ProgramDuration [1] - scheduled wall clock time from the start of the Program to the end of the Program
    TextualTitle [1 . . . n] - human readable title of the Program, possibly in multiple languages - if not present, defaults to TextualTitle of associated Show
    Textual Description [0 . . . n] - human readable description of the Program, possibly in multiple languages - if not present, defaults to Textual Description of associated Show
    Genre [0 . . . n] - genre(s) of the Program - if not present, defaults to Genre of associated Show
    GraphicalIcon [0 . . . n] - icon to represent the program (e.g., in ESG), possibly in multiple sizes - if not present, defaults to GraphicalIcon of associated Show
    ContentAdvisoryRating [0 . . . n] - content advisory rating for the Program, possibly for multiple regions - if not present, defaults to ContentAdvisoryRating of associated Show
    Targeting/personalization properties - properties to be used to determine targeting, etc., of Program [details TBD by S34-3 & S33-2] - if not present, defaults to Targeting/personalization properties of associated Show
    Content/Service protection properties - properties to be used for content protection and/or service protection of Program [details TBD by S36] - if not present, defaults to Content/Service protection properties of associated Show
    [Other properties defined in the "ESG Model" (to be defined by S34-3)]
Relationships
    "ProgramOf" relationship with Linear Service class
    "ContentItemOf" relationship with App-Based Service class
    "OnDemandComponentOf" relationship with App Based Service Class
    "Contains" relationship with Presentable Video Component class
    Attributes
        Role of video component [1]
        Possible values
            Primary (default) video
            Alternative camera view
            Other alternative video component

TABLE 27-continued

Sign language (e.g., ASL) inset
Follow subject video, with name of subject being followed, in the case when the follow-subject feature is supported by a separate video component.
"Contains" relationship with Presentable Audio Component class
"Contains" relationship with Presentable CC Component class
"Contains" relationship with App-Based Feature class
"Contains" relationship with Time Base class
"Based-on" relationship with Show class
"Contains" relationship with Segment class
Attributes of "Contains" relationship with Segment class
    RelativeSegmentStartTime - start time of Segment relative to beginning of Program Table 28 illustrates a segment class according to an embodiment of the present invention. Referring to Table 28, the segment class may represent the segment described above. In an embodiment, the segment class may include, as attributes, a segment ID indicating a unique identifier of the segment, a targeting/personalization properties indicating targeting properties (to be considered when segment is to be substituted into a program) and/or a content advisory rating indicating a content advisory rating for segment (to be considered when segment is to be substituted into a program).

TABLE 28

Segment <>
represents a Segment (as defined in Section Error! Reference source not found. of this document)
Attributes
    SegmentId [1] - unique identifier of segment [scope of uniqueness TBD]
    Duration [1] - temporal length of segment
    Targeting/personalization properties- targeting properties (to be considered when Segment is to be substituted into a Program)
    ContentAdvisoryRating [0 . . . n] - content advisory rating for Segment (to be considered when Segment is to be substituted into a Program)

Table 29 illustrates a show segment class according to an embodiment of the present invention. Referring to Table 29, the show segment class may represent a segment of a show. In an embodiment, the show segment class may include as an attribute a show segment relative start time indicating a start time of the show segment relative to beginning of the show. In an embodiment, the show segment class may include a sub-class relationship with the segment class as a relationship.

TABLE 29

Show Segment
represents a Segment of a Show
Attributes
    ShowSegmentRelativeStartTime - start time of Show Segment relative to beginning of Show
Relationships
    "Sub-class" relationship with Segment class Table 30 illustrates the interstitial segment according to an embodiment of the present invention. Referring to Table 30, the interstitial segment may represent a segment of a program that is not a show segment. In an embodiment, the interstitial segment may include a sub-class relationship with a segment class as a relationship.

TABLE 30

Interstitial Segment
Represents a Segment of a Program that is not a Show Segment
Relationships
    "Sub-class" relationship with Segment class Table 31 illustrates a content advisory rating class according to an embodiment of the present invention. Referring to Table 31, the content advisory rating class may include a region identifier, a rating description (text), and/or a rated dimension for each rating area. Here, the rated dimension may include a rated dimension and/or a rated value for each rated dimension.

TABLE 31

Content Advisory Rating [0 . . . n]
For each rating region
    Region identifier
    Rating Description (text)
    Rated Dimension [1 . . . n]
        For each rated dimension
        Rating Dimension
        Rating Value A broadcast system (broadcast transmitting apparatus or broadcast receiving apparatus) according to an embodiment of the present invention may seamlessly switch a more suitable version of the content. To this end, each component of the above-described audio program, TV program or data program may be associated with one or more of the same or different services representing the same base content delivered in different robustness and/or encoding.

Also, a broadcast system according to another embodiment of the present invention may provide aggregation, combination, and synchronization for presentation in the receiver or another device. To this end, the above-described component characteristics and the target screen may be signaled.

In addition, a broadcast system according to another embodiment of the present invention may provide delivery of information describing spatial and temporal relationships among components. To this end, a spatial relationship may be provided through a supplementary data service app using HTML and a temporal relationship may be provided through a synchronization mechanism defined in the S33-1 and S33-3 standard documents.

An on-demand service according to an embodiment of the present invention may be implemented as an app-based service such that a primary application provides a user interface and presentation management. A catalog of on-demand offerings may be in the form of a locally cached item or a network content item, each of which may be signaled as part of the service, presented by the app when needed, or simply downloaded and presented by the app when needed. When a viewer selects an item from the catalog, the app may allow the selected item to be presented to the viewer.

Hereinafter, low level signaling (LLS) will be described. In this disclosure, signaling information carried in a payload of an IP packet with a known address/port dedicated to a corresponding function may be referred to as LLS.

FIG. 20 illustrates LLS information according to an embodiment of the present invention. In the present specification, the LLS information may also be referred to as an LLS_table or LLS data. In FIG. 20, the same description as that of FIG. 3 will be omitted.

Referring to FIG. 20, the LLS information may include an LLS_table_id field (information), a provider_id field (information), and/or an LLS-table_version field (information). In an embodiment, the LLS_table_id field (information), the provider_id field (information), and/or the LLS-table_version field (information) may be included in a header portion of the LLS information. The description of each field (information) is as follows.

LLS_table_id: An 8-bit unsigned integer that identifies a type of a table (signaling information) delivered in a body portion of the LLS information. That is, the LLS_table_id field may identify a type of signaling information (table) included in the LLS information.

Depending on the value of the LLS_table_id field, the corresponding LLS information may include one of the SLT (Service List Table) and the RRT (Rating Region Table) described above. For example, when the LLS_table_id field has a first type value (0x01), the LLS information may include the SLT information, and when the LLS_table_id field has a second type value (0x02), the LLS information may include the RRT (Rating Region Table) Information. In an embodiment, the SLT information or the RRT information may be included in the body portion of the LLS information. In an embodiment, SLT and RRT may be tables in a binary format or an XML format.

Other signaling information may be included in the LLS information according to an embodiment. For example, the LLS information may include Advanced Emergency Alerting Table (AEAT) information providing information related to the emergency alert. In this manner, the LLS information may include various types of signaling information that need to be processed and transmitted in an IP/UDP layer, which is the lower layer, rather than being processed in a delivery layer or service layer, which is an upper layer, for quick acquisition at the receiver.

The provider_id field is an 8-bit unsigned integer that may identify a provider associated with a service that is signaled in a corresponding instance of the LLS information (table). Here, the provider may be a broadcaster using a portion or the entirety of a broadcast stream to broadcast services. The provider_id field may be unique within the broadcast stream. According to an embodiment, one broadcast stream may be shared by multiple broadcasters, in which case each broadcaster that shares the broadcast stream may be identified by the value of the provider_id field.

The LLS_table_version field is an 8-bit unsigned integer that may identify the version of the corresponding table associated with a provider specified by the provider_id field. In an embodiment, if there are one or more providers sharing a broadcast stream, the LLS_table_version field may identify the version of the table identified by the combination of the provider_id field and the LLS_table_id field.

The LLS_table_version field may be increased by 1 each time certain data in the corresponding table is changed. For example, the value of the LLS_table_version field may be increased by 1 each time certain data in the table identified by the provider_id field and/or the LLS_table_id field is changed. When this field value reaches 0xFF, the value may be returned to 0x00 on increment. In an embodiment, when one or more providers share one broadcast stream, the LLS_table_version field may be identified by the LLS_table_id field and the provider_id field.

The broadcast signal receiver may identify signaling information such as the SLT information delivered by the LLS information using the information of the LLS_table_id field and the LLS_table_version field and check a version of the corresponding signaling information, whereby the broadcast signal receiver may not perform parsing on signaling information having the same version as that of already parsed signaling information. In this manner, it is possible to increase efficiency of the receiver operation by avoiding repetition of unnecessary operations.

In an embodiment, the above-described LLS information may be processed (encapsulated) as a UDP/IP packet in the UDP/IP layer and transmitted. For example, the LLS information may be carried through a payload of an IP packet delivered to a well known IP address/port and may include SLT information according to a type thereof. As such, since the LLS information is transmitted in the IP packet format without being encoded in the delivery layer, the LLS information may be processed faster in the receiver, thereby reducing delay required for service provision when the receiver is turned on.

FIG. 21 illustrates SLT information according to an embodiment of the present invention. In FIG. 21, the same description as that of FIG. 3 will be omitted.

In the embodiment of FIG. 21, SLT information (SLT) may provide rapid channel scanning and service acquisition by including the following information for each service in a broadcast stream.

1) Information required for allowing presentation of a service list, which is meaningful information to viewers and can support initial service selection through a channel number or up/down selection 2) Information required for locating service layer signaling (SLS) for each listed service As described above, the SLT information may enable the receiver to generate a service list through fast channel scanning and provide access information for locating the SLS information. Also, the SLT information may be processed and transmitted in the UDP/IP layer, rather than being encoded in the delivery layer. In an embodiment, the SLT information may have a binary format or an XML format.

The SLT information of the embodiment of FIG. 21 may be included in the above-described LLS information and may be delivered. The SLT information in the embodiment of FIG. 21 may be included in the LLS information (table) of the embodiment of FIG. 11 described above. That is, the SLT information of FIG. 21 may be transmitted through the LLS information of FIG. 20. As described above, the LLS information may be processed and transmitted as a UDP/IP packet in the UDP/IP layer. Thus, since the LLS information is not encoded in the delivery layer but transmitted in the UDP/IP packet format, the LLS information may be processed faster in the receiver, and thus, delay required for providing a service may be reduced when the receiver is turned on or when a channel is changed.

In an embodiment, the SLT information may include, as sub-elements and/or attributes, @bsid properties, @sltCapabilties properties, @sltInetSigUrl properties, @sltInetEsgUrl properties and/or the service element. Hereinafter, each attribute and sub-element will be described The @bsid attribute may represent an identifier of the entire broadcast stream. The value of the BSID may be unique at a local level.

The @slitCapabilities attribute may provide capability information required for decoding and significantly reproducing content for all services described by the corresponding SLT information. The syntax and semantics of the @slitCapabilities attribute follow the syntax and semantics of atsc:capabilities specified under a content fragment of the ATSC 3.0 service announcement specification.

The @sltInetSigUrl attribute may provide URL information for obtaining service level signaling (or the service layer signaling) for all of the services within the corresponding SLT information through a broadband, if available.

The @slitInetEsgUrl attribute may provide a URL for obtaining ESG data for all services in the SLT information through a broadband, if available.

According to an embodiment, the @sltInetSigUrl attribute and the @sltInetEsgUrl attribute of the SLT element may be referred to as the sltInetUrl element. In this case, the sltInetUrl element may contain the @urlType attribute, and the @urlType attribute may indicate a type of files (information) available as the sltInetUrl element. Through the @urlType attribute in the sltInetUrl element, whether the URL information provided by the sltInetUrl element is URL information for obtaining ESG information or URL information for obtaining service layer signaling information may be signaled.

The service element refers to an element that provides service information. In an embodiment, the service element may include, as a sub-element and/or attribute, @serviceId attribute, @sltSvcSeqNum attribute, @protected attribute, @majorChannelNo attribute, @minorChannelNo attribute, @serviceCategory attribute, @shortServiceName attribute, @hidden attribute, @broad bandAccessRequired attribute, @svcCapabilities attribute, @slsProtocolType attribute, @slsMajorProtocolVersion attribute, @slsMinorProtocolVersion attribute, @slsPlpId attribute, @slsDestinationIpAddress attribute, @slsDestinationUdpPort attribute, @slsSourceIpAddress attribute, @svcInetSigUri attribute, and/or @svcInetEsgUri attribute.

The @serviceId attribute is a 16-bit integer that may uniquely identify a corresponding service within the scope of a corresponding broadcast service. In an embodiment, the @serviceId attribute may be an attribute used as a mandatory attribute.

The @sltSvcSeqNum attribute may represent a version of the SLT service information for the corresponding service. More specifically, the @sltSvcSeqNum attribute may be an integer representing a sequence number of the SLT service information having the same service ID as that of the @serviceId attribute. The value of the @sltSvcSeqNum attribute may be increased by 1 each time a certain attribute within the corresponding service element is changed, starting from 0, for each service. The value of the @sltSvcSeqNum attribute may not be increased unless any attribute value is changed compared to a previous service element having a specific value of the service ID. This field may be returned to 0 after reaching a maximum value. In an embodiment, the @sltSvcSeqNum attribute may be an attribute used as a mandatory attribute.

The @protected attribute may represent whether one or more components required for a meaningful presentation are protected. For example, the @protected attribute may indicate whether one or more components required for a meaningful presentation are encrypted. If one or more components required for a meaningful presentation are protected, this value may be set to a value (e.g., 1) indicating "true". If one or more components required for a meaningful presentation are not protected, this value may be set to a value (e.g., 0) indicating "false". A default value may be the false value. In an embodiment, the @protected attribute may be an optional attribute.

The @majorChannelNo attribute may represent a major channel number of the corresponding service. For example, the @majorChannelNo attribute may be an integer between 1 and 999 representing a major channel number of the service. In an embodiment, the @majorChannelNo attribute may be an optional attribute. That is, the @majorChannelNo attribute may not be used depending on a service category or may be used as a mandatory attribute. For example, in the case of EAS services or ESG services, the @majorChannelNo attribute may not be used, and in the case of linear services, the @majorChannelNo attribute may be used as a mandatory attribute.

The @minorChannelNo attribute may represent a minor channel number of the corresponding service. For example, the @minorChannelNo attribute may be an integer between 1 and 999 representing a minor channel number of the service. In an embodiment, the @minorChannelNo attribute may be an optional attribute. That is, the @majorChannelNo attribute may not be used depending on a service category or may be used as a mandatory attribute. For example, in the case of the EAS services or ESG services, @majorChannelNo attribute may not be used, and in the case of the linear services, @majorChannelNo attribute may be used as a mandatory attribute.

The @serviceCategory attribute may represent a category of a service. In an embodiment, code values of the @serviceCategory attribute in the service element may be the same as illustrated in Table 32 below.

TABLE 32

| serviceCategory | Meaning |
| --- | --- |
| "0" | Not specified |
| "1" | Linear A/V service |
| "2" | Linear audio only service |
| "3" | App-based service |
| "4" | ESG service (program guide) |
| "5" | EAS service (emergency alert) |
| other values | Reserved for future use |

In the embodiment of Table 32, if the value of the @serviceCategory attribute is a zero value (for example, "0"), it means that a service is not specified, if the value of the @serviceCategory attribute is a first value (e.g., "1"), it indicates a linear audio/video service, if the value is a second value (e.g., "2"), it indicates a service of only a linear audio, if the value is a third value (e.g., "3"), it indicates an app-based service, if the value is a fourth value (e.g., "4"), it indicates a program guide-related ESG service, if the value is a fifth value (e.g., "7"), it indicates an emergency alert-related EAS service, and other values may be values reserved for a future use.

In an embodiment, the @serviceCategory attribute may be an attribute used as a mandatory attribute.

The @shortServiceName attribute may represent a short string name of a service. For example, the @shortServiceName attribute may represent a short name of a service within 7 characters. In an embodiment, the @shortService- Name attribute may be an optional attribute. That is, the @majorChannelNo attribute is not used depending on a service category or may be used as a mandatory attribute. For example, in the case of EAS services or ESG services, @majorChannelNo attribute may not be used, and in the case of linear services, @majorChannelNo attribute may be used as a mandatory attribute.

The @hidden attribute may represent whether the corresponding service is not selected by a regular TV receiver but is for testing or a proprietary use. If the service is for testing or a proprietary use, the value of this attribute may be set to a value (e.g., 1) indicating "true". If not present, the value of this attribute may be set to a value (e.g., 0) indicating a default value of "false". In an embodiment, the @hidden attribute may be an optional attribute.

The @broadbandAccessRequired attribute may indicate whether a broadband access is required for a meaningful presentation of the service. A default value thereof may be "false". In an embodiment, the @broadbandAccessRequired attribute may be an optional attribute.

The @svcCapabilities attribute may provide necessary capability information for decoding and meaningful presentation of the corresponding service. In an embodiment, the @capabilities attribute may be an optional attribute.

The @slsProtocolType attribute may be an attribute indicating a protocol type of service layer signaling used for the corresponding service. In an embodiment, code values of the @slsProtocolType attribute in the service element may be the same as illustrated in Table 33 below.

TABLE 33

| slsProtocol | Meaning |
| --- | --- |
| 0 | Reserved |
| 1 | ROUTE |
| 2 | MMTP |
| other values | Reserved for future use |

In the embodiment of Table 33, if the value of the @slsProtocolType attribute is a $0^{th}$ value (e.g., "0"), it may indicate a reserved value. If the value is a first value (e.g., "1"), it may mean that a protocol type of the service layer signaling is a ROUTE protocol. If the value is a second value (e.g., "2"), it may mean that a protocol type of service layer signaling used for the corresponding service is MMTP. If the value is other values, it may mean that a protocol type of service layer signaling used for the corresponding service is a reserved value for a future use.

In an embodiment, the @slsProtocolType attribute may be an optional attribute.

The @slsMajorProtocolVersion attribute may be a major version number of a protocol used to deliver the corresponding service, and the @slsMinorProtocolVersion attribute may be a minor version number of a protocol used to deliver the corresponding service. The @slsMajorProtocolVersion attribute and the @slsMinorProtocolVersion attribute may be optional attributes.

The @slsPlpId attribute may provide a PLP identifier that identifies a PLP carrying SLS information of the corresponding service. This field may be omitted according to an embodiment, and the PLP information in which the SLS is delivered may be checked by combining information in an LMT, which will be described later, and bootstrap information of the SLT.

The @slsDestinationIpAddress attribute, the @slsDestinationUdpPort attribute, and the @slsSourceIpAddress attribute may each indicate a destination IP address, a destination UDP port, and a source IP address of a transport packet carrying SLS of the corresponding service. They may identify the transport session (ROUTE session or MMTP session) in which the SLS is delivered. They may be included in the bootstrap information.

The @svcInetSigUrl attribute, if available, may provide base URL information for obtaining service level signaling (or service layer signaling) files for the corresponding service through a broadband.

The @svcInetEsgUrl attribute, if available, may provide a URL for obtaining ESG data for the corresponding service through a broadband.

According to an embodiment, the @svcInetSigUrl attribute and the @svcInetEsgUrl attribute of the service element may be collectively referred to as the svcInetUrl element. In this case, the svcInetUrl element may include the @urlType attribute, and the @urlType attribute may indicate a type of files (information) available as the svcInetUrl element. Through the @urlType attribute in the svcInetUrl element, whether the URL information provided by the svcInetUrl element is URL information for acquiring ESG information or URL information for acquiring service layer signaling information may be signaled.

Hereinafter, a method for transmitting signaling information through a broadband will be described. Also, an embodiment for scheduled update or unscheduled update of signaling information transmitted in a broadband will also be described.

FIG. 22 illustrates path terms indicating signaling information requested through a broadband according to an embodiment of the present invention. FIG. 23 illustrates types of signaling information requested through a broadband according to an embodiment of the present invention.

As described above, in the embodiment of FIG. 21, the SLT information may include an @sltInetSigUrl attribute at the SLT level (SLT element level) to obtain signaling information (object) for all services in the SLT through a broadband, which may be referred to as an sltInetUrl element with the @sltInetEsgUrl attribute. Also, in order to obtain signaling information (object) for a specific service through a broadband, the SLT information may include a @svcInetSigUrl attribute at a service level (service element level) and it be referred to as a svcInetUrl element together with the @svcInetEsgUrl attribute.

If the aforementioned @sltInetSigUri attribute exists (or if the sltInetUrl element including URL information for obtaining service layer signaling information exists), this attribute (or element) may be used as a base URL for making an HTTP request for signaling metadata. Desired signaling objects to be returned may be indicated by appending a path term to the base URL (instead of using a query term). This makes it possible to retrieve a signaling object more efficiently from the server point of view because no server side application is required to retrieve the requested objects. Each retrieval may simply fetch the files. To make such a request, a GET method may be used, and a path appended to the end of the base URL may include terms that indicate a requesting signaling object or objects. An embodiment of the path terms is the same as indicated in FIG. 22.

If the base URL of the @sltInetSigUri attribute is present at the SLT level, the service_id term may be used to indicate a service to which the requested signaling metadata object applies. If the service_id term does not exist, a signaling metadata object for all services in the section may be requested. The service_id term may also be referred to as the service term.

A normal|diff|template term may indicate whether a nomal form of the metadata object(s), a diff form of the metadata object(s), or a template form of the metadata object(s) has been requested. If the nomal form is requested, the "nomal" term may be omitted. The normal|diff|template term may also be referred to as a mode term.

A current|next term may indicate whether a current version of the metadata object(s) or a next version of the metadata object(s) since the current version is requested. If the current version is requested, the "current" term may be omitted. The current|next term may also be referred to as a version term.

ALL|RD|USBD|STSID|MPD|MMT|MPT|PAT|MPT-|MPIT|CRIT|DCIT| AST|EMT|AEI, that is, a fourth term, may be used to indicate whether which type of the metadata object(s) is requested. Supported types and descriptions thereof are the same as those listed in FIG. 23. The fourth term above may also be referred to as a type term.

Some examples of URLs for a HTTP request for signaling metadata objects are as follows.

<sltInetSigUri>/0x2107/RD—Returns for A service having service_id 0x2107. It returns a current, normal version of all ROUTE/DASH signaling objects.

<sltInetSigUri>/0x2103/next/MPD—It returns a next, normal version of an MPD for services having service_id 0x2103

<sltInetSigUri>/0x2104template/AST—It returns a current, template version of an AST for services having service_id 0x2104

If the @svcInetSigUri attribute exists at the service level (or if the svcInetUri including URL information for obtaining service layer signaling information exists), the same paths may be added with the same semantics on the back. Here, the service term may be excluded because the svcInetSigUri attribute does not need to designate the requested service.

A response body for HTTP requests may include an MBMS metadata envelope including an "item" element for each signaling object included in the response. Zero or one of the signaling objects may be embedded within the "item" element, as specified in the MBMS specification. Any signaling objects that are not embedded may be referenced in their "item" element and they may be packaged together in a metadata envelope in a multi-part MIME message in order they are referenced. A "validFrom" and "validUntil" properties of the "item" element may exist to indicate the interval of validity of each signaling object.

The "item" element of the MBMS metadata envelope may be extended by adding the following attributes defined in the ATSC namespace.

<xs:attribute name="nextUrl" type="xs:anyURI" use="optional"/>

If present, the URL given by this attribute may be a URL of next scheduled update regarding a signaling object described in the "item" element.

That is, the URL given by the nextUrl attribute may be a URL for next scheduled update regarding the signaling object described in the "item" element.

Thus, when a "validUntil" time arrives for a signaling object that has been obtained through a broadband, the device (e.g., broadcast signal receiver) may obtain next scheduled update by making an HTTP GET having a "URL" given by "nextURL" within the "item" element which was used for representing a signaling object in the metadata envelop. Through this, the broadcast signal receiver may perform scheduled update on the signaling object.

If unscheduled update is made in the signaling object, a dynamic event may be provided to announce the update, as specified in the ATSC 3.0 app signaling specification. Thereafter, the device (e.g., broadcast signal receiver) may obtain the updated signaling object using the URL in the "data" attribute of the dynamic event. That is, the broadcast signal receiver may acquire the updated signaling object using the URL provided by the dynamic event. Accordingly, the broadcast signal receiver may perform unscheduled update on the signaling object.

FIG. 24 illustrates a dynamic event that announces unscheduled update regarding service signaling information according to an embodiment of the present invention.

In this manner, the attributes of a dynamic event that announces unscheduled update regarding one or more service signaling information (or service layer signaling information) may have attribute values as illustrated in the table of FIG. 24. Each attribute will be briefly described as follows.

A schemeIdURi attribute (field) may be an attribute indicating an identifier scheme of an event and may be, for example, "urn:atsc:3.0:tud" indicating the update of the signaling information (table) in ATSC 3.0.

A value attribute (field) indicates a value for the corresponding event and may indicate a separate list value of signaling information to be updated using the name of the signaling information illustrated in FIG. 24, for example.

A timescale attribute (field) may represent a time scale (e.g., unit of second or minute) used for the corresponding event.

A duration attribute (field) may indicate a duration of the corresponding event (e.g., an interval length during which the receiver is expected to request signaling information).

An id attribute (field) may indicate an identifier for the corresponding event.

A message_data attribute (field) is an attribute indicating data of an event message and may be, for example, data for a URL used for searching for signaling information to be updated. The message_data attribute may also be referred to as the data attribute described above.

In a further embodiment, if the sltInetEsgUri attribute exists (or if a sltInetUrl element including URL information for obtaining ESG information exists), the URL may be used to search for ESG data for all services in the SLT through a broadband. If the svcInetEsgUri attribute exists, the URL may be used to retrieve ESG data for a service having the same service_id as that of a service element having the svcInetEsgUri attribute through a broadband. In both cases, the URL may be used for queries such as those specified in the ATSC 3.0 broadcast service announcement and personalization standards.

Hereinafter, a method of signaling EIDR (Entertainment Identifier Registry) or Ad-ID using an MPD in the ROUTE/DASH service described above will be described. Specifically, a method of signaling the EIDR and the Ad-ID for notifying an identifier of supplementary content using the MPD will be described. As described above, the ROUTE/DASH service may be a service that is delivered using a ROUTE protocol.

FIG. 25 illustrates attributes of an AssetIdentifier element for a content ID according to an embodiment of the present invention.

If it is requested to associate a period element in the MPD with the content ID, EIDR or Ad-ID, this may be done by using the AssetIdentifier element of the period element in the MPD. That is, when it is requested to associate linear content and a content ID in a broadcasting service using ROUTE/

DASH to deliver broadcast linear content, the Asset IDentifier elements having the attribute values illustrated in FIG. 25 may be added to the DASH MPD Period element of the service for a certain period to which the content ID is applied.

In an embodiment, a data type of the AssetIdentifier element may be DescriptorType, and this may have the requested "schemeIdUri" attribute and/or two optional attributes "value" and "id" attributes. In an embodiment, as illustrated, the optional attribute "id" of the AssetIdentifier element may be omitted.

In an embodiment, when the content ID scheme (type) is EIDR, the AssetIdentifier element may have a value of "urn:atsc:3.0:assetid:eidr" (or "urn:eidr") as a value for the "schemeIdUri" attribute, and may have an EIDR ID (or EIDR content ID) value as a value for the "value" attribute. Here, the EIDR content ID may have a canonical form of the EIDR ID registered as "Entertainment Identifier Registry".

In another embodiment, if the content ID scheme (type) is an Ad-ID, the AssetIdentifier element may have a value of "urn:atsc:3.0:assetid:adid" (or "tag:atsc.org, 2016:cid:adid") as a value for the "schemeIdUri" attribute and may have Ad-ID (or Ad-ID content ID) value as a value for the "value" attribute. Here, the Ad-ID content ID may be an Ad-ID code registered in the Ad-ID system developed by "the American Association of Advertising Agencies and the Association of National Advertisers".

Hereinafter, a method of providing preview data in a service guide by a broadcast system according to an embodiment of the present invention will be described. In this disclosure, the service guide may also be referred to as an electronic service guide, a program guide, or an electronic program guide.

In this disclosure, the service guide refers to a function of presenting a service announcement, and the service announcement refers to information regarding a broadcast service and available content. In this disclosure, the service announcement function (or service guide) enables a provider of a broadcast service to describe an available service. In addition, the service announcement function (or service guide) enables a method to describe how access a service.

From the user's point of view, the service announcement function (or service guide) allows a user to use an on-screen service guide that may be visible as an entry point for discovering a broadcast service and selecting a service. That is, the user may discover a broadcast service and select the service through the service guide provided through the broadcast signal receiver. This service announcement may provide a description of content provisioning. In addition, the service announcement may provide a filtering performance based on user preference and content characteristics, such as captioning, interactive enhancement, video formats (3D, SD, HD, UD), audio formats (stereo, 5.1 channel, etc.), content advisory rating, genre, an accessible audio track, a substituted language, and the like. Also, in the case of a scheduled service, the service announcement may provide information about a date and time at which each service is scheduled to be broadcast.

The service guide may be composed of a data model that models services, schedules, and content from the viewpoint of service guide fragments. In this case, information on the service guide may include a service fragment, a content fragment, and/or a schedule fragment. That is, the service guide information (data) may have a structure including a service fragment, a content fragment, and/or a schedule fragment. In other words, the service guide structure may consist of a service fragment, a content fragment, and/or a schedule fragment. Here, the service fragment may be part of a service announcement describing a broadcast service, the content fragment may be part of a service announcement describing a program or a content item, and the schedule fragment may be part of service announcement describing a presentation schedule of content in the broadcast service.

The broadcast system according to an embodiment of the present invention overcomes the limitations of providing a simple service guide based on the existing text and provides advanced service guide providing preview data so that a viewer may be provided with various types of information through the service guide. To this end, the broadcast system may insert additional data (e.g., thumbnails, video links, data for promotional sites, etc.), i.e., preview data, including previews, into the service guide.

When the service guide including preview data is provided in a broadcast system, the broadcast system may provide a representative image (e.g., a thumbnail image) for each program according to time information in the service guide, and accordingly, the viewer may be provided additional information such as an image, as well as text regarding program information according to a time of the corresponding service. In addition, the broadcast system may provide a video link regarding the program in the service guide, whereby the viewer may directly access desired video. In this manner, through the preview data provided in the service guide, the viewer may enter video and the additional information, as well as content (for example, a program) according to a time specified in the service guide through the broadcast signal receiver. Hereinafter, various embodiments for providing preview data in the service guide by the broadcast system will be described with reference to FIGS. 26 to 28.

In an embodiment, the broadcast system may further include a preview data fragment (PreviewData) that provides preview data to the service guide information. That is, the service guide information may include a service fragment, a content fragment, a schedule fragment, and a preview data fragment. In this case, the service fragment, the content fragment, and the schedule fragment may further include information for referring to the preview data fragment in each fragment. If the preview data fragment is included in the service guide information, a PrivateExt element in the preview data fragment may be used to extend a type of preview provided in the service guide. In this case, the preview provided in the service guide may be extended through the components and/or attributes in the PrivateExt element in the preview data fragment.

FIG. 26 illustrates a method of providing a service guide including preview data according to an embodiment of the present invention. In the embodiment of FIG. 26, the broadcast system may provide preview data in the service guide through extension of an icon element of the service fragment in the service guide information.

Referring to FIG. 26(a), a service fragment in the service guide information includes a private extension (PrivateExt) element, and the PrivateExt element may include a service-level private extension (ATSC3ServicePrivateExt or ATSC3ServiceExtention) element. Here, the service-level private extension element may include additional information about a broadcast service (e.g., an ATSC 3.0 service). In an embodiment, the service-level private extension element may include an icon element, a major channel number element, and/or a minor channel number element.

Referring to FIG. 26(b), an icon element may indicate a URL pointing to an icon used to represent a service in the service guide. In an embodiment, multiple URLs may be used to point to icons of different widths and heights or different presentation formats. To this end, the icon element may include a width attribute indicating a width of an image referenced in units of pixels and/or a height attribute indicating a height of an image referenced in units of pixels.

In the embodiment of FIG. 26, the icon element may include a uri attribute (information), a MIMEType attribute (information), and/or a size (or datasize) attribute (information). Here, the uri attribute may indicate a URI that points to the corresponding icon. When the ROUTE protocol is used to deliver an icon file, the uri attribute may correspond to a 'Content-Location' attribute in the EFDT of the ROUTE session. When HTTP is used for file delivery, the uri attribute may be used to signal 'bs_path' and 'query' components of the HTTP URL addressing a requested file. According to an embodiment, the icon element including the uri attribute may also be referred to as a preview icon element. In this case, the icon element may not include the uri attribute separately.

In addition, the MIMEType attribute may indicate a MIME media type of an icon. In addition, the size attribute may indicate an approximate size of a resource file (or image data) by bytes. In this disclosure, the size attribute may also be referred to as a data size (datasize) attribute.

Thus, when the icon element includes the uri attribute, the MIMEType attribute, and/or the size attribute, that is, when the icon element is extended, the broadcast system may display icons representing each service in the service guide through the extended icon element, thereby providing richer service guide information to the user. In addition, the broadcast system according to an embodiment of the present invention may provide not only the icon information transmitted through HTTP, that is, through a broadband, but also the icon information transmitted through broadcasting according to the uri attribute value of the icon element have. In addition, the broadcast system according to an embodiment of the present invention allows the broadcast signal receiver to first determine whether icon information may be provided to the user according to the MIMEType attribute and the size attribute value of the icon element.

FIG. 27 illustrates a method of providing a service guide including preview data by the broadcast system according to another embodiment of the present invention. In the embodiment of FIG. 27, the broadcast system may provide preview data in the service guide by additionally defining a preview to the role of an application component element of the content fragment in the service guide information.

Referring to FIG. 27, the content fragment in the service guide information may include a private extension (PrivateExt) element, the PrivateExt element includes a component element, and the component element may include an app component element as a subelement. Here, the app component element may represent the role of a component. In addition, the app component element may provide a text description that is intended for human consumption regarding the role of the component, and may provide a string value that may be used to describe the role of the component of the broadcast service (e.g., ATSC 3.0 service). In this case, the broadcast service may include an on-demand service, a start-over service, a companion-screen service, and/or a preview service. In addition, the app component element may provide any useful description for the viewer. In an embodiment, an app component element may include a language attribute.

As described above, the broadcast system may provide the user with information about which app component having a certain role is provided in which service in the broadcast service using the role value of the app component in the service guide information. Therefore, as in the embodiment of FIG. 28, the preview service may be provided in the service guide by additionally defining the preview service in the role of the app component.

FIG. 28 illustrates a method of providing a service guide including preview data according to another embodiment of the present invention. In the embodiment of FIG. 28, the broadcast system may further provide preview data in the service guide by additionally defining a preview icon (PreviewIcon) element in the content fragment within the service guide information.

Referring to FIG. 28(a), a content fragment in the service guide information includes a private extension (PrivateExt) element, and the PrivateExt element may include a component element, a preview icon element, and/or a capability element. Here, the preview icon element refers to an element that defines an icon that may be displayed in each program area in a service guide screen. That is, the preview icon element may provide a URI that points to an icon (or image) used to represent preview data in the service guide (ESG). In an embodiment, multiple URLs may be used to point to icons having different width and height or different presentation formats. To this end, the icon element may include a width attribute indicating a width of an image referenced in units of pixels and/or a height attribute indicating a height of an image referenced in units of pixels.

Referring to FIG. 28(b), a preview icon element may include a uri attribute, a MIMEType attribute, a size (or datasize) attribute, a linkUri element, and/or an appToken element as subelements and/or attributes. In an embodiment, the linkUri element may include a uriType attribute. In addition, the app token element may include a name attribute and/or a value attribute. In an embodiment, the preview icon element may be included in the preview element which is a higher element, and the preview element may be included in the private extension element which is a higher element. In this case, the preview element may provide a method of referencing promotional content for a specific service guide (ESG) content element.

Here, the uri attribute may indicate a URI pointing to a corresponding icon. When the ROUTE protocol is used to deliver an icon file, the uri attribute may correspond to a 'Content-Location' attribute in an EFDT of a ROUTE session. When HTTP is used for file delivery, the uri attribute may be used to signal 'abs_path' and 'query' components of the HTTP URL addressing a requested file. According to an embodiment, the preview icon element including the uri attribute may also be referred to as a preview icon element. In this case, the preview icon element may not include the uri attribute separately.

In addition, the MIMEType attribute may indicate the MIME type of a preview icon displayed in the service guide. The size attribute may indicate a size of the preview icon (or image data) displayed in the service guide by bytes. In the present disclosure, the size attribute may also be referred to as a data size attribute. The linkUri element may define a URI linked to the preview icon. Using the corresponding URI, an application linked with the icon may be driven or a multimedia download URL address that may be displayed on the service guide screen may be displayed by interworking with the ESG. Which value the corresponding URI represents is provided by the uriType attribute to be described below.

The uriType attribute may be defined by classifying types regarding which function the uri value linked to the preview icon executes. Here, a default value may be a first value (e.g., 0). If the value of the uriType attribute is a first value (e.g., 0), the uriType attribute may indicate that uri is for app execution. If the value of the uriType attribute is a second value (e.g., 1), the uriType attribute may indicate that uri is for multimedia download. If the value of the uriType attribute is a third value (e.g., 2), the uriType attribute may indicate that uri is for a thumbnail. If the value of the uriType attribute is a fourth value (e.g., 3), the uriType attribute may indicate that uri is for web-site execution. If the value of the uriType attribute is a fifth value (e.g., 4), the uriType attribute may indicate that uri is for private data.

The app token element refers to data, when an application is executed, allowing the application to be executed from a specific point, upon receiving a corresponding token as a parameter from the application. In an embodiment, the app token element may only be described if a value of the uriType attribute of the corresponding linkUri element is a first value (e.g., 0). A name attribute of the app token element may indicate a name of the token, and a value attribute thereof may indicate a value of a token.

As described above, in the broadcast system according to the embodiment of the present invention, icons provided by programs in the service guide information may be displayed by newly defining the preview icon element in the component fragments in the service guide information, whereby a rich service guide UI may be provided. In addition, uri information associated with the icon may be provided to the user. In addition, by providing uri information connected to icons, the service guide capable of providing various types of information when the user clicks a corresponding icon may be configured.

Hereinafter, a method for transmitting a broadcast signal and an apparatus for transmitting a broadcast signal according to an embodiment of the present invention will be described.

FIG. 29 illustrates a method for transmitting a broadcast signal according to an embodiment of the present invention.

The broadcast signal transmitter may generate first level signaling information for broadcast service data (S29010). The broadcast service data, which supports a function provided by a broadcast service, may include at least one of audio, video, and text data. The broadcast service data may also be referred to as a service data component or a service component. In an embodiment, first level signaling information may be signaling information that provides information for discovery and acquisition of broadcast service data. For example, the first level signaling information may be signaling transmitted at a level of a service layer and may be, for example, SLS (Service Layer Signaling) information as described above (e.g., ROUTE SLS information or MMT SLS information).

The broadcast signal transmitter may encode the broadcast service data and the first level signaling information on the basis of a delivery protocol (S29020). The delivery protocol based on which the broadcast service data and the first level signaling information are encoded includes at least one of a Real-Time Object Delivery over Unidirectional Transport (ROUTE) protocol and an MMT (MPEG Media TransportI) protocol. However, the same delivery protocol may be applied to the broadcast service data and the SLS information. That is, when the broadcast service data is encoded according to the MMT protocol, the first level signaling information for the broadcast service data may be encoded according to the MMT protocol. Also, when the broadcast service data is encoded according to the ROUTE protocol, the first level signaling information for the broadcast service may be encoded according to the MMT protocol.

The broadcast signal transmitter may generate second level signaling information for the broadcast service data (S29030). In an embodiment, the second level signaling information may be signaling transmitted at a level of an IP/UDP layer and may be, for example, the above-described Low Level Signaling (LLS) information (or table).

In an embodiment, the second level signaling information may include table ID information identifying a type of signaling information included in the second level signaling information and provider ID information identifying a provider associated with a broadcast service signaled via the second level signaling information. In an embodiment, the type of the signaling information identified by the table ID information may include SLT information providing information used for discovering the first level signaling information and building a basic service list.

In an embodiment, the SLT information may include first level signaling information for a broadcast service through a broadband or URL (Uniform Resource Locator) information providing a base URL for obtaining service guide information for a broadcast service. If the URL information provides a first base URL for obtaining first level signaling information through the broadband, the first base URL may be used to make an HTTP request for the first level signaling information. In an embodiment, a response message with respect to the HTTP request may include a metadata envelope containing the requested first level signaling information, and the metadata envelope provides next URL information providing a URL for next scheduled update regarding the first level signaling information.

In an embodiment, if the delivery protocol is a ROUTE protocol, the first level signaling information may include an MPD fragment that provides a description for media presentation regarding the broadcast service, and the MPD fragment may include asset ID information for associating content IDs providing identification information of linear content of the broadcast service and identification information of supplementary content. In an embodiment, the content ID may include a first content ID that provides identification information of entertainment-related supplementary content or a second content ID that provides identification information of the advertisement-related supplementary content. Here, the first content ID may be the EIDR content ID described above, and the second content ID may be the Ad-ID described above.

In an embodiment, the SLT information may include service category information, and a service category indicated by the service category information may include a linear audio/video service, a service of only linear audio, an app-based service, an electronic service guide (ESG) service and an emergency alert system (EAS) service. If the service category indicated by the service category information is the ESG service, service data for the ESG service includes service guide information for announcing information on a broadcast service (for example, a linear broadcast service), and the service guide information may include a service fragment having information on the broadcast service and a content fragment having content information on the broadcast service.

In an embodiment, the service fragment may include an icon element providing a URL pointing to an icon used to represent the broadcast service in the service guide. In an embodiment, the content fragment may include a preview icon element that provides a URL pointing to an icon used to represent the broadcast service in the service guide.

The broadcast signal transmitter may UDP (User Datagram Protocol)/IP(Internet Protocol) encapsulate each of the broadcast service data, the first level signaling information, and the second level signaling information (S29040). The UDP/IP encapsulated broadcast service data, first level signaling information and second level signaling information may be identified as IP packets by an IP address and port number. Therefore, the data transmitted by the broadcast signal transmitter according to the present invention may be operated/identified based on the IP.

In the UDP/IP encapsulating, the second level signaling information may be encapsulated into an IP packet with a predetermined address. That is, the second level signaling information may be carried in an IP packet having a predetermined address. For example, the LLS information may be carried as a payload of an IP packet having a well-known address and port number.

The broadcast signal transmitter may physical layer process the broadcast service data, the first level signaling information, and the second level signaling information to generate a signal frame (S29050).

Also, the broadcast signal transmitter may further perform link layer processing on the broadcast service data, the first level signaling information, and the second level signaling information between the IP/UDP encapsulating step (S41040) and the physical layer processing step (S29150). Since link layer processing is the same as described above, a redundant description thereof will be omitted.

FIG. 30 illustrates a broadcast signal transmitter and a broadcast signal receiver according to an embodiment of the present invention.

A broadcast signal transmitter 30100 may include a signaling generator 30110, a delivery layer encoder 30120, a UDP/IP encapsulator 30130, and a physical layer processor 30140.

The signaling generator 30110 may generate first level signaling information and second level signaling information for broadcast service data. In an embodiment, the first level signaling information may include information for the discovery and acquisition of broadcast service data, and the second level signaling information may include a type of signaling information included in the second level signaling information and provider ID information that identifies a provider associated with the broadcast service signaled through the second level signaling information. In an embodiment, the type of the signaling information identified by the table ID information may include SLT information providing information used for discovering the first level signaling information and building a basic service list.

The delivery layer encoder 30120 may encode broadcast service data and first level signaling information on the basis of a delivery protocol. In an embodiment, the delivery protocol may include at least one of the ROUTE (Real-Time Object Delivery over Unidirectional Transport) protocol or MMT (MPEG Media Transport) protocol.

The UDP/IP encapsulator 30130 may encapsulate each of the broadcast service data, the first level signaling information, and the second level signaling information.

The physical layer processor 30140 may physical layer process the broadcast service data, the first level signaling information, and the second level signaling information to generate a signal frame.

The broadcast signal transmitter 30100 of FIG. 30 performs the broadcast signal transmission method described above, and the same description will not be repeated. Also, the broadcast signal transmitter 30100 may further include a link layer processor (not shown). The link layer processor may perform link layer processing on the broadcast service data, the first level signaling information, and the second level signaling information between the IP/UDP encapsulator 30130 and the physical layer processor 30140. Since link layer processing is the same as described above, a redundant description thereof will be omitted.

The broadcast signal receiver 30200 may include a signaling parser 30210, a delivery layer decoder 30220, a UDP/IP packet parser 30230, and a physical layer parser 30240. The broadcast signal receiver 30200 may perform a reverse operation of the broadcast signal transmitter.

The physical layer parser 30240 may physical layer process a received signal frame to output a UDP/IP packet stream. The UDP/IP packet parser 30230 may decapsulate the received IP packet stream to output service component data. The delivery layer decoder 30240 may decode the service component data according to a delivery protocol. The signaling parser 30210 may obtain and parse signaling information to control an operation of the broadcast signal receiver. For example, the broadcast signal receiver may obtain SLT information, which is the second level signaling, and may parse the SLT information to obtain an IP address and a port number of the SLS information, which is the first level signaling as needed. The broadcast signal receiver may parse the SLS information to acquire a required transmission path of the service data. Then, the broadcast signal receiver may perform physical layer parsing, UDP/IP decapsulating, and delivery layer decoding on the required broadcast data along the entire path to thereby provide the corresponding broadcast service to the user.

In addition, the broadcast signal receiver 30200 may further include a link layer parser (not shown). The link layer parser may perform link layer processing (parsing) between the physical layer parser 30240 and the IP/UDP packet parser 30230.

In FIG. 30, sub-units of the broadcast signal transmitter and the broadcast signal receiver are divided according to their operation. In other words, one sub-unit does not necessarily have to be implemented as one physical processor; one sub-unit may be implemented as a plurality of physical processors, or a plurality of sub-units may be implemented as one physical processor.

The individual steps described in the embodiments above may be performed by hardware/processors. Each module/block/unit described in the embodiments above may operate as hardware/processor. Also, the methods according to the present invention may be performed as program codes. These codes may be written to a processor-readable storage medium and therefore, may be read by a processor provided by the apparatus.

For the convenience of description, the present invention has been described according to the respective drawings; however, it is equally possible to design a new embodiment by merging the embodiments described in the respective drawings. The apparatus and methods according to the present invention are not limited to the embodiments described above, but all or part of the embodiments may be combined selectively so that various modifications may be made to the embodiments.

Meanwhile, the method according to the present invention may be implemented in the form of processor-readable program codes in a recording medium that may be read by a processor installed in a network device. The processor-readable recording medium includes all kinds of recording devices storing data that may be read by the processor.

Examples of processor-readable recording media include ROM, RAM, CD-ROM, magnetic tape, floppy disk, optical data storage device, and implementation in the form of carrier waves such as transmission through the Internet. Also, the processor-readable recording medium may be distributed over computer systems connected to each other through a network so that processor-readable codes may be stored and executed in a distributed manner.

Throughout the document, preferred embodiments of the present invention have been described with reference to appended drawings; however, the present invention is not limited to the embodiments above. Rather, it should be noted that various modifications of the present invention may be made by those skilled in the art to which the present invention belongs without leaving the technical scope of the present invention defined by the appended claims, and these modifications should not be understood individually from the technical principles or aspects of the present invention.

It is apparent for those skilled in the art that the present invention may be embodied with various changes and modifications without departing from the technical principles and scope. Therefore, it should be understood that the present invention includes changes and modifications of the present invention provided within the technical scope defined by the appended claims and within an equivalent scope of the claims.

The present document describes both of the product invention and the process invention, and descriptions of the respective inventions may be applied in a supplementary manner.

Mode For Invention

Various embodiments have been described in the Best Mode for the Invention.

INDUSTRIAL APPLICABILITY

The present invention is used in a series of broadcast signal transmission/reception fields.

Those skilled in the art will appreciate that the present invention may be changed and modified in various ways without departing from the spirit and essential characteristics of the present invention. Therefore, the present invention is intended to include change and modification of the present invention provided in the accompanying claims and the equivalency range.

The invention claimed is:

1. A method for transmitting a broadcast signal, the method comprising:
generating service layer signaling (SLS) information for broadcast service data of a broadcast service, wherein the SLS information provides information for discover and acquisition of the broadcast service and content component of the broadcast service, and the SLS information processed by a delivery protocol, the delivery protocol being Real-Time Object Delivery over Unidirectional Transport (ROUTE) protocol or MPEG Media Transport Protocol (MMT) protocol;
generating low level signaling (LLS) information, the LLS information including table ID information identifying a type of signaling information included in the LLS information; and
transmitting the broadcast signal including the broadcast service data, the SLS information and the LLS information,
wherein the type of the signaling information includes service list table (SLT) information including information used for discovering the SLS information and building a basic service list, and
wherein the SLT information includes SLS protocol information indicating a type of the delivery protocol of the SLS information as the ROUTE protocol or the MMT protocol and uniform resource locator (URL) information comprising a base URL used for obtaining the SLS information for the broadcast service via a broadband other than the delivery protocol,
wherein the base URL is used to make an hypertext transfer protocol (HTTP) request for requesting a specific SLS signaling information to a signaling server, and
wherein a response message for the HTTP request from the signaling server includes a metadata envelope including the specific SLS information, and the metadata envelop further includes next URL information comprising a URL for obtaining next scheduled update for the specific SLS information.

2. The method of claim 1, wherein
when the delivery protocol is the ROUTE protocol, the SLS information includes a media presentation description (MPD) fragment providing a description regarding a media presentation regarding the broadcast service, and the MPD fragment includes an asset ID information for associating content IDs providing identification information of linear content and identification information of supplementary content of the broadcast service.

3. The method of claim 2, wherein
the content ID includes a first content ID providing identification information of entertainment-related supplementary content and a second content ID providing identification information of advertisement-related supplementary content.

4. The method of claim 1, wherein the SLT information includes service category information, and a service category includes at least one of a linear audio/video service, a service of only linear audio, an app-based service, an electronic service guide (ESG) service, or an emergency alert system (EAS) service.

5. The method of claim 4, wherein
when the service category is the ESG service, service data regarding the ESG service includes service guide information for announcing information regarding the broadcast service, and the service guide information includes a service fragment having information regarding the broadcast service and a content fragment having content information regarding the broadcast service.

6. The method of claim 5, wherein
the content fragment includes a preview icon element providing a URL pointing to an icon used to represent the broadcast service in the service guide.

7. A broadcast signal transmitter, comprising:
a processor configure to generate and transmit a broadcast signal,
wherein the processor is further configured to:
generate service layer signaling (SLS) information for broadcast service data of a broadcast service, wherein the SLS information provides information for discover and acquisition of the broadcast service and content component of the broadcast service, and the SLS information is processed by a delivery protocol, the delivery protocol being Real-Time Object Delivery over Unidirectional Transport (ROUTE) protocol or MPEG Media Transport Protocol (MMT) protocol;

generate low level signaling (LLS) information, the LLS information including table ID information identifying a type of signaling information included in the LLS information; and transmit the broadcast signal including the broadcast service data, the SLS information and the LLS information via the communication unit, wherein the type of the signaling information includes service list table (SLT) information including information used for discovering the SLS information and building a basic service list, and wherein the SLT information includes SLS protocol information indicating a type of the delivery protocol of the SLS information as the ROUTE protocol or the MMT protocol and uniform resource locator (URL) information comprising a base URL used for obtaining the SLS information for the broadcast service via a broadband other than the delivery protocol wherein the base URL is used to make an hypertext transfer protocol (HTTP) request for requesting a specific SLS signaling information to a signaling server, and a response message for the HTTP request from the signaling server includes a metadata envelope including the specific SLS information, and the metadata envelop further includes next URL information comprising a URL for obtaining next scheduled update for the specific SLS information.

8. The broadcast signal transmitter of claim 7, wherein when the delivery protocol is the ROUTE protocol, the SLS information includes a media presentation description (MPD) fragment providing a description regarding a media presentation regarding the broadcast service, and the MPD fragment includes an asset ID information for associating content IDs providing identification information of linear content and identification information of supplementary content of the broadcast service.

9. The broadcast signal transmitter of claim 8, wherein the content ID includes a first content ID providing identification information of entertainment-related supplementary content and a second content ID providing identification information of advertisement-related supplementary content.

10. The broadcast signal transmitter of claim 7, wherein the SLT information includes service category information, and a service category includes at least one of a linear audio/video service, a service of only linear audio, an app-based service, an electronic service guide (ESG) service, or an emergency alert system (EAS) service.

11. The broadcast signal transmitter of claim 10, wherein when the service category is the ESG service, service data regarding the ESG service includes service guide information for announcing information regarding the broadcast service, and the service guide information includes a service fragment having information regarding the broadcast service and a content fragment having content information regarding the broadcast service.

12. The broadcast signal transmitter of claim 11, wherein the content fragment includes a preview icon element providing a URL pointing to an icon used to represent the broadcast service in the service guide.

* * * * *